United States Patent
Kondo et al.

(10) Patent No.: US 7,970,968 B2
(45) Date of Patent: Jun. 28, 2011

(54) APPARATUS AND METHOD FOR CONTROLLING PLURAL FUNCTIONAL BLOCKS USING COMMON COMMAND

(75) Inventors: Tetsujiro Kondo, Tokyo (JP); Seiji Wada, Kanagawa (JP); Hideo Nakaya, Kanagawa (JP); Takashi Tago, Tokyo (JP); Ryosuke Araki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1043 days.

(21) Appl. No.: 10/593,890

(22) PCT Filed: Mar. 24, 2005

(86) PCT No.: PCT/JP2005/006204
§ 371 (c)(1),
(2), (4) Date: Sep. 22, 2006

(87) PCT Pub. No.: WO2005/094066
PCT Pub. Date: Oct. 6, 2005

(65) Prior Publication Data
US 2007/0180443 A1    Aug. 2, 2007

(30) Foreign Application Priority Data
Mar. 25, 2004  (JP) .................................. 2004-089982

(51) Int. Cl.
| | |
|---|---|
| G06F 13/00 | (2006.01) |
| G06F 13/14 | (2006.01) |
| G06F 9/44 | (2006.01) |
| G06F 15/00 | (2006.01) |
| G06F 15/16 | (2006.01) |
| G06F 15/80 | (2006.01) |
| G06T 1/00 | (2006.01) |
| G06T 15/00 | (2006.01) |

(52) U.S. Cl. ........ 710/100; 710/305; 717/168; 345/501; 345/502; 345/503; 345/504; 345/505; 345/520; 345/522

(58) Field of Classification Search .................. 710/305, 710/241, 100; 717/168; 345/501–505, 520, 345/522
See application file for complete search history.

(56) References Cited

U.S. PATENT DOCUMENTS
4,884,150 A * 11/1989 Kanda .............................. 386/21
(Continued)

FOREIGN PATENT DOCUMENTS
DE              19935700 A1 *  2/2000
(Continued)

OTHER PUBLICATIONS

Liu et al., "A new parallel video understanding and retrieval system", Jul. 19-23, 2010, IEEE, 2010 IEEE International Conference on Multimedia and Expo (ICME), pp. 679-684.*

(Continued)

*Primary Examiner* — Faisal M Zaman
(74) *Attorney, Agent, or Firm* — Frommer Lawrence & Haug LLP; William S. Frommer; Thomas F. Presson

(57) ABSTRACT

This invention relates to an information-signal-processing apparatus etc. for performing a series of processing pieces by using plural functional blocks in response to any information signals, in which functions can be easily upgraded through version upgrading of the functional blocks. Control block 110 issues a common command and transmits it to a control block 120 via a control bus 111. Control I/F 120 of the functional block 120 converts this common command into an intra-functional-block command if the common command is the common command related to its own functional block, and supplies the functional section 120e with it. This enables the functional block 120 to operate adaptively in accordance with the common command. When performing upgrade of the functions by the version updating of a predetermined function block, the common command need not be changed.

18 Claims, 27 Drawing Sheets

U.S. PATENT DOCUMENTS

| | | | | |
|---|---|---|---|---|
| 5,418,967 A | * | 5/1995 | Simcoe et al. | 710/241 |
| 5,426,516 A | * | 6/1995 | Furuki et al. | 358/500 |
| 5,572,686 A | * | 11/1996 | Nunziata et al. | 710/116 |
| 5,586,256 A | * | 12/1996 | Thiel et al. | 710/100 |
| 5,623,672 A | * | 4/1997 | Popat | 710/240 |
| 5,754,785 A | * | 5/1998 | Lysik et al. | 709/222 |
| 5,778,200 A | * | 7/1998 | Gulick | 710/113 |
| 5,919,247 A | * | 7/1999 | Van Hoff et al. | 709/217 |
| 6,130,967 A | * | 10/2000 | Lee et al. | 382/302 |
| 6,199,204 B1 | * | 3/2001 | Donohue | 717/178 |
| 6,247,100 B1 | * | 6/2001 | Drehmel et al. | 711/141 |
| 6,272,170 B1 | * | 8/2001 | Chu | 375/222 |
| 6,286,070 B1 | * | 9/2001 | Ohara | 710/113 |
| 6,304,935 B1 | * | 10/2001 | Strongin | 345/520 |
| 6,345,185 B1 | * | 2/2002 | Yoon et al. | 455/436 |
| 6,434,432 B1 | * | 8/2002 | Hao et al. | 700/1 |
| 6,560,321 B1 | * | 5/2003 | Chen et al. | 379/100.17 |
| 6,614,804 B1 | * | 9/2003 | McFadden et al. | 370/468 |
| 6,633,296 B1 | * | 10/2003 | Laksono et al. | 345/502 |
| 6,754,719 B1 | * | 6/2004 | Nakatsugawa | 709/251 |
| 7,015,915 B1 | * | 3/2006 | Diard | 345/522 |
| 7,051,325 B2 | * | 5/2006 | Choi et al. | 717/168 |
| 7,333,662 B2 | * | 2/2008 | Okada | 382/240 |
| 7,340,547 B1 | * | 3/2008 | Ledebohm | 710/260 |
| 7,478,146 B2 | * | 1/2009 | Tervo et al. | 709/220 |
| 7,663,633 B1 | * | 2/2010 | Diamond et al. | 345/503 |
| 7,831,740 B2 | * | 11/2010 | Kim et al. | 710/5 |
| 2003/0128702 A1 | | 7/2003 | Satoh et al. | |
| 2004/0019717 A1 | * | 1/2004 | Kondo et al. | 710/100 |
| 2004/0081079 A1 | * | 4/2004 | Forest et al. | 370/216 |
| 2004/0083471 A1 | * | 4/2004 | Nam et al. | 717/168 |
| 2004/0186921 A1 | * | 9/2004 | Wolrich et al. | 710/1 |
| 2004/0196003 A1 | * | 10/2004 | Graff et al. | 320/116 |
| 2004/0237103 A1 | * | 11/2004 | Kondo et al. | 725/37 |
| 2005/0088445 A1 | * | 4/2005 | Gonzalez et al. | 345/502 |

FOREIGN PATENT DOCUMENTS

| | | | |
|---|---|---|---|
| EP | 0 893 765 | | 1/1999 |
| EP | 1 326 172 | | 7/2003 |
| JP | 01042690 A | * | 2/1989 |
| JP | 1 213736 | | 8/1989 |
| JP | 02054373 A | * | 2/1990 |
| JP | 03150678 A | * | 6/1991 |
| JP | 8 314844 | | 11/1996 |
| JP | 2001 511558 | | 8/2001 |
| JP | 2003 196230 | | 7/2003 |
| JP | 2004 5053 | | 1/2004 |
| JP | 2004 38643 | | 2/2004 |
| WO | WO 99 05603 | | 2/1999 |
| WO | WO 02058044 A2 | * | 7/2002 |
| WO | WO 02086745 A2 | * | 10/2002 |
| WO | WO 2008004135 A2 | * | 1/2008 |

OTHER PUBLICATIONS

Park et al., "Design and Performance Evaluation of Image Processing Algorithms on GPUs", Jan. 2011, IEEE, IEEE Transactions on Parallel and Distributed Systems, vol. 22, No. 1, pp. 91-104.*

Yoo et al., "Real-time parallel remote rendering for mobile devices using graphics processing units", Jul. 19-23, 2010, IEEE, 2010 IEEE International Conference on Multimedia and Expo (ICME), pp. 902-907.*

Govindaraju et al., "Fast Computation of Database Operations using Graphics Processors", Jun. 13-18, 2004, ACM, SIGMOD 2004, pp. 215-226.*

Shigeo Uno, "Multi-Master Hoshiki no Shanai Network Protocol CAN no Kiso Chishiki", Transistor Gijutsu, JP, CQ Publishing Co., Ltd., Mar. 1, 2003, pp. 181 to 192.

Shigeo Uno, Basic Knowledge of CAN, which is a network protocol of multi-master methods inside a car, Transistor technology, Japan CQ publication Co., Ltd., Mar. 1, 2003, vol. 40, No. 3, pp. 181-192.

* cited by examiner

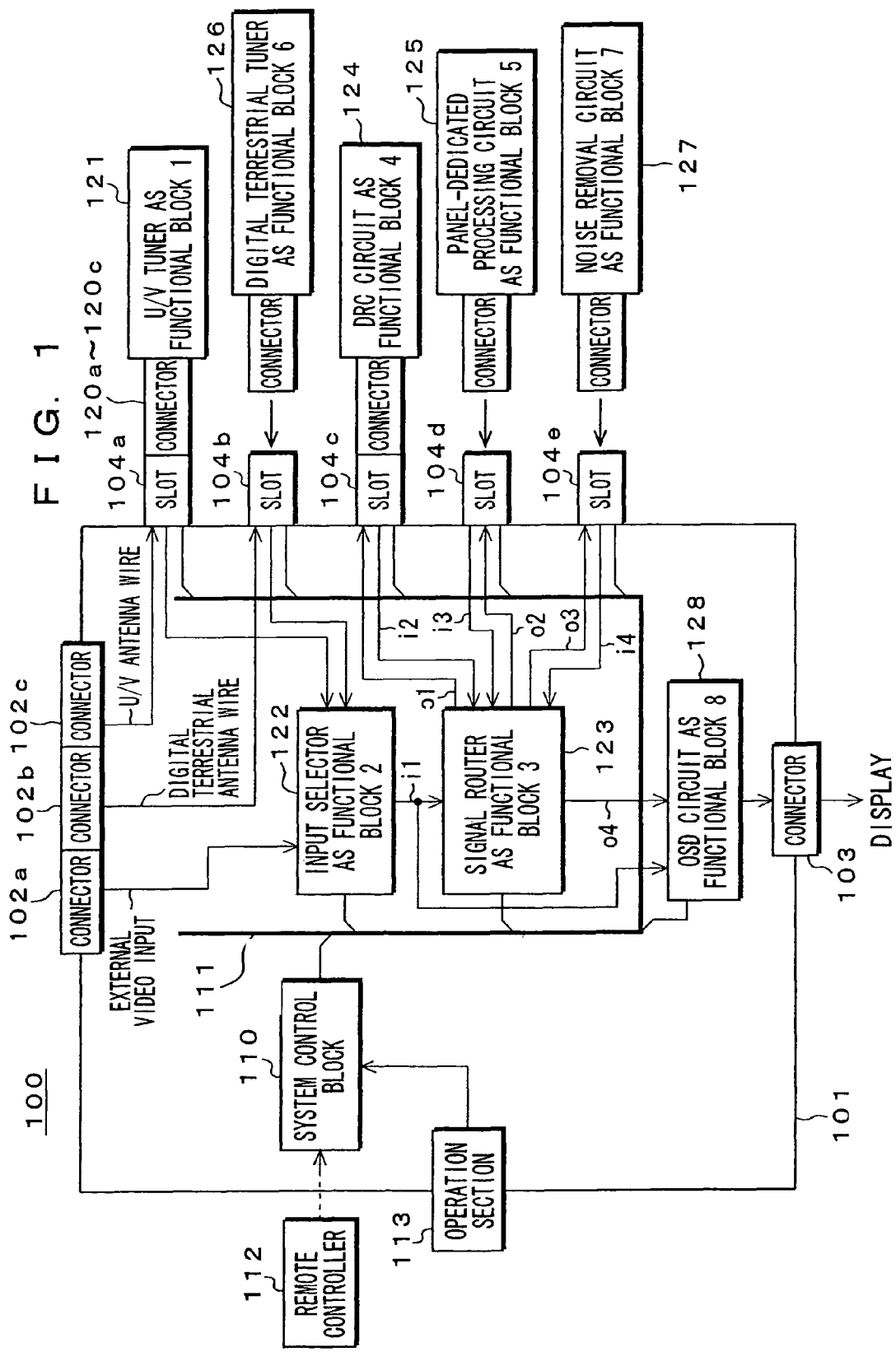

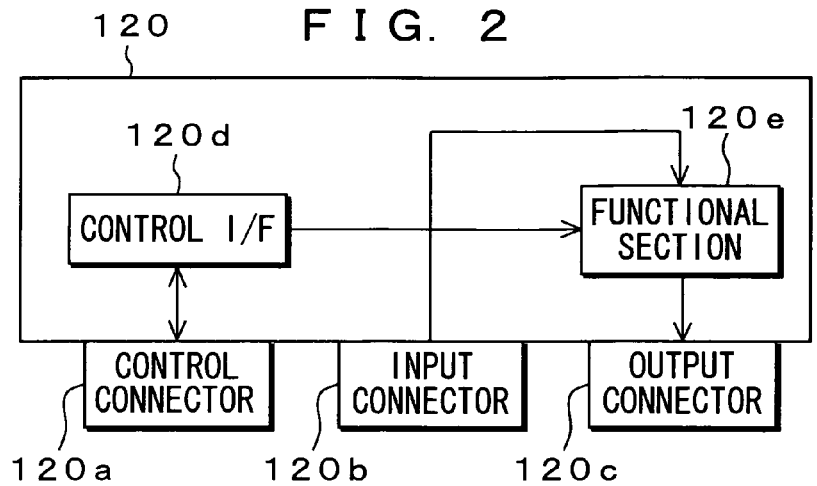
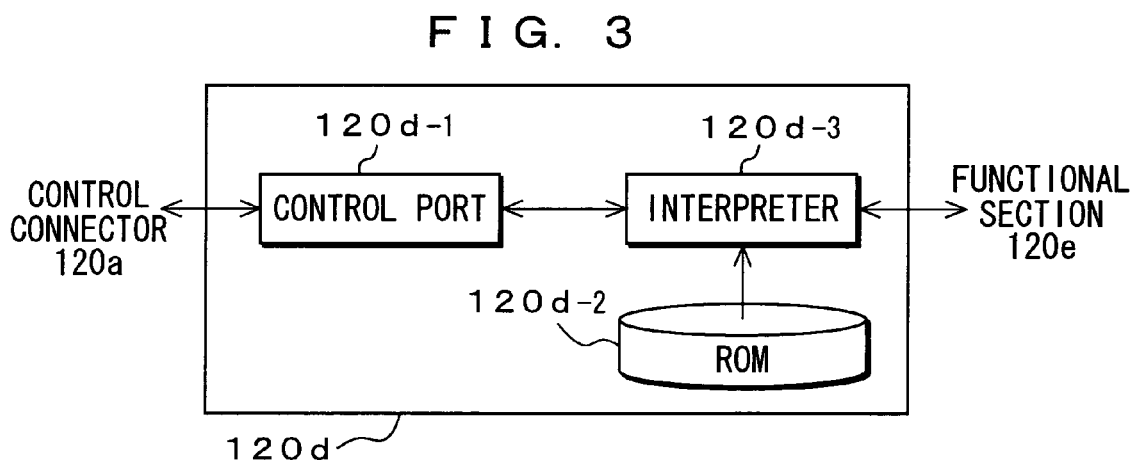
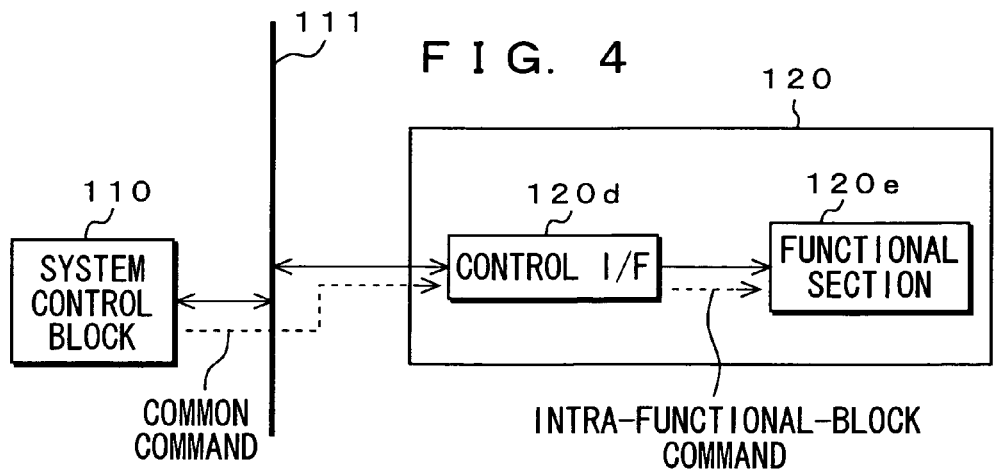

FIG. 5

| COMMON COMMANDS | MEANING OF COMMON COMMANDS | INITIAL VALUES | FUNCTIONAL BLOCKS IN CHARGE | INTRA-FUNCTIONAL-BLOCK COMMANDS | MEANING OF INTRA-FUNCTIONAL-BLOCK COMMANDS |
|---|---|---|---|---|---|
| ch(1)-ch(12) | CHANNEL Nos. 1-12 | LAST MEMORY | 1:U/V TUNER | ch(1-12) | SWITCH OF CHANNEL |
| | | | 8:OSD CIRCUIT | writeInputUVch(1-12) | DISPLAY OF CHANNEL |
| in(1)-in(3) | 1: UHF/VHF; 2: DIGITAL TERRESTRIAL; 3: VIDEO | LAST MEMORY | 2:INPUT SELECTOR | in(1-3) | SWITCH OF INPUT |
| | | | 8:OSD CIRCUIT | writeInput(1-3) | DISPLAY OF INPUT |
| DRCvolExec (on/off) | SWITCH OF DRC VOLUME PROCESSING | DRCvolExec (on) | 8:OSD CIRCUIT | writeProcessVol(on/off) | DISPLAY OF DRC VOLUME PROCESSING |
| | | | | displayInput(in1/in2) | SWITCH OF CHILD-SCREEN INPUT SOURCE |
| | | | | displaySize(in1, size1)/displaySize(in2, size1) | IMAGE SIZE |
| DRCvol (resolutionVal, noiseVal) | ADJUSTMENT OF DRC RESULTION AXIS AND NOISE AXIS | LAST MEMORY | 4:DRC | volume(resolutionVal, noiseVal) | SUBSTITUTION OF DRC (RESOLUTION AXIS, NOISE AXIS) VOLUME VALUE |
| | | | 8:OSD CIRCUIT | writeProcessDRCvol(resolutionVal, noiseVal) | DISPLAY OF DRC VOLUME VALUE |
| | | | 7:NOISE REMOVAL | noiseSuppress(noiseVal) | SUBSTITUTION OF NOISE SUPPRESSION VALUE |
| DRCzoomExec (on/off) | SWITCH OF DRC ZOOM PROCESSING | DRCzoomExec (off) | 4:DRC | zoom(InitRatio/1, InitHol/0, InitVer/0) | SUBSTITUTION OF DRC ZOOM INITIAL VALUE |
| | | | 8:OSD CIRCUIT | writeProcessZoom(on/off) | DISPLAY OF DRC ZOOM PROCESSING |
| | | | | displayInput(in1, in2/in1 or in2) | SWITCH OF CHILD-SCREEN INPUT SOURCE |
| | | | | displaySize(in1, size1), displaySize(in2, size0.25) /displaySize(in1 or in2, size1) | IMAGE SIZE |
| | | | | writeZoomFrame(InitRatio, InitHol, InitVer/off) | DISPLAY OF ZOOM FRAME ON CHILD SCREEN |
| | | | | writeProcessDRCzoom(InitRatio, InitHol, InitVer /off) | DISPLAY OF INITIAL VALUES OF DRC ZOOM RATIO AND POSITIONS |
| DRCzoom(ratioVal, horizontalVal, verticalVal) | ADJUSTMENT OF DRC ZOOM RATIO AND POSITIONS | DRCzoom (InitRatio, InitHol, initVer) | 4:DRC | zoom(ratioVal, horizontalVal, verticalVal) | SUBSTITUTION OF DRC ZOOM VALUE |
| | | | 8:OSD CIRCUIT | writeZoomFrame(ratioVal, horizontalVal, verticalVal) | DISPLAY OF ZOOM FRAME ON CHILD SCREEN |
| | | | | writeProcessDRCzoom(ratioVal, horizontalVal, verticalVal) | DISPLAY OF DRC ZOOM RATIO AND POSITIONS |
| InitializeConnect (1/2/3/4/5) | INTER-FUNCTIONAL-BLOCK CONNECTIONS 1-5 | | 3:SIGNAL ROUTER | route(1/2/3) | SWITCH OF INTER-PROCESSING-SUBSTRATE CONNECTION |
| | | | 8:OSD CIRCUIT | writeRoute(1/2/3/4/5) | DISPLAY OF CONNECTION STATUS |

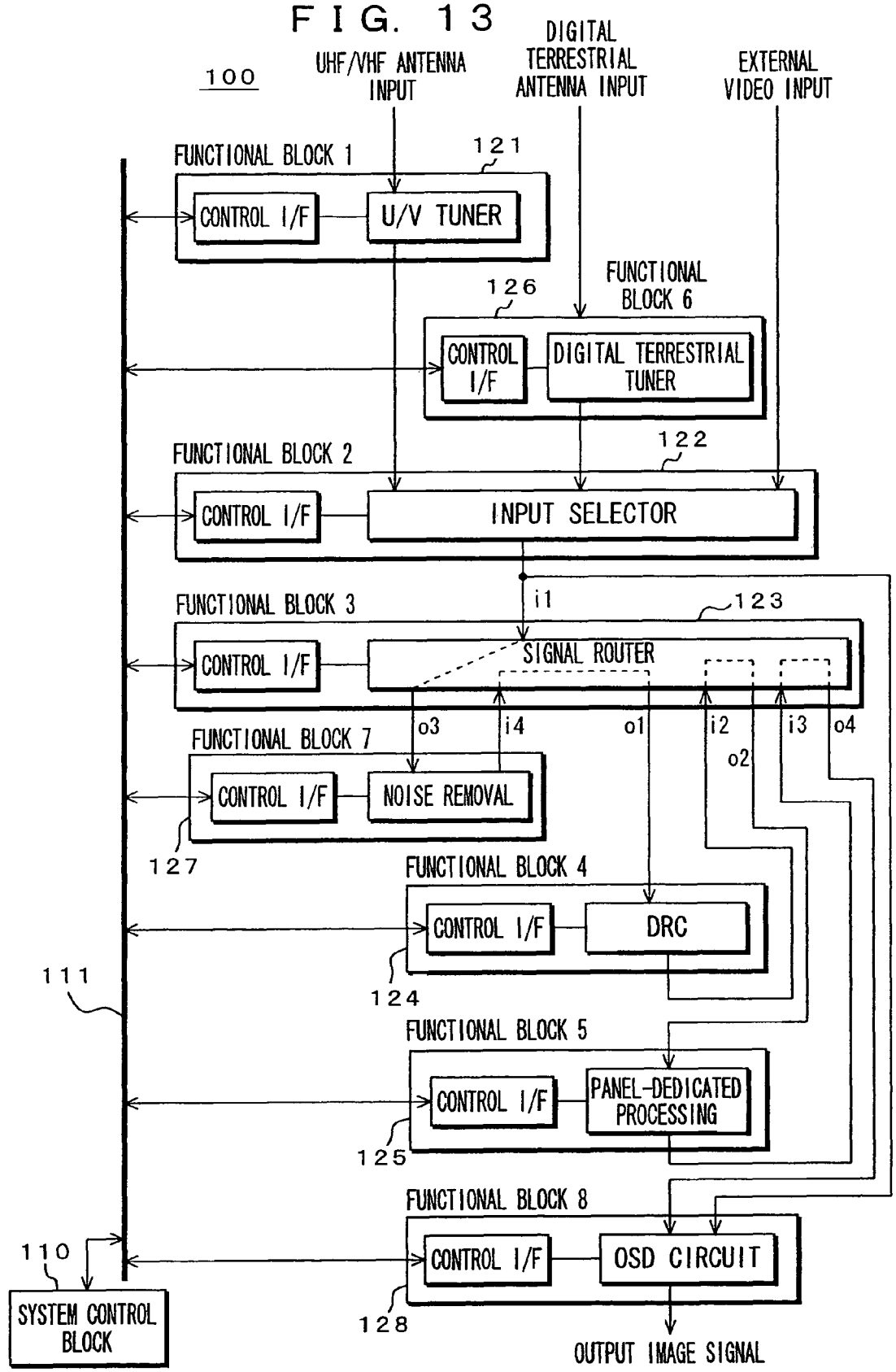

FIG. 15

| COMMON COMMANDS | MEANING OF COMMON COMMANDS | INITIAL VALUES | FUNCTIONAL BLOCKS IN CHARGE | INTRA-FUNCTIONAL-BLOCK COMMANDS | MEANING OF INTRA-FUNCTIONAL-BLOCK COMMANDS |
|---|---|---|---|---|---|
| DRCvol (resolutionVal, noiseVal) | ADJUSTMENT OF DRC RESOLUTION AXIS AND NOISE AXIS | LAST MEMORY | 4:DRC (VERSION UPGRADE) | volumeResolution (resolutionVal) | SUBSTITUTION OF DRC (RESOLUTION AXIS) VOLUME VALUE |
| | | | | volumeNoise(noiseVal) | SUBSTITUTION OF DRC (NOISE AXIS) VOLUME VALUE |
| DRCzoomExec (on/off) | SWITCH OF DRC ZOOM PROCESSING | DRCzoomExec(off) | 4:DRC (VERSION UPGRADE) | zoom(InitRatio/1, InitHol/0, InitVer/0) | SUBSTITUTION OF DRC ZOOM INITIAL VALUE |
| DRCzoom(ratioVal, horizontalVal, verticalVal) | ADJUSTMENT OF DRC ZOOM RATIO AND POSITIONS | DRCzoom (InitRatio, InitHol, initVer) | 4:DRC (VERSION UPGRADE) | zoom(ratioVal, horizontalVal, verticalVal) | SUBSTITUTION OF DRC ZOOM VALUE |

FIG. 19

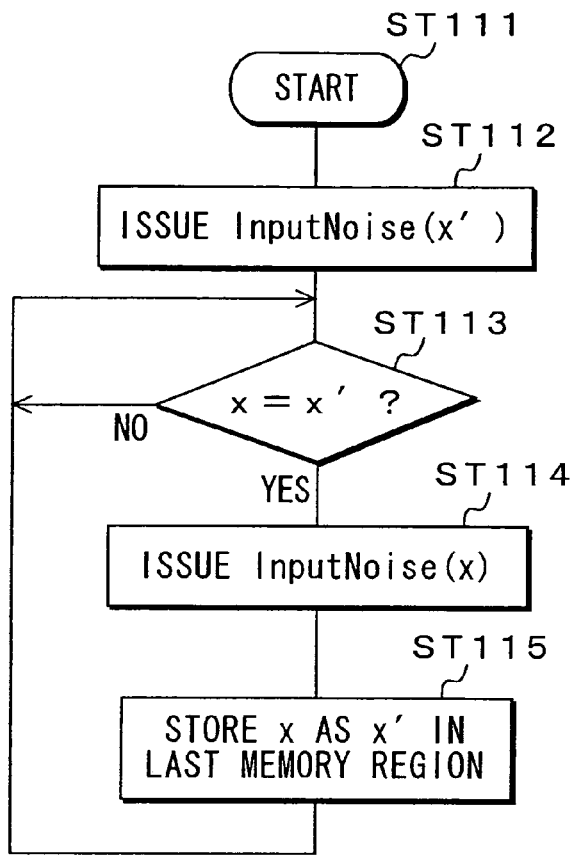

FIG. 20

| COMMON COMMAND | MEANING OF COMMON COMMAND | INITIAL VALUE | FUNCTIONAL BLOCKS IN CHARGE | INTRA-FUNCTIONAL-BLOCK COMMANDS | MEANING OF INTRA-FUNCTIONAL-BLOCK COMMANDS |
|---|---|---|---|---|---|
| InputNoise (0-9) | INPUT NOISE LEVEL | LAST MEMORY | 4:DRC | volumeNoise (noiseVal) | SUBSTITUTION OF DRC (NOISE AXIS) VOLUME VALUE |
| | | | 7:NOISE REMOVAL | noiseSuppress (0-9) | SUBSTITUTION OF NOISE SUPPRESSION VALUE |
| | | | 3:SIGNAL ROUTER | route(3/4) | SWITCH OF INTER-PROCESSING-SUBSTRATE CONNECTION |
| | | | 8:OSD CIRCUIT | writeInputNoise (0-9) | DISPLAY OF INPUT NOISE LEVEL |

FIG. 29

| COMMON COMMANDS | MEANING OF COMMON COMMANDS | IDENTIFIERS (12 BIT) | INITIAL VALUES | FUNCTIONAL BLOCKS IN CHARGE | INTRA-FUNCTIONAL-BLOCK COMMANDS | MEANING OF INTRA-FUNCTIONAL-BLOCK COMMANDS |
|---|---|---|---|---|---|---|
| ch(1)–ch(12) | CHANNEL Nos. 1–12 | 0xC01 –0xC0C | LAST MEMORY | 1:U/V TUNER | ch(1–12) | SWITCH OF CHANNEL |
| | | | | 8:OSD CIRCUIT | writeInputUVch(1–12) | DISPLAY OF CHANNEL |
| in(1)–in(3) | 1: UHF/VHF; 2: DIGITAL TERRESTRIAL; 3: VIDEO | 0xA01 | LAST MEMORY | 2:INPUT SELECTOR | in(1–3) | SWITCH OF INPUT |
| | | | | 8:OSD CIRCUIT | writeInput(1–3) | DISPLAY OF INPUT |
| DRCvolExec (on/off) | SWITCH OF DRC VOLUME PROCESSING | 0x501 | DRCvol Exec (on) | 8:OSD CIRCUIT | writeProcessVol(on/off) | DISPLAY OF DRC VOLUME PROCESSING |
| | | | | | displayInput(in1/in2) | SWITCH OF CHILD-SCREEN INPUT SOURCE |
| | | | | | displaySize(in1,size1)/displaySize(in2,size2) | IMAGE SIZE |
| DRCvol (resolutionVal, noiseVal) | ADJUSTMENT OF DRC RESOLUTION AXIS AND NOISE AXIS | 0x502 | LAST MEMORY | 4:DRC | volume(resolutionVal,noiseVal) | SUBSTITUTION OF DRC (RESOLUTION AXIS, NOISE AXIS) VOLUME VALUE |
| | | | | 8:OSD CIRCUIT | writeProcessDRCvol(resolutionVal,noiseVal) | DISPLAY OF DRC VOLUME VALUE |
| | | | | 7:NOISE REMOVAL | noiseSuppress(noiseVal) | SUBSTITUTION OF NOISE SUPPRESSION VALUE |
| Initialize Connect (1/2/3/4/5) | INTER-FUNCTIONAL-BLOCK CONNECTIONS 1–5 | 0x001 | LAST MEMORY | 3:SIGNAL ROUTER | route(1/2/3) | SWITCH OF INTER-PROCESSING-SUBSTRATE CONNECTION |
| | | | | 8:OSD CIRCUIT | writeRoute(1/2/3/4/5) | DISPLAY OF CONNECTION STATUS |

FIG. 30

| COMMON COMMANDS | IDENTIFIERS (12 BIT) | MEANING OF COMMON COMMANDS | INITIAL VALUES | FUNCTIONAL BLOCKS IN CHARGE | INTRA-FUNCTIONAL-BLOCK COMMANDS | MEANING OF INTRA-FUNCTIONAL-BLOCK COMMANDS |
|---|---|---|---|---|---|---|
| ch(1)-ch(12) | 0xC01 -0xC0C | CHANNEL Nos. 1-12 | LAST MEMORY | 1:U/V TUNER | ch(1-12) | SWITCH OF CHANNEL |
| | | | | 8:OSD CIRCUIT | writeInputUVch(1-12) | DISPLAY OF CHANNEL |
| in(1)-in(3) | 0xA01 | 1: UHF/VHF; 2: DIGITAL TERRESTRIAL; 3: VIDEO | LAST MEMORY | 2:INPUT SELECTOR | in(1-3) | SWITCH OF INPUT |
| | | | | 8:OSD CIRCUIT | writeInput(1-3) | DISPLAY OF INPUT |
| DRCvolExec (on/off) | 0x501 | SWITCH OF DRC VOLUME PROCESSING | DRCvol Exec (on) | 8:OSD CIRCUIT | writeProcessVol(on/off) | DISPLAY OF DRC VOLUME PROCESSING |
| | | | | | displayInput(in1/in2) | SWITCH OF CHILD-SCREEN INPUT SOURCE |
| | | | | | displaySize(in1,size1)/displaySize(in2,size) | IMAGE SIZE |
| DRCvol (resolutionVal, noiseVal) | 0x502 | ADJUSTMENT OF DRC RESOLUTION AXIS AND NOISE AXIS | LAST MEMORY | 4:DRC | volume(resolutionVal,noiseVal) | SUBSTITUTION OF DRC (RESOLUTION AXIS, NOISE AXIS) VOLUME VALUE |
| | | | | 8:OSD CIRCUIT | writeProcessDRCvol(resolutionVal,noiseVal) | DISPLAY OF DRC VOLUME VALUE |
| | | | | 7:NOISE REMOVAL | noiseSuppress(noiseVal) | SUBSTITUTION OF NOISE SUPPRESSION VALUE |
| DRCzoomExec (on/off) | 0x503 | SWITCH OF DRC ZOOM PROCESSING | DRCzoom Exec (off) | 4:DRC | zoom(InitRatio/1,InitHol/0,InitVer/0) | SUBSTITUTION OF DRC ZOOM INITIAL VALUE |
| | | | | 8:OSD CIRCUIT | writeProcessZoom(on/off) | DISPLAY OF DRC ZOOM PROCESSING |
| | | | | | displayInput(in1,in2/in1 or in2) | SWITCH OF CHILD-SCREEN INPUT SOURCE |
| | | | | | displaySize(in1,size1),displaySize(in2,size0.25)/displaySize(in1 or in2,size) | IMAGE SIZE |
| | | | | | writeZoomFrame(InitRatio,InitHol,InitVer/off) | DISPLAY OF ZOOM FRAME ON CHILD SCREEN |
| | | | | | writeProcessDRCzoom(InitRatio,InitHol,InitVer/off) | DISPLAY OF INITIAL VALUES OF DRC ZOOM RATIO AND POSITIONS |
| DRCzoom (ratioVal, horizontalVal, verticalVal) | 0x504 | ADJUSTMENT OF DRC ZOOM RATIO AND POSITIONS | DRCzoom (InitRatio, InitHol, initVer) | 4:DRC | zoom(ratioVal,horizontalVal,verticalVal) | SUBSTITUTION OF DRC ZOOM VALUE |
| | | | | 8:OSD CIRCUIT | writeZoomFrame(ratioVal,horizontalVal,verticalVal) | DISPLAY OF ZOOM FRAME ON CHILD SCREEN |
| | | | | | writeProcessDRCzoom(ratioVal,horizontalVal,verticalVal) | DISPLAY OF DRC ZOOM RATIO AND POSITIONS |
| Initialize Connect (1/2/3/4/5) | 0x001 | INTER-FUNCTIONAL-BLOCK CONNECTIONS 1-5 | LAST MEMORY | 3:SIGNAL ROUTER | route(1/2/3) | SWITCH OF INTER-PROCESSING-SUBSTRATE CONNECTION |
| | | | | 8:OSD CIRCUIT | writeRoute(1/2/3/4/5) | DISPLAY OF CONNECTION STATUS |

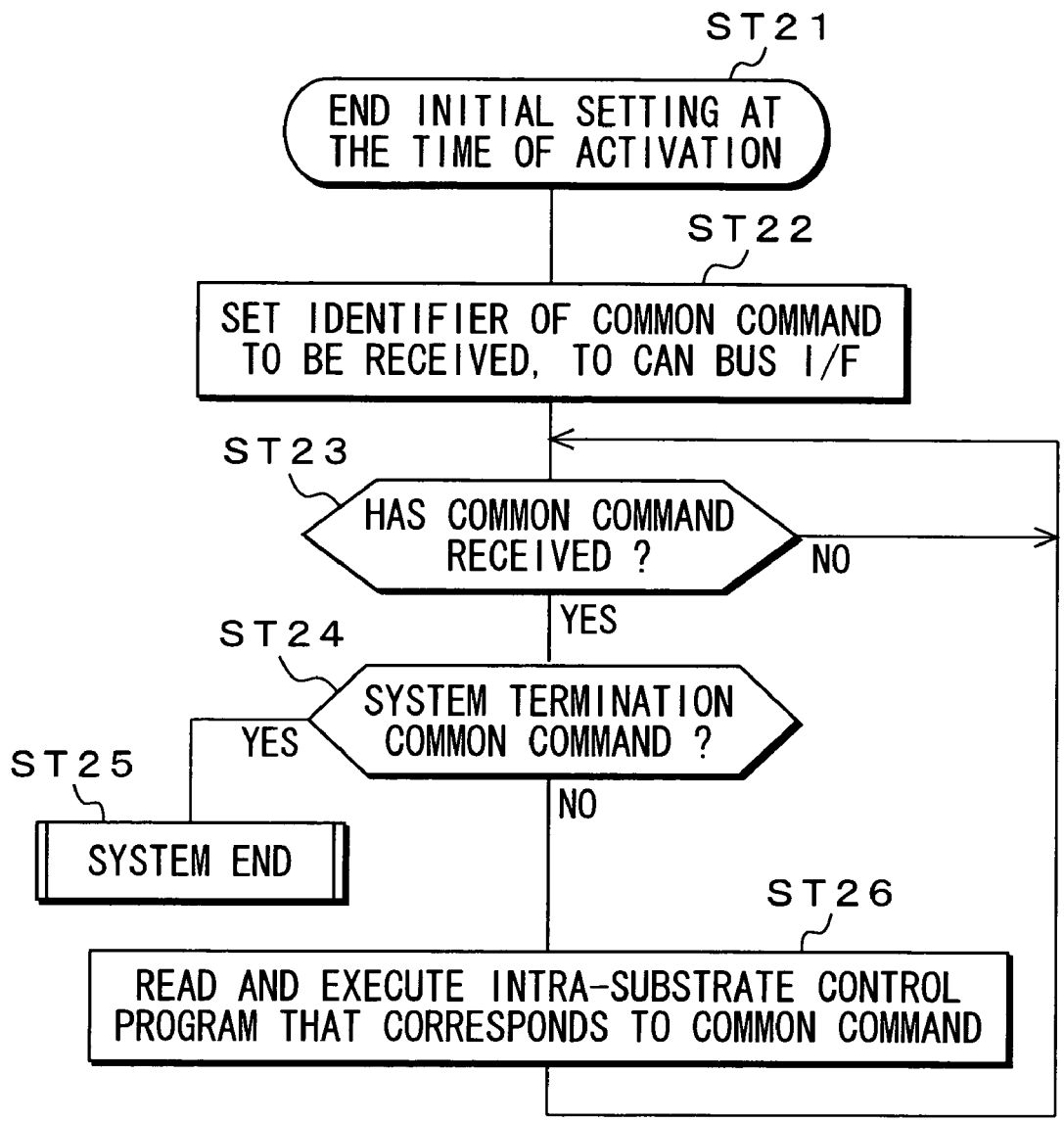

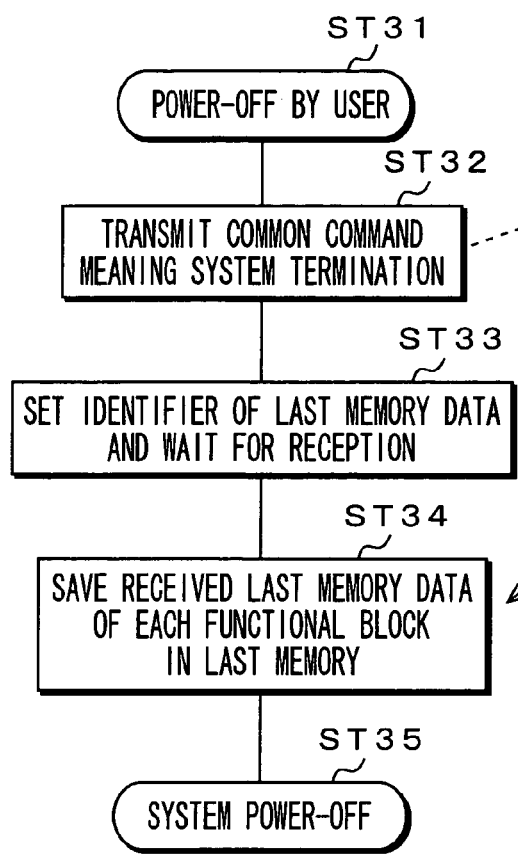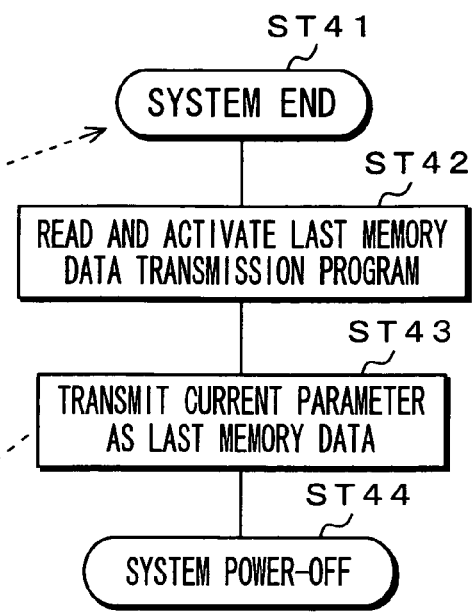
FIG. 35A
FIG. 35B

APPARATUS AND METHOD FOR CONTROLLING PLURAL FUNCTIONAL BLOCKS USING COMMON COMMAND

TECHNICAL FIELD

The present invention relates to an information-signal-processing apparatus, a functional block control method, and a functional block that are well suited for use in an image signal processing apparatus etc. for processing an image signal by using, for example, plural functional blocks.

More specifically, the present invention relates to an information-signal-processing apparatus etc. for sending a common command from a control block or a predetermined functional block to each of the plural functional blocks required to process an information signal and causing the plural functional blocks to operate adaptively in response to the common command so that functions can be easily upgraded through version upgrading of the functional blocks without changing the common command.

BACKGROUND ART

Conventionally, in an image-signal-processing apparatus for performing a series of processing pieces such as noise removal, improvements in image quality, etc. on an image signal and outputting this image signal, it has been thought of implementing this series of processing pieces by using, for example, plural functional blocks such as a substrate, a chip, and a device. In this case, by adding a functional block, the functions can be upgraded. In the case of adding the functional block, a control block that controls the functional block needs to acquire control information required to control the added functional block.

For example, Japanese Patent Application Publication No. Hei 11-53289 describes a technique by which when a peripheral device is connected to an information processing apparatus such as a personal computer, driver software stored in a storage device of this peripheral device is automatically installed in a storage device of the information processing apparatus so that the information processing apparatus can control the peripheral device.

If a control block transmits an intra-functional-block command that directly controls operations of a functional block to control the functional block, it is necessary for the control block to acquire control information of a version-upgraded functional block as in the case of adding the functional block as described above, even when the functional block is replaced with the version-upgraded functional block to upgrade the function thereof.

DISCLOSURE OF THE INVENTION

An object of the invention is to enable a functional block to upgrade the function thereof easily with a version-upgraded functional block.

An information-signal-processing apparatus according to the invention has plural functional blocks each for processing an information signal, and a control block for controlling operations of the plural functional blocks, wherein the control block or a predetermined block of the control block and the plural functional blocks issues a common command, and each of the plural functional blocks adaptively operates in accordance with the issued common command.

A functional block control method according to the invention has the steps of transmitting a common command to plural functional blocks, respectively, used to process an information signal from a control block or from a predetermined block of the control block and the plural functional blocks, and adaptively operating the plural functional blocks in accordance with the common command.

A functional block according to the invention has a control section, and a functional section that is controlled by this functional section, wherein the control section includes storage means for storing correlations between a common command related to its own functional block and an intra-functional-block command used to control the control section, reception means for receiving the common command from the control block, and conversion means for, if the common command received by the reception means is the common command related to its own functional block, converting this common command into the intra-functional-block command based on the correlation stored in the storage means.

In the present invention, a control block controls operations of plural functional blocks. For example, the control block and the plural functional blocks are connected to each other through a control bus. Further, for example, the plural functional blocks are respectively realized by a substrate and so partially or totally inserted into slots in a chassis to be connected to the control bus.

The control block or a predetermined block of the control block and the plural functional blocks issues a common command. For example, such a common-command-issuing functional block issues such a common command as to include results of processing an information signal. This common command is sent to the plural functional blocks via, for example, the above-described control bus. Each of the plural functional blocks operates adaptively in response to the common command. In this case, in these functional blocks, a signal path or signal processing changes in accordance with the common command.

A functional block includes, for example, a control section and a functional section controlled by this control section. The control section has storage means for storing a correlation between a common command related to its own functional block and an intra-functional-block command that controls the functional section, reception means for receiving the common command from a control block, and conversion means for converting the command received by this reception means, if it is the common command related to its own functional block, into an intra-functional-block command based on the correlation stored in the storage means. In such a manner, the functional block adaptively operates in response to the common command.

For example, the control block acquires a common command from plural functional blocks. Further, for example, the control block acquires a common command through a removable storage medium, via a predetermined network such as the Internet, or from a broadcast signal from digital broadcast etc. Thus, if a new functional block is added to require a common command that corresponds to this new functional block, it is easily possible to deal with this.

For example, the control block, if having a first common command that corresponds to a user operation, transmits a first common command to the plural functional blocks when the user has performed an operation corresponding to the first common command. In such a manner, the plural functional blocks operate to accommodate operations of the user. Further, for example, the control block, if having a second common command that does not correspond to a user operation, transmits the second common command to plural functional blocks without associating it with the user operation. In such a manner, the plural functional blocks operate to accommodate the second common command without being associated with the user operation.

For example, a block (a control block or a functional block) that issues a common command sends to plural functional blocks most recent values of all kinds or some kinds of common commands at timings for every predetermined lapse of time. In such a manner, even if one functional block cannot receive a common command related to itself for some reason, it can receive that common command after it has lapsed the predetermined time, so that in a case where, for example, two functional blocks operate in cooperation with each other, misalignment in cooperation due to a failure of any one of the functional blocks to receive the common command can be corrected by the other.

In this case, by providing such a configuration that a command indicating that a common-command-receiving functional block, which has received a common command, normally operates may be returned to a common-command-transmitting block (a control block or a functional block), if such a command is not returned from the receiving functional block to the transmitting block, the transmitting block may transmit most recent values of all kinds or some kinds of common commands.

As described above, plural functional blocks adaptively operate in response to a common command issued by a control block or any one of the control block and plural functional blocks. Therefore, by the present invention, it is possible to easily upgrade functions through version upgrade of a predetermined functional block without a need to change the common command.

That is, in this case, a correlation between the common command stored in the storage means of this predetermined functional block and the intra-functional-block command accommodates the version upgrade so that an intra-functional-block command to control the version-upgraded functional section can be obtained.

Further, by causing a predetermined functional block to issue a common command including processing results of an information signal, the other plural functional blocks can easily utilize the processing result included in this common command.

For example, a control block and plural functional blocks respectively have a bus interface and so are connected to each other through a bus that employs these bus interfaces. The bus interface has a message buffer for storing received data and a message storage control section for selectively storing data received through the bus in the message buffer. The bus is, for example, a controller area network (CAN) bus.

For example, from the control block to the plural functional blocks, a common command having at least an identifier is transmitted. The message storage control sections of the plural functional blocks store a common command received via the bus in the message buffer if an identifier of the common command that has been received agrees with an identifier (or a part thereof) of a predetermined common command that has been set beforehand.

In this case, if the common command received via the bus relates to a functional block of its own, each of the plural functional blocks stores this common command in the message buffer hardware-wise. It is therefore unnecessary for a control microcomputer (CPU) in the functional block to sort out the received common commands, thereby enabling any loads on the control microcomputer to be greatly reduced.

BRIEF DESCRIPTION OF THE DRAWINGS

FIG. 1 is a block diagram for showing a configuration of an image-signal-processing apparatus according to a first embodiment of the invention;

FIG. 2 is a block diagram for showing a basic configuration of a functional block;

FIG. 3 is a block diagram for showing a configuration of a control interface (a control I/F) in the functional block;

FIG. 4 is an explanatory diagram for explaining a structure of a system control block controlling the functional block;

FIG. 5 is a drawing for showing correlations between common commands and intra-functional-block commands;

FIG. 13 is a diagram for showing a connection status in a case where plural functional blocks are added to the basic configuration;

FIG. 15 is a drawing for showing changes in intra-functional-block commands involved in version-upgrading of the functional block (DRC circuit);

FIG. 19 is a flowchart showing operations of the input selector to issue a common command InputNoise(x);

FIG. 20 is a drawing for showing correlations between a common command InputNoise(x) and intra-functional-block commands in the corresponding functional block;

FIG. 29 is a drawing for showing correlations between common commands and intra-functional-block commands (in which a DRC circuit has no zoom functions);

FIG. 30 is a drawing for showing correlations between common commands and intra-functional-block commands (in which the DRC circuit has zoom functions);

FIG. 34 is a flowchart showing an operation flow (in normal operation) of the control I/F in each functional block;

FIG. 35A is a flowchart showing an operation flow (at the time of system ending) of the control I/F in the system control block; and FIG. 35B is a flowchart showing an operation flow (at the time of system ending) of the control I/F in each functional block.

BEST MODE FOR CARRYING OUT THE INVENTION

Figure 6:
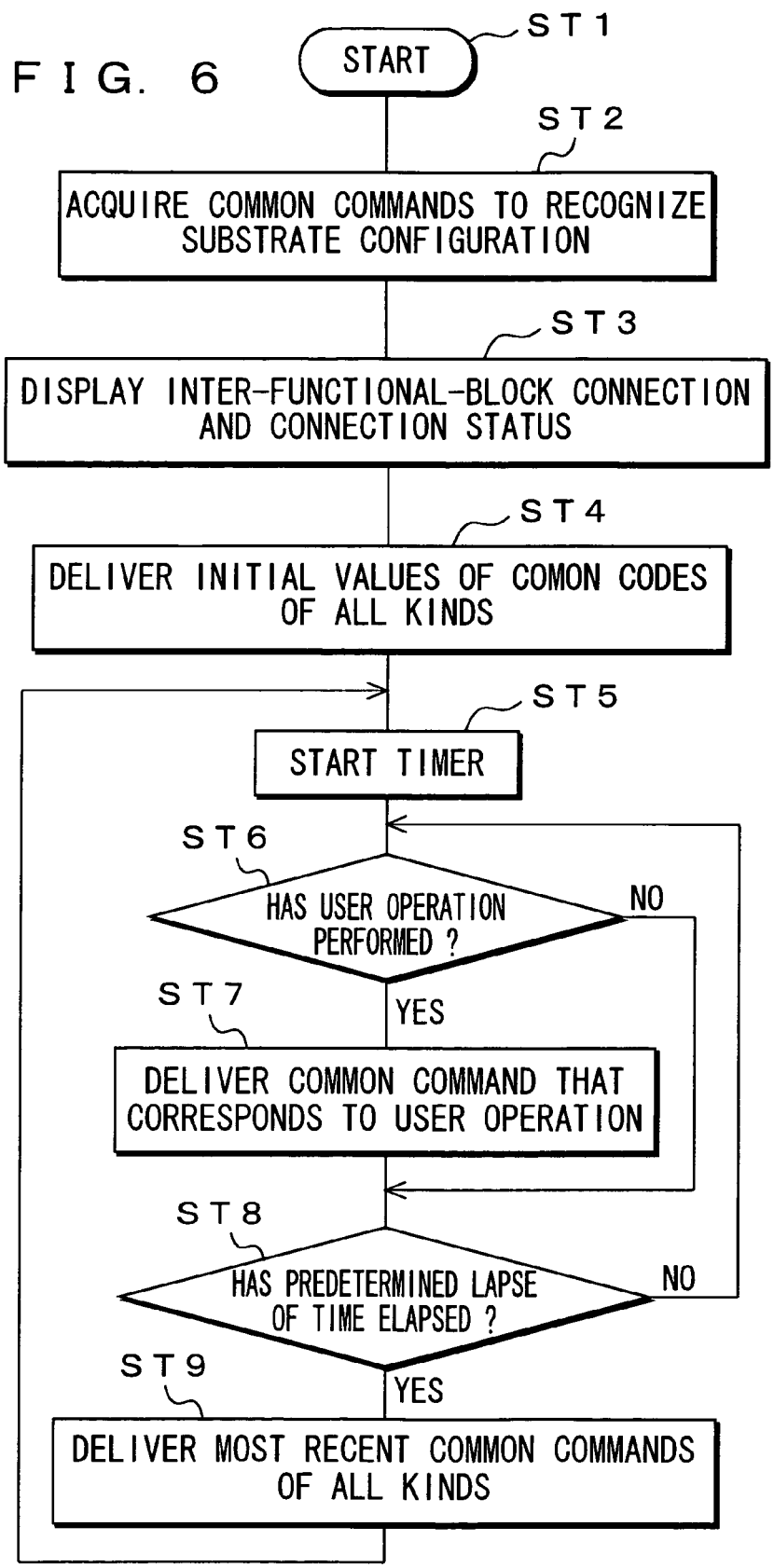
FIG. 6 is a flowchart showing control operations by the system control block.

A first embodiment of the present invention will be described below. FIG. 1 shows a configuration of an image-signal-processing apparatus 100 according to the first embodiment.

This image-signal-processing apparatus 100 has a chassis 101. The chassis 101 is provided with connectors 102a-102c and 103. The connector 102a is used as an external video input connector, specifically a connector for inputting a video signal as an external video input reproduced by a video cassette recorder (VCR), digital versatile disc (DVD), a player, etc. that are not sown. The connector 102b is used as a connector for a digital terrestrial antenna wire, to input a broadcast signal received by a digital terrestrial antenna, which is not shown. The connector 102c is used as a connector for a U/V (UHF/VHF) antenna wire, to input a broadcast signal received by a U/V antenna, which is not shown. The connector 103 is used as a connector for outputting an image signal to be supplied to a display.

Further, the chassis 101 has plural slots, five slots 104a-104e in the present embodiment, to insert a substrate as a functional block. Into the slot 104a, a U/V tuner substrate 121 (hereinafter referred to as "U/V tuner 121" simply) as functional block 1 is inserted. Into the slot 104b, a digital terrestrial tuner substrate 126 (hereinafter referred to as "digital terrestrial tuner 126" simply) as functional block 6 is inserted.

Into the slot 104c, a digital reality creation (DRC) circuit substrate 124 (hereinafter referred to as "DRC circuit 124" simply) for performing image quality improvement processing as functional block 4 is inserted. Into the slot 104d, a substrate 125 (hereinafter referred to as "panel-dedicated processing circuit 125" simply) of a panel-dedicated processing circuit such as a liquid crystal display (LCD) or a plasma display panel (PDP) as functional block 5 is inserted. Into the slot 104e, a noise removal circuit substrate 127 (hereinafter referred to as "noise removal circuit 127" simply) as functional block 7 is inserted.

Further, the chassis 101 incorporates, for example, a microcomputer, having a system control block 110 for controlling operations of the apparatus as a whole, an input selector substrate 122 (hereinafter referred to as "input selector 122" simply) as functional block 2, a signal router (matrix switch) substrate 123 (hereinafter referred to as "signal router 123" simply) as functional block 3, and a OSD circuit substrate 128 (hereinafter referred to as "OSD circuit 128" simply) as functional block 8.

It is to be noted that an operation program for this microcomputer is provided by a storage medium such as, for example, a read only memory (ROM). In this case, this storage medium can be made detachable to flexibly accommodate a change in control. Further, this storage medium can be given as a nonvolatile memory capable of writing, to rewrite contents of the operation program based on a change in control.

The following will describe functional block 120, which provides a basis for functional blocks 1-8. FIG. 2 shows a configuration of the functional block 120. This functional block 120 has a control connector 120a, an input connector 120b, and an output connector 120c. The functional block 120 further has a control interface (control I/F) 120d as a control section and a functional section 120e. A signal to be processed by the functional section 120e is received by the input connector 120b and is input via the input connector 120b to the functional section 120e. To the output connector 120c, a signal processed and output by the functional section 120e is provided.

The control connector 120a is connected to a later-described control bus 111. The control I/F 120d is connected to the control connector 120a. As described later, the control I/F 120d has storage means for storing correlations between common commands (global commands) related to one's own functional block and intra-functional-block commands (local commands) to control the functional section 120e. It is to be noted that the common commands, sometimes referred to as a broadcast type command, are used to control simultaneous broadcasting control. "Simultaneous broadcasting control" means that one or plural recipients related to one command sent from a control command sender are controlled in response to that command.

If a common command transmitted from the system control block 110 through the control bus 111 is a common command related to its own functional block, the control I/F 120d converts it into an intra-functional-block command that controls the functional section 120e, based on any of the correlations stored in the above-described storage means.

FIG. 3 shows a configuration of the control I/F 120d. This control I/F 120d has a control port 120d-1, an ROM 120d-2 as storage means, and an interpreter 120d-3 as conversion means. The ROM 120d-2 previously stores correlations between common commands related to one's own functional block and intra-functional-block commands to control the functional section 120e. The control port 120d-1 receives any common commands sent through the control bus 111 from the system control block 110. In this sense, the control port 120d-1 constitutes means for receiving the common commands.

The interpreter 120d-3 converts a common command received by the control port 120d-1, if it is related to its own functional block, into an intra-functional-block command based on the correlations stored in the ROM 120d-2 as described above and supplies this intra-functional-block command to the functional section 120e. The functional section 120e changes functions, for example, a signal path or signal processing based on this intra-functional-block command.

The ROM 120d-2 and the interpreter 120d-3 in the control interface 120d shown in this FIG. 3 constitute a structure that converts a received common command into an intra-functional-block command and can be realized by a central processing unit (CPU) and software or by a conversion table by use of a hardware sequencer.

It is to be noted that the control port 120d-1, if its functional block 120 constitutes the image-signal-processing apparatus 100, reads any common commands stored in the ROM120d-2 upon, for example, power application and transmits them via the control bus 111 to the system control block 110. With this, the system control block 110 can acquire the common commands related to all the functional blocks 120 that constitute the image-signal-processing apparatus 100. It is to be noted that when one's own functional block 120 is in the chassis 101 or inserted into the corresponding slot, this functional block 120 is supposed to constitute the image-signal-processing apparatus 100.

FIG. 4 shows a structure of controlling the functional block 120. That is, the system control block 110 sends a common command to the functional block 120 via the control bus 111. If this transmitted common command relates to its own functional block, the control I/F 120d in the functional block 120 converts this common command into an intra-functional-block command and supplies it to the functional section 120e.

In such a manner, if a common command transmitted from the system control block 110 relates to its own functional block, the functional block 120 converts it into an intra-functional-block command to control the functional section 120e. This enables the functional block 120 to operate adaptively in response to a common command sent from the system control block 110.

The control connectors 120a for the above-described input selector 122 (as the functional block 2), signal router 123 (as the functional block 3), and the OSD circuit 128 (as the functional block 8) are respectively connected to the system control block 110 via the control bus 111.

The input selector 122 (as the functional block 2) selects any one of three inputs and outputs it. Therefore, this input selector 122 has three input terminals for the input connector 120b and one output terminal for the output connector 120c.

Further, the signal router 123 (as the functional block 3) constitutes, for example, a four-by-four matrix switch. Therefore, this signal router 123 has four input terminals for the input connector 120b and four output terminals for the output connector 120c.

Further, the OSD circuit 128 (as the functional block 8) selectively uses image signals from the input selector 122 and the signal router 123. Therefore, this OSD circuit 128 has two input terminals for the input connector 120b and one output terminal for the output connector 120c.

Although not shown, the above-described slots 104a-104e are equipped with a control connector, an input connector, and an output connector, which are not shown, to be connected respectively to the control connector 120a, the input connector 120b, and the output connector 120c of the functional blocks 120 (U/V tuner 121, the digital terrestrial tuner 126, the DRC circuit 124, the panel-dedicated processing circuit 125, and the noise removal circuit 127) when these blocks are inserted. The control connectors of these slots 104a-104e are respectively connected to the control bus 111. With this, the control connectors 120a of the functional blocks 120 inserted into the slots 104a-104e respectively are connected to the system control block 110 via the control bus 111.

Further, the connector 102a is connected to a third input terminal of the input connector 120b of the input selector 122 (as the functional block 2). The connector 102b is connected to an input connector of the slot 104b, whose output connector is connected to a second input terminal of the input connector 120b of the input selector 122. The connector 102c is connected to an input connector of the slot 104a, whose output connector is connected to a first input terminal of the input connector 120b of the input selector 122. Further, one output terminal of the output connector 120c of the input selector 122 is connected to a first input terminal of the input connector 120b of the signal router 123 (as the functional block 3) and a second input terminal of the input connector 120b of the OSD circuit 128 (as the functional block 8).

Further, first through third output terminals of the output connector 120c of the signal router 123 are respectively connected to input connectors of the slots 104c-104e, whose output connectors are respectively connected to second through fourth input terminals of the input connector 120b of the signal router 123.

Further, a fourth output terminal of the output connector 120c of the signal router 123 is connected to a first input terminal of the input connector 120b of the OSD circuit 128, while one output terminal of the output connector 120c of this OSD circuit 128 is connected to the connector 103.

As described above, the functional block 120 shown in FIG. 2 has provided as a basis for the functional blocks 1-8. The following will further describe the functional blocks 1-8 individually.

In the U/V tuner 121 (as the functional block 1), the functional section 120e performs channel selection processing etc. on a broadcast signal that is input through the input connector 120b and received by the U/V antenna and it outputs a predetermined channel of image signal to the output connector 120c.

As shown in FIG. 5, the ROM 120d-2 in the control I/F 120d of this U/V tuner 121 stores common commands ch(1)-ch(12) meaning channel numbers 1-12 and intra-functional-block commands ch(1-12) meaning channel switchover to any channel numbers 1-12 in a condition where they are correlated with each other.

When a user operates a remote-control transmitter 112 or an operation section 113 in the chassis 101 to select any of the channel numbers 1-12, the common commands ch(1)-ch(12) are issued from the system control block 110 and delivered to the control bus 111. In this case, when these common commands ch(1)-ch(12) are received at the control port 120d-1, the interpreter 120d-3 in the control I/F 120d of the U/V tuner 121 converts these common commands ch(1)-ch(12) into intra-functional-block commands ch(1-12) respectively based on the correlations stored in the ROM 120d-2. With this, the U/V tuner 121 enters a condition where channels of channel numbers 1-12 have been selected.

When delivering any one of common commands ch(1)-ch(12) to the control bus 111, the system control block 110 updates common commands stored in a last memory region for channel numbers in a nonvolatile memory (not shown) built in it with these common commands to be delivered. With this, the common commands stored in this channel-number-dedicated last memory region at the time of power application are delivered as an initial value from the system control block 110 to the control bus 111, so that a channel that has been selected at the time of power-off is automatically selected by the U/V tuner 121.

In the input selector 122 (as the functional block 2), the functional section 120e selectively outputs to one of the output terminals of the output connector 120c any one of the first to the third image signals that are input respectively to the three input terminals of the input connector 120b. In this case, the first input terminal is supplied with an image signal (input 1) output from the U/V tuner 121 (as the functional block 1). The second input terminal is supplied with an image signal (input 2) output from the digital terrestrial tuner 126 (as the functional block 6). The third input terminal is supplied with an image signal (input 3) as an external video input that is applied to the connector 102a. The image signal provided to the output terminal is supplied to the signal router 123 (as the functional block 3) as well as to the OSD circuit 128.

As shown in FIG. 5, in the ROM 120d-2 of the control I/F 120d of this input selector 122, common commands in(1)-in(3) meaning inputs 1-3 and intra-functional-block commands in(1-3) meaning input switchover to inputs 1-3 are stored in a condition where they are correlated with each other. It is to be noted that input 1 refers to an image signal which is output from the U/V tuner 121 and applied to the first input terminal thereof. Input 2 refers to an image signal which is output from the digital terrestrial tuner 126 and applied to the second input terminal thereof. Input 3 refers to an image signal as an external video input which is applied to the third input terminal thereof.

When the user operates the remote-control transmitter 112 or the operation section 113 in the chassis 101 to select inputs 1-3 respectively, the common commands in(1)-in(3) are delivered from the system control block 110 to the control bus 111. When these common commands in(1)-in(3) are received at the control port 120d-1, the interpreter 120d-3 in the control I/F 120d of the input selector 122 converts these common commands in(1)-in(3) into intra-functional-block commands in(1-3) respectively based on the correlations stored in the ROM 120d-2. With this, the input selector 122 enters a condition where inputs 1-3 have been selected.

When delivering any one of the common commands in(1)-in(3) to the control bus 111, the system control block 110 updates common commands stored in a last memory region for input selections in the nonvolatile memory (not shown) built in it with these common commands to be delivered. With this, the common commands stored in this input selection-dedicated last memory region at the time of power application are delivered as an initial value from the system control block 110 to the control bus 111, so that an input that has been selected at the time of power-off is automatically selected by the input selector 122.

In the signal router 123 (as the functional block 3), the functional section 120e selectively outputs first through fourth image signals, which are input to the four input terminals of the input connector 120b, to the first through fourth output terminals of the output connector 120c.

In this case, the first input terminal is supplied with an image signal (input 1=i1) output from the input selector 122 (as the functional block 2). The second input terminal is supplied with an image signal (input 2=i2) output from the DRC circuit 124 (as the functional block 4). The third input terminal is supplied with an image signal (input 3=i3) output from the panel-dedicated processing circuit 125 (as the functional block 5). The fourth input terminal is supplied with an image signal (input 4=i4) output from the noise removal circuit 127 (as the functional block 7).

Further, the image signal (output 1=o1) output to the first output terminal is supplied to the DRC circuit 124 (as the functional block 4). The image signal (output 2=o2) output to the second output terminal is supplied to the panel-dedicated processing circuit 125 (as the functional block 5). The image signal (output 3=o3) output to the third output terminal is supplied to the noise removal circuit 127. The image signal (output 4=o4) output to the fourth output terminal is supplied to the OSD circuit 128.

As shown in FIG. 5, the ROM 120d-2 in the control I/F 120d of this signal router 123 (as the functional block 3) stores common commands InitializeConnect(1/2/3/4/5) meaning inter-functional-block connections 1-5 and intra-functional-block commands, route(1/2/3), meaning inter-processing-substrate connection switchover in a condition where they are correlated with each other.

It is to be noted that the common command InitializeConnect(1) means a first configuration (basic configuration) in which the U/V tuner 112 (as the functional block 1) is inserted into the slot 104a and the DRC circuit 124 (as the functional block 4) is inserted into the slot 104c. This common command InitializeConnect(1) is correlated with intra-functional-block command, route(1). This command, route(1), is used to control the functional section 120e so that it may enter a first state where the first input terminal is connected to the first output terminal and the second input terminal is connected to the fourth output terminal.

Further, the common command InitializeConnect(2) means a second configuration in which, in the above-described first configuration, further the digital terrestrial tuner 126 (as the functional block 6) is inserted into the slot 104b. This common command InitializeConnect(2) is also correlated with the intra-functional-block command, route(1).

Further, the common command InitializeConnect(3) means a third configuration in which, in the above-described first configuration, further the panel-dedicated processing circuit 125 (as the functional block 5) is inserted into the slot 104d. This common command InitializeConnect(3) is correlated with intra-functional-block command, route(2). This command, route(2), is used to control the functional section 120e so that it may enter a second state where the first input terminal is connected to the first output terminal, the second input terminal is connected to the second output terminal, and the third input terminal is connected to the fourth output terminal.

Further, the common command InitializeConnect(4) means a fourth configuration in which, in the above-described first configuration, further the panel-dedicated processing circuit 125 (as the functional block 5) is inserted into the slot 104d and the noise removal circuit 127 (as the functional block 7) is inserted into the slot 104e. This common command InitializeConnect(4) is correlated with intra-functional-block command, route(3). This command, route(3), is used to control the functional section 120e so that it may enter a third state where the first input terminal is connected to the third output terminal, the fourth input terminal is connected to the first output terminal, the second input terminal is connected to the second output terminal, and the third input terminal is connected to the fourth output terminal.

Further, the common command InitializeConnect(5) means a fifth configuration in which, in the above-described first configuration, further the digital terrestrial tuner 126 (as the functional block 6) is inserted into the slot 104b, the panel-dedicated processing circuit 125 (as the functional block 5) is inserted into the slot 104d, and the noise removal circuit 127 (as the functional block 7) is inserted into the slot 104e. This common command InitializeConnect(5) is correlated with intra-functional-block command, route(3).

It is assumed that the image-signal-processing apparatus 100 is used so as to have any one of these first to fifth configurations. Upon power application, as described later, when acquiring via the control bus 111 a common command related to each of the functional block of the image-signal-processing apparatus 100 from each of these functional blocks, the system control block 110 acquires a substrate ID through the control bus 111 from each of these functional blocks of the image-signal-processing apparatus 100, to recognize also which one of the above-described first through fifth configurations the image-signal-processing apparatus 100 has.

When the system control block 110 recognizes that it is in the first through fifth configurations, the common commands InitializeConnect(1/2/3/4/5) are delivered from this system control block 110 to the control bus 111, respectively. When these common commands InitializeConnect(1/2/3/4/5) are received at the control port 120d-1, the interpreter 120d-3 in the control I/F 120d of the signal router 120d-1 converts these common commands InitializeConnect(1/2/3/4/5), respectively, into intra-functional-block commands, route(1/2/3), based on the correlations stored in the ROM 120d-2. With this, the functional section 120e in the signal router 123 enters the first through third states.

In the DRC circuit 124 (as the functional block 4), the functional section 120e performs DRC processing (image improvement processing) to convert a standard definition (SD) signal, which is an input image signal from the input connector 120b, into a high definition television (HD) signal and to output this HD signal as an output image signal to the output connector 120c.

When acquiring pixel data at a target position in the HD signal, for example, the functional section 120e in this DRC circuit 124 extracts from the SD signal plural items of pixel data that are located around the target position in this HD signal, detects a class to which the pixel data at the target position in the HD signal belongs based on the plural items of pixel data, and uses coefficient data of an estimate equation corresponding to this class to thereby obtain the pixel data at the target position in the HD signal based on this estimate equation (see Japanese Patent Application Publication No. 2001-238185). The user can arbitrarily adjust a resolution and a noise removal ratio for the HD signal. In this case, as coefficient data of the estimate equation, such data as to correspond to volume values of a resolution axis and a noise axis manipulated by the user is used.

Further, the functional section 120e in the DRC circuit 124 is provided with a zoom function to continuously change an expansion ratio of an image. In this case, when obtaining pixel data of an output image signal based on pixel data of an input image signal, coefficient data for an estimate equation corresponding to each phase of a pixel of the output image signal against a pixel of the input image signal is stored in a memory beforehand, which coefficient data is used later to obtain the pixel data of the output image signal based on the estimate equation.

It is to be noted that by providing such a configuration as to generate coefficient data to be used in an estimate equation from coefficient seed data based on phase information, it is possible to eliminate a necessity of a memory to store beforehand a vast amount of coefficient data in order to perform conversion into a variety of expansion ratios (see Japanese Patent Application Publication No. 2002-196737 and Japanese Patent Application Publication No. 2002-362666). The user can arbitrarily adjust a zoom ratio (expansion ratio of an image) and a zoom center position (horizontal x-coordinate and vertical y-coordinate).

The ROM 120d-2 in the control I/F 120d of the DRC circuit 124 stores common commands DRCvol(resolutionVal, noiseVal) meaning adjustment of a DRC resolution axis and a noise axis and intra-functional-block commands, volume (resolutionVal,noiseVal), meaning substitution of DRC (resolution axis and noise axis) volume values in a condition where they are correlated with each other.

The common commands DRCvol(resolutionVal,noiseVal) are delivered from the system control block 110 to the control bus 111 when the user operates the remote-control transmitter 112 or the operation section 113 in the chassis 101 to change volume values of the resolution axis and the noise axis. It is to be noted that "resolutionVal" indicates a volume value of the resolution axis and "noiseVal" indicates a volume value of the noise axis.

In this case, when the control port 120d-1 receives the common command DRCvol(resolutionVal,noiseVal), the interpreter 120d-3 in the control I/F 120d of the DRC circuit 124 converts this common command DRCvol(resolutionVal, noiseVal) into intra-functional-block command, volume (resolutionVal,noiseVal), based on the correlations stored in the ROM 120d-2. With this, the DRC circuit 124 enters a state where a resolution and a noise removal ratio that correspond to volume values of the resolution axis and the noise axis due to manipulation of the user are selected.

When delivering the common command DRCvol(resolutionVal,noiseVal) to the control bus 111, the system control block 110 updates common commands stored in a last memory region for volume values in a nonvolatile memory (not shown) built in it with the common command to be delivered. With this, the common commands stored in this volume-value-dedicated last memory region at the time of power application are delivered as an initial value from the system control block 110 to the control bus 111, so that a resolution and a noise removal ratio that has been selected at the time of power-off are automatically selected by the DRC circuit 124.

As shown in FIG. 5, the ROM 120d-2 in the control I/F 120d of the DRC circuit 124 stores common commands DRCzoomExec(on/off) meaning switchover of DRC zoom processing and intra-functional-block commands, zoom(IniRatio/1, InitHol/0, Initver/0), meaning substitution of DRC zoom initial values in a condition where they are correlated with each other.

The common commands DRCzoomExec(on/off) are delivered from the system control block 110 to the control bus 111 when the user operates the remote-control transmitter 112 or the operation section 113 in the chassis 101 to turn ON/OFF the DRC zoom processing.

The common command DRCzoomExec(on) means to switch the DRC zoom processing from an off-state to an on-state and is correlated with intra-functional-block command, zoom(InitRatio, InitHol, Initver). This command zoom(InitRatio, InitHol, Initver) is used to control the functional section 120e so that it may execute the DTC zoom processing having initial values of the zoom ratio and the zoom center position.

The common command DRCzoomExec(off) means to switch the DRC zoom processing from the on-state to the off-state and is correlated with intra-functional-block command zoom(1, 0, 0). This command zoom(1, 0, 0) is used to control the functional section 120e so that it may execute the DTC zoom processing having a zoom ratio of 1 and zoom center position of (0, 0).

In this case, when the control port 120*d*-1 receives the common command DRCzoomExec(on/off), the interpreter 120*d*-3 in the control I/F 120*d* of the DRC circuit 124 converts this common command DRCzoomExec(on/off) into intra-functional-block command, zoom(InitRatio/1, InitHol/0, Initver/0) based on the correlations stored in the ROM120*d*-2. With this, the DRC circuit 124 enters a state where the on-state or the off-state of the DRC zoom processing is selected.

It is to be noted that upon power application, the common command DRCzoomExec(off) is delivered from the system control block 110 to the control bus 111. With this, upon power application, the off-state of the DRC zoom processing is automatically selected in the DRC circuit 124.

Further, as shown in FIG. 5, the ROM 120*d*-2 in the control I/F 120*d* of the DRC circuit 124 stores common commands DRCzoom(ratioVal, horizontalVal, verticalVal) meaning adjustment of DRC zoom ratio and zoom center position and intra-functional-block commands, zoom(ratioVal, horizontalVal, verticalVal) meaning substitution of DRC zoom ratio and zoom center position in a condition where they are correlated with each other.

The common commands DRCzoom(ratioVal, horizontalVal, verticalVal) are delivered from the system control block 110 to the control bus 111 when the user operates the remote-control transmitter 112 or the operation section 113 in the chassis 101 to change a zoom ratio and a zoom center position. In this case, "ratioVal" indicates a zoom ratio, "horizontalVal" indicates a horizontal x-coordinate of a zoom center position, and "verticalVal" indicates a vertical y-coordinate of the zoom center position.

In this case, when the control port 120*d*-1 receives the common command DRCzoom(ratioVal, horizontalVal, verticalVal), the interpreter 120*d*-3 in the control I/F 120*d* of the DRC circuit 124 converts this common command DRCzoom(ratioVal, horizontalVal, verticalVal) into intra-functional-block command, zoom(ratioVal, horizontalVal, verticalVal) based on the correlations stored in the ROM 120*d*-2. With this, the DRC circuit 124 enters a state where a zoom ratio and a zoom center position given by manipulation of the user are selected.

It is to be noted that upon power application, the common command DRCzoom(InitRatio, InitHol, Initver) is delivered from the system control block 110 to the control bus 111. In this case, "InitRatio" indicates an initial value of the zoom ratio, "InitHol" indicates an initial value of a horizontal x-coordinate of a zoom center position, and "Initver" indicates an initial value of a vertical y-coordinate of the zoom center position. With this, upon power application, the initial values of the zoom ratio and the zoom center position are automatically selected in the DRC circuit 124.

In the panel-dedicated processing circuit 125 (as the functional block 5), the functional section 120*e* performs on an image signal input by the input connector 120*b* any processing, which is required when displaying an image due to this image signal on a flat panel display such as a liquid crystal display (LCD) or a plasma display panel (PDP), such as luminosity or color adjustment, conversion of the number of horizontal or vertical pixels, or transfer from the interlace mode to the progressive mode and outputs the post-processing image signal to the output connector 120*c*.

This panel-dedicated processing circuit 125, once connected to any other functional block by the signal router 123 (s the functional block 3) upon power application, performs simply fixed processing. This panel-dedicated processing circuit 125 also has the control I/F 120*d* because of taking into account the case where a local command for initialization may be sent from the system control block 110.

In the digital terrestrial tuner 126 (as the functional block 6), the functional section 120*e* performs channel selection processing etc. on a broadcast signal, which is input by the input connector 120*b* and received through the digital terrestrial antenna, and outputs to a predetermined channel of image signal to the output connector 120*c*.

This digital terrestrial tuner 126 has an inherent operation user interface. Therefore, the system control block 110 will not deliver a common command related to this digital terrestrial tuner 126 to the control bus 111. That is, as for this digital terrestrial tuner 126, the system control block 110 delivers a local command for this digital terrestrial tuner 126 to the control bus 111.

In the noise removal circuit 127 (as the functional block 7), the functional section 120*e* performs noise suppression processing on an image signal input by the input connector 120*b* and outputs the post-processing image signal to the output connector 120*c*. This noise removal circuit 127 can adjust a noise suppression ratio.

As shown in FIG. 5, the ROM 120*d*-2 in the control I/F 120*d* of this noise removal circuit 127 stores the above-described common commands DRCvol(resolutionVal, noiseVal) meaning adjustment of the DRC resolution axis and the noise axis and intra-functional-block commands, noiseSuppress(noiseVal), meaning substitution of a value of a noise suppression ratio (noise suppression value) in a condition where they are correlated with each other. It is to be noted that "noiseVal" indicates a volume value on the noise axis as described above.

In this case, when the control port 120*d*-1 receives the common commands DRCvol(resolutionVal,noiseVal), the interpreter 120*d*-3 in the control I/F 120*d* of the noise removal circuit 127 converts this common commands DRCvol(resolutionVal,noiseVal) into the intra-functional-block commands, noiseSuppress(noiseVal), based on the correlations stored in ROM 120*d*-2. With this, the noise removal circuit 127 enters a state for suppressing noise at a suppression ratio that corresponds to a volume value "noiseVal" on the noise axis.

In the OSD circuit 128 (as the functional block 8), the functional section 120*e* has a function to generate an image signal for a child screen based on an image signal, which is input by the second input terminal of the input connector 120*b* and received from the input selector 122, a function to generate a display signal that displays characters, figures, etc. on the screen, a function to select either an image signal received from the input selector 122 or an image signal, which is input by the first input terminal of the input connector 120*b* and received from the signal router 123, combine this selected image signal with the above-described child-screen image signal or display signal to acquire an output image signal, and output this output image signal to the output connector 120*c*, and the like.

As shown in FIG. 5, the ROM 120*d*-2 in the control I/F 120*d* of this OSD circuit 128 stores the above-described common commands ch(1)-ch(12) meaning channel numbers 1-12, respectively, and intra-functional-block commands writeInputUvch(1-12) meaning channel display for channel numbers 1-12 in a condition where they are correlated with each other.

When the control port 120*d*-1 receives these common commands ch(1)-ch(12), the interpreter 120*d*-3 in the control I/F 120*d* of the OSD circuit 128 converts these common command ch(1)-ch(12) into intra-functional-block command writeInputuvch(1-12) respectively based on the correlations stored in the ROM 120*d*-2. With this, the OSD circuit 128 enters a state for generating a display signal to display channels of channel numbers 1-12 and outputting an output image signal combined with this display signal.

Further, as shown in FIG. 5, the ROM 120*d*-2 in the control I/F 120*d* of the OSD circuit 128 stores the above-described common commands in(1)-in(3) meaning the above-mentioned inputs 1-3 and intra-functional-block commands writeInput(1-3) meaning input display of the inputs 1-3 in a condition where they are correlated with each other.

When the control port 120*d*-1 receives these common commands in(1)-in(3), the interpreter 120*d*-3 in the control I/F 120*d* of the OSD circuit 128 converts these common commands in(1)-in(3) into intra-functional-block command writeInput(1-3), respectively, based on the correlations stored in the ROM 120*d*-2. With this, the OSD circuit 128 enters a state for generating a display signal to display the inputs 1-3 and outputting an output image signal combined with this display signal.

Further, as shown in FIG. 5, the ROM 120*d*-2 in the control I/F 120*d* of the OSD circuit 128 stores the above-described common commands InitializeConnect(1/2/3/4/5) meaning inter-functional-block connections 1-5, respectively, and intra-functional-block commands, writeRoute(1/2/3/4/5), meaning display of connection status, respectively, in a condition where they are correlated with each other. These intra-functional-block commands, writeRoute(1/2/3/4/5), are respectively used to control the functional section 120*e* so that it may enter a state for displaying that the image-signal-processing apparatus 100 is any of the above-described first through fifth configurations.

When the control port 120*d*-1 receives the common commands InitializeConnect(1/2/3/4/5), the interpreter 120*d*-3 in the control I/F 120*d* of the OSD circuit 128 converts these common commands InitializeConnect(1/2/3/4/5) into intra-functional-block commands, writeRoute(1/2/3/4/5), respectively, based on the correlations stored in the ROM 120*d*-2. With this, the OSD circuit 128 enters a state for generating a display signal that provides a display such that the apparatus 100 is any of the first through fifth configurations respectively and outputting an output image signal combined with this display signal.

Further, as shown in FIG. 5, the ROM 120*d*-2 in the control I/F 120*d* of the OSD circuit 128 stores common commands DRCvolExec(on/off) meaning switchover of the DRC volume processing and intra-functional-block commands, writeProcessVol(on/off), meaning DRC volume processing display, intra-functional-block commands, displayInput(in1/in2), meaning switchover of a child-screen input source, and intra-functional-block commands, displaySize(in1,size1)/displaySize(in2,size1), meaning image sizes in a condition where they are correlated with each other.

The common commands DRCvolExec(on/off) are delivered from the system control block 110 to the control bus 111 when the user operates the remote-control transmitter 112 or the operation section 113 in the chassis 101 to turn on/off the DRC volume processing.

The common command DRCvolExec(on) means to switch the volume processing from the off-state to the on-state and is correlated with intra-block-functional commands, writeProcessVol(on), displayInput(in1), and displaySize(in1,size1).

The common command writeProcessVol(on) is used to control the functional section 120*e* to generate a display signal that provides a display such that the DRC volume processing is in the on-state and output an output image signal combined with this display signal.

The command displayInput(in1) is used to control the functional section 120*e* so that an image signal (which has already undergone the DRC volume processing) received from the signal router 123 and input by the first input terminal of the input connector 120*b* may be used as an input source. The command displaySize(in1,size1) is used to control the functional section 120*e* so that an input-source image signal may be directly output as an output image signal without undergoing contraction processing.

The common command DRCvolExec(off) means to switch the DRC volume processing from the on-state to the off-state and is correlated with intra-functional-block commands, writeProcessVol(off), displayInput(in2), and displaySize(in2,size1). The command, writeProcessVol(off), is used to control the functional section 120*e* to generate a display signal that provides a display such that the DRC volume processing is in the off-state and output an output image signal combined with this display signal.

The command displayInput(in2) is used to control the functional section 120*e* so that an image signal (which has already undergone the DRC volume processing), which is received from the input selector 122 and is input by the second input terminal of the input connector 120*b*, may be used as an input source. The command displaySize(in2,size1) is used to control the functional section 120*e* so that an input-source image signal may be directly output as an output image signal without undergoing contraction processing.

In this case, when the control port 120*d*-1 receives the common command DRCvolExec(on/off), the interpreter 120*d*-3 in the control I/F 120*d* of the OSD circuit 128 converts this common command DRCvolExec(on/off) into intra-functional-block commands, writeProcessVol(on/off), displayInput(in1/in2), and displaySize(in1,size1)/displaySize(in2,size1) based on the correlations stored in the ROM 120*d*-2.

With this, the OSD circuit 128 enters a state for displaying the on-state or the off-state of the DRC volume processing, outputting an image signal either having or not having undergone the DRC volume processing, and directly outputting an image signal as an input source without performing contraction processing on it.

It is to be noted that upon power application, the common command DRCvolExec(on) is delivered as an initial value from the system control block 110 to the control bus 111. With this, upon power application, the OSD circuit 128 enters a state for displaying the on-state of the DRC volume processing, outputting an image signal that has undergone the DRC volume processing, and outputting the image signal directly as an input source without performing the contraction processing on it.

Further, as shown in FIG. 5, the ROM 120*d*-2 in the control I/F 120*d* of this OSD circuit 128 stores the above-described common command DRCvol(resolusionVal,noiseVal) meaning adjustment of the DRC resolution axis and the noise axis and intra-functional-block command, writeProcessDRCvol (resolutionVal,noiseVal), meaning display of DRC volume values in a condition where they are correlated with each other.

When the control port 120*d*-1 receives the common commands DRCvol(resolusionVal,noiseVal), the interpreter 120*d*-3 in the control I/F 120*d* of the OSD circuit 128 converts this common command DRCvol(resolusionVal,noiseVal) into intra-functional-block command, writeProcessDRCvol (resolutionVal,noiseVal). With this, the OSD circuit 128 enters a state for generating a display signal that provides a display of volume value, "resolutionVal" on the resolution axis and volume value, "NoiseVal" on the noise axis and outputting an output image signal combined with this display signal.

Further, as shown in FIG. 5, the ROM 120*d*-2 in the control I/F 120*d* of this OSD circuit 128 stores the above-described common command DRCzoomExec(on/off) meaning switchover of the DRC zoom processing and intra-functional-block command, writeProcessZoom(on/off) meaning display of the DRC zoom processing, intra-functional-block command, displayInput(in1, in2/in1 or in2) meaning switchover of a child-screen input source, intra-functional-block commands, displaySize(in1, size1), displaySize (in2, size0.25)/displaySize(in1 or in2, size1) meaning an image size, intra-functional-block command, writeZoomFrame(InitRatio, InitHol, Initver/off) meaning display of a zoom frame on a child screen, and intra-functional-block command, writeProcessDRCzoom(InitRatio, InitHol, InitVer/off) meaning display of a zoom center position in a condition where they are correlated with each other.

The common command DRCzoomExec(on) means to switch the DRC zoom processing from the off-state to the on-state and this common command DRCzoomExec(on) is correlated with intra-functional-block commands, writeProcessZoom(on), displayInput(in1,in2), displaySize(in1, size1), displaySize(in2,size0.25), writeZoomFrame(InitRatio, InitHol, Initver), and writeProcessDRCzoom(InitRatio, InitHol, Initver).

The command, writeProcessZoom(on), is used to control the functional section 120*e* to generate a display signal that provides a display such that DRC zoom processing is in the on-state and to combine this display signal into an output image signal. The command, displayInput(in1,in2), is used to control the functional section 120*e* to use as an input source an image signal (which has already undergone the DRC zoom processing) that is received from the signal router 123 and input by the first input terminal of the input connector 120*b* and an image signal (which is not undergone DRC volume processing) that is received from the input selector 122 and input by the second input terminal of the input connector 120*b*.

The command, displaySize(in1,size1), displaySize (in2, size0.25) is used to control the functional section 120*e* to obtain an output image signal by combining an image signal (which has already undergone DRC zoom processing) that is received from the signal router 123 and input by the first input terminal of the input connector 120*b* with a child-screen image signal obtained by performing 0.25-fold contraction processing on an image signal (which is not undergone DRC volume processing) that is received from the input selector 122 and input by the second input terminal of the input connector 120*b*.

The command, writeZoomFrame(InitRatio, InitHol, Initver) is used to control the functional section 120*e* to generate a display signal that displays on a child screen a square frame that corresponds to a portion which has undergone zoom processing by the DRC circuit 124 based on a zoom ratio initial value "initRatio" and zoom center position initial values "initHol" and "initver" and to combine this display signal into an output image signal.

The command, writeProcessDRCzoom(InitRatio, InitHol, InitVer) is used to control the functional section 120*e* to generate a display signal that indicates a zoom ratio initial value "initRatio" and zoom center position values "initHol" and "initVer" and to combine this display signal into an output image signal.

The common command, DRCzoomExec(off), means to switch the DRC zoom processing from the on-state to the off-state and is correlated with intra-block-functional commands, writeProcessZoom(off), displayInput(in1 or in2), displaySize(in1 or in2,size1), writeZoomFrame(off), and writeProcessDRCzoom(off).

The command, writeProcessZoom(off), is used to control the functional section 120*e* to generate a display signal that provides a display such that the DRC zoom processing is in the off-state and to combine this display signal into an output image signal. The command, displayInput(in1 or in2) is used to control the functional section 120*e* to use as an input source an image signal that is received from the signal router 123 and input by the first input terminal of the input connector 120*b* if the DRC volume processing is in the on-state or to use as an input source an image signal that is received from the input selector 122 and input by the second input terminal of the input connector 120*b* if the DRC volume processing is in the off-state.

The command, displaySize(in1 or in2,size1) is used to control the functional section 120*e* to give directly as an output image signal an image signal, without performing contraction processing on it, that is received from the signal router 123 and input by the first input terminal of the input connector 120*b* if the DRC volume processing is in the on-state or to give directly as an output image signal an image signal that is received from the input selector 122 and input by the second input terminal of the input connector 120*b* if the DRC volume processing is in the off-state.

The command, writeZoomFrame(off) is used to control the functional section 120*e* to stop generating a display signal that displays on a child screen a square frame that corresponds to a portion which has undergone zoom processing and combining this display signal into an output image signal. The command, writeProcessDRCzoom(off) is used to control the functional section 120*e* to stop generating a display signal that indicates a zoom ratio and a zoom center position and combining it into an output image signal.

When the control port 120*d*-1 receives DRCzoomExec(on/off), the interpreter 120*d*-3 in the control I/F 120*d* of the OSD circuit 128 converts this common command DRCzoomExec (on/off) into intra-functional-block commands, displayInput (in1, in2/in1 or in2), displaySize(in1,size1), displaySize(in2, size0.25)/displaySize(in1 or in2,size1), writeZoomFrame (InitRatio, InitHol, InitVer/off) and writeProcessDRCzoom (InitRatio, InitHo, InitVer/off) based on the correlations stored in the ROM 120*d*-2.

With this, the OSD circuit 128 enters a state for displaying the on-state or off-state of the DRC zoom processing, outputting an image signal which has undergone or has not undergone the DRC zoom processing, and, if the DRC zoom processing is to be performed, displaying a child screen which displays an entirety, and displaying a square frame which indicates a zoom processing portion on this child screen as well as a zoom ratio and a zoom center position.

Further, as shown in FIG. 5, the ROM 120*d*-2 in the control I/F 120*d* of this OSD circuit 128 stores the above-described common commands DRCzoom(ratioVal, horizontalVal, verticalVal) meaning adjustment of DRC zoom ratios and zoom center positions and intra-functional-block commands, writeZoomFrame(ratioVal, horizontalVal, verticalVal) meaning display of a zoom frame on a child screen and intra-functional-block commands, writeProcessDRCzoom(ratioVal, horizontalVal, verticalVal) meaning display of DRC zoom ratios and zoom center positions in a condition where they are correlated with each other.

The command, writeZoomFrame(ratioVal, horizontalVal, verticalVal) is used to control the functional section 120*e* to generate a display signal that displays on a child screen a square frame that corresponds to a portion that has undergone zoom processing by the DRC circuit 124 based on zoom ratio "ratioVal" and zoom center positions "horizontalVal" and "verticalVal" and to combine this display signal into an output image signal.

The command, writeProcessDRCzoom(ratioVal, horizontalVal, verticalVal) is used to control the functional section 120e to generate a display signal that indicates zoom ratio "ratioVal" and zoom center positions "horizontalVal" and "verticalVal" and to combine this display signal into an output image signal.

When the control port 120d-1 receives the common commands, DRCzoom(ratioVal, horizontalVal, verticalVal), the interpreter 120d-3 in the control I/F 120d of the OSD circuit 128 converts the common command DRCzoom(ratioVal, horizontalVal, verticalVal) into intra-functional-block commands, writeZoomFrame(ratioVal, horizontalVal, verticalVal) and writeProcessDRCzoom(ratioVal, horizontalVal, verticalVal) based on the correlations stored in the ROM 120d-2. With this, the OSD circuit 128 enters a state for generating a display signal that indicates a zoom ratio and zoom center positions, generating as well a display signal that displays on a child screen a square frame that corresponds to a portion which has already undergone zoom processing, and outputting an output image signal combined with these display signals.

The following will describe operations of the image-signal-processing apparatus 100 shown in FIG. 1. The description is made with reference to FIG. 6 that shows a flowchart of control operations by the system control block 110.

When power is applied at step ST1, the system control block 110 starts control operations to acquire through the control bus 111 common commands stored in the ROMs120d-2 in the control I/Fs 120d of the functional blocks 2, 3, and 8 as well as the other functional blocks 120 inserted into the slots 104a-104e.

With this, the system control block 110 can have common commands related to all the functional blocks 120 that constitute the image-signal-processing apparatus 100. Simultaneously, the system control block 110 acquires a substrate ID from each of the functional blocks 120 of the processing apparatus 100, to recognize that the apparatus 100 is any one of the above-described first through fifth configurations.

Next, at step ST3, the system control block 110 delivers to the control bus 111 any one of the common commands InitializeConnect(1/2/3/4/5) meaning inter-functional-block connections 1-5 based on the above-described configuration recognized at the step ST2. The common commands relate to the signal router 123 (as the functional block 3) and the OSD circuit 128 (as the functional block 8) (see FIG. 5).

When the control port 120d-1 receives these common commands, the interpreter 120d-3 in the control I/F 120d of the signal router 123 converts these common commands into any intra-functional-block commands meaning inter-processing-substrate connection switchover based on the correlations stored in the ROM 120d-2. With this, the signal router 123 enters a connection status that corresponds to the configuration recognized by the system control block 110 at the step ST2.

That is, the system control block 110 delivers common command InitializeConnect(1/2) to the control bus 111 if it has recognized that the apparatus 100 has the first or second configuration. In response to this, the interpreter 120d-3 in the control I/F 120d of the signal router 123 converts this common command InitializeConnect(1/2) into intra-functional-block command, route(1). With this, the signal router 123 enters the first state in which the first input terminal is connected to the first output terminal and the second input terminal is connected to the fourth output terminal (see FIGS. 9 and 10).

Further, the system control block 110 delivers common command InitializeConnect(3) to the control bus 111 if it has recognized that the apparatus 100 has the third configuration. In response to this, the interpreter 120d-3 in the control I/F 120d of the signal router 123 converts this common command InitializeConnect(3) into intra-functional-block command, route(2). With this, the signal router 123 enters the second state in which the first input terminal is connected to the first output terminal, the second input terminal is connected to the second output terminal, and the third input terminal is connected to the fourth output terminal (see FIG. 11).

Further, the system control block 110 delivers common command InitializeConnect(4/5) to the control bus 111 if it has recognized that the apparatus 100 has the fourth or fifth configuration. In response to this, the interpreter 120d-3 in the control I/F 120d of the signal router 123 converts this common command InitializeConnect(4/5) into intra-functional-block command, route(3). With this, the signal router 123 enters the third state in which the first input terminal is connected to the third output terminal, the fourth input terminal is connected to the first output terminal, the second input terminal is connected to the second output terminal, and the third input terminal is connected to the fourth output terminal (see FIGS. 12 and 13).

Further, when the control port 120d-1 receives this common command, the interpreter 120d-3 in the control I/F 120d of the OSD circuit 128 converts the common commands into intra-functional-block commands meaning connection status display based on the correlations stored in the ROM 120d-2. With this, the OSD circuit 128 enters a state for generating a display signal to provide a display such that the apparatus 100 has a configuration recognized by the system control block 110 at the step ST2 and outputting an output image signal combined with this display signal.

Next, at step ST4, the system control block 110 delivers to the control bus 111 initial values of common commands of all kinds except those (of seventh kind) related to the signal router 123 (as the functional block 3). In this case, common commands related to the same kind of control are supposed to be of the same kind as described below.

That is, the common commands ch(1)-ch(12) mean channel numbers 1-12 respectively and are common commands of the first kind. The common commands in(1)-in(3) mean inputs 1-3 respectively and are common commands of the second kind. The common commands DRCvolExec(on/off) respectively mean switchover of DRC volume processing and are common commands of the third kind. The common commands DRCvol(resolutionVal,noiseVal) mean adjustment of the resolution axis and the noise axis and are common commands of the fourth kind.

The common commands DRCzoomExec(on/off) respectively mean switchover of DRC zoom processing and are common commands of the fifth kind. The common commands DRCzoom(ratioVal, horizontalVal, verticalVal) respectively mean DRC zoom ratio and zoom center positions and are common commands of the sixth kind. The common commands InitializeConnect(1/2/3/4/5) respectively mean inter-functional-block connection and are common commands of the seventh kind.

In this case, as for the common commands of the first kind, the system control block 110 delivers the common commands stored in the channel number-dedicated last memory region to the control bus 111 as initial values thereof. With this, the U/V tuner 121 enters a state in which it has selected a channel selected at the time of power-off. Further, the OSD circuit 128 enters a state for generating a display signal to display that selected channel and outputting an output image signal combined with this display signal.

As for the common commands of the second kind, the system control block 110 delivers the common commands stored in the input selection-dedicated last memory region to the control bus 111 as initial values thereof. With this, the input selector 122 enters a state in which it selects an input selected at the time of power-off. Further, the OSD circuit 128 enters a state for generating a display signal to display the selected input and outputting an output image signal combined with this display signal.

As for the common commands of the third kind, the system control block 110 delivers the common command DRCvolExec(on) to the control bus 111 as an initial value thereof. With this, the OSD circuit 128 enters a state for generating a display signal to provide a display such that the DRC volume processing is in the on-state and outputting an output image signal combined with this display signal. Further, the OSD circuit 128 enters a state for selecting as an input source an image signal that has undergone the DRC volume processing and is output from the signal router 123 and outputting this image signal directly without performing contraction processing on it.

As for the common commands of the fourth kind, the system control block 110 delivers the common commands stored in the volume value-dedicated last memory region to the control bus 111 as initial values thereof. With this, the DRC circuit 124 enters a state for performing the DRC volume processing by use of a volume value on the resolution axis and a volume value on the noise axis at the time of power-off. Further, the OSD circuit 128 enters a state for generating a display signal to display those volume values on the resolution and noise axes respectively. Further, the noise removal circuit 127 enters a state for performing noise suppression at a suppression ratio that corresponds to that volume value on the noise axis.

As for the common commands of the fifth kind, the system control block 110 delivers the common command DRCzoomExec(off) to the control bus 111 as an initial value thereof. With this, the DRC circuit 124 enters a state for stopping performing the DRC zoom processing. Further, the OSD circuit 128 enters a state for generating a display signal to provide a display such that the DRC zoom processing is in the off-state and outputting an output image signal combined with this display signal. Further, the OSD circuit 128 enters a state for selecting as an input source an image signal output from the signal router 123 and outputting this image signal as it is without performing contraction processing on it if the DRC volume processing is in the on-state or selecting as an input source an image signal output from the input selector 122 and outputting this image signal as it is without performing contraction processing on it if the DRC volume processing is in the off-state.

Further, the OSD circuit 128 stops generating a display signal that displays on a child screen a square frame that corresponds to a portion that has undergone DRC zoom processing and combining it into an output image signal or generating a display signal that indicates a zoom ratio and zoom center positions and combining it into an output image signal.

As for the common commands of the sixth kind, the system control block 110 delivers the common commands DRCzoom(InitRatio, InitHol, Initver) to the control bus 111 as initial values thereof. With this, the DRC circuit 124 enters an on-state for performing the DRC zoom processing that corresponds to the zoom ratio initial value "InitRatio" and the zoom center position initial values "InitHol" and "InitVer". Further, when the DRC zoom processing is turned on, the OSD circuit 128 enters a state for generating a display signal that displays the zoom ratio initial value "InitRatio" and the zoom center position initial values "InitHol" and "InitVer", generating a display signal that displays on a child screen a square frame corresponding to a portion that has undergone the DRC zoom processing, and outputting an output image signal combined with this display signal.

Next, at step ST5, the system control block 110 starts a timer, and at step ST6, it is determined whether the user has performed an operation by using the remote-control transmitter 112 or the operation section 113 in the chassis 101. If the user has performed the operation, at step ST7, the system control block 110 delivers a common command that corresponds to the user operation to the control bus 111.

In this case, if the user has operated to select channel numbers 1-12, the system control block 110 delivers common commands ch(1)-ch(12) to the control bus 111, respectively. With this, the U/V tuner 121 enters a state where it has selected a channel intended. Further, the OSD circuit 128 enters a state for generating a display signal that displays the selected channel and outputting an output image signal combined with this display signal. It is to be noted that the system control block 110 updates common commands stored in the channel number-dedicated last memory region with this delivered common command.

Further, if the user operates to select the inputs 1-3, the system control block 110 delivers the common commands in(1)-in(3) to the control bus 111, respectively. With this, the input selector 122 enters a state where it is switched to a selected input. Further, the OSD circuit 128 enters a state for generating a display signal that displays the switched input and outputting an output image signal combined with this display signal. It is to be noted that the system control block 110 updates any common commands stored in the input selector-dedicated last memory region with these delivered common commands.

Further, if the user operates to switch the DRC volume processing from the off-state to the on-state, the system control block 110 delivers the common command DRCvolExec(on) to the control bus 111. With this, the OSD circuit 128 enters a state for generating a display signal that displays the on-state of the DRC volume processing and outputting an output image signal combined with this display signal. Further, this OSD circuit 128 enters a state for providing as an input source an image signal from the signal router 123 that has undergone the DRC volume processing and outputting this image signal directly as an output image signal without performing the contraction processing on it.

Further, if the user operates to switch the DRC volume processing from the on-state to the off-state, the system control block 110 delivers the common command DRCvolExec(off) to the control bus 111. With this, the OSD circuit 128 enters a state for generating a display signal that displays the off-state of the DRC volume processing and outputting an output image signal combined with this display signal. Further, this OSD circuit 128 enters a state for providing as an input source an image signal from the signal selector 122 that is not undergone the DRC volume processing and outputting this image signal directly as an output image signal without performing the contraction processing on it.

Further, if the user operates to change volume values on the resolution axis and the noise axis, the system control block 110 delivers the common command DRCvol(resolutionVal, noiseVal) to the control bus 111. With this, the DRC circuit 124 enters a state in which a resolution and a noise removal ratio corresponding to the volume values on the resolution axis and noise axis by use of the user operation are selected. Further, the OSD circuit 128 enters a state for generating a display signal that displays the volume value "resolutionVal" on the resolution axis and the volume value "noiseVal" on the noise axis and outputting an output image signal combined with this display signal. Furthermore, the noise removal circuit 127 enters a state for suppressing noise at a suppression ratio that corresponds to the volume value "noiseVal" on the noise axis. It is to be noted that the system control block 110 updates any common commands stored in the volume value-dedicated last memory region with this delivered common command.

Further, if the user operates to switch the DRC zoom processing from the off-state to the on-state, the system control block 110 delivers the common command DRCzoomExec (on) to the control bus 111. With this, the DRC circuit 124 enters a state for performing DRC zoom processing that corresponds to initial values of the zoom ratio and the zoom center positions. Further, the OSD circuit 128 enters a state for generating a display signal that provides a display such that the DRC zoom processing is in the on-state and outputting an output image signal combined with this display signal. Further, the OSD circuit 128 enters a state for outputting an output image signal obtained by combining an image signal which has already undergone DRC zoom processing (by use of initial values of the zoom ratio and the zoom center positions) and is received from the signal router 123 with a child-screen image signal obtained by performing 0.25-fold contraction processing on an image signal received from the input selector 122. Further, the OSD circuit 128 enters a state for generating a display signal that displays on a child screen a square frame that corresponds to a portion that has undergone zoom processing by the DRC circuit 124 and outputting an output image signal combined with this display signal. Furthermore, the OSD circuit 128 enters a state for generating a display signal that indicates initial values of the zoom ratio and the zoom center positions and outputting an output image signal combined with this display signal.

Further, if the user operates to switch the DRC zoom processing from the on-state to the off-state, the system control block 110 delivers the common command DRCzoomExec (off) to the control bus 111. With this, the DRC circuit 124 enters a state for performing the DRC zoom processing using a zoom ratio of 1 and a zoom center position of (0, 0), therefore, stopping performing the DRC zoom processing substantially. Further, the OSD circuit 128 enters a state for generating a display signal that provides a display such that the DRC zoom processing is in the off-state and outputting an output image signal combined with this display signal. Further, this OSD circuit 128 enters a state for outputting an image signal from the signal router 123 directly as an output image signal without performing contraction processing on it if the DRC volume processing is on the on-state or the circuit 128 enters a state for outputting an image signal from the input selector 122 directly as an output image signal without performing contraction processing on it if the DRC volume processing is in the off-state.

Further, if the user operates to change a zoom ratio and zoom center positions, the system control block 110 delivers the common command DRCzoom(ratioVal, horizontalVal, verticalVal) to the control bus 111. With this, the DRC circuit 124 enters a state for performing the DRC zoom processing that corresponds to the changed zoom ratio and the changed zoom center position. Further, the OSD circuit 128 enters a state for generating a display signal that indicates a zoom ratio and a zoom center position, generating a display signal that displays on a child screen a square frame corresponding to a portion that has undergone zoom processing, and outputting an output image signal combined with these display signals.

Next, at step ST8, it is determined whether a predetermined lapse of time has elapsed according to the timer started at the step ST5. If the lapse of time has not elapsed, the process returns to step ST6 where as described above, if a user operation is performed, the process goes to step ST7 where the system control block 110 delivers a common command that corresponds to the user operation to the control bus 111. It is to be noted that if it is decided at step ST6 that no user operation is performed, the process goes directly to the step ST8 where the system control block 110 decide whether the predetermined lapse of time has elapsed as described above.

If the predetermined lapse of time has elapsed at step ST8, the process goes to step ST9 where the system control block 110 delivers the most recent common commands of all the kinds to the control bus 111. In this case, the most recent common commands refer to either the common commands delivered to the control bus 110 at steps ST3 and ST4 or the changed common commands delivered to the control bus 111 at step ST7. That is, as for common commands of any of these kinds, an initial value, if not changed, provides the most recent common command and, otherwise, a changed value provides the most recent common command.

Then, at the step ST9, the system control block 110 delivers the most recent common commands of all the kinds to the control bus 111 and the process then returns to the step ST5 where the system control block 110 restarts the timer and performs the same operations as the above.

As described above, the system control block 110 delivers the most recent common commands of all the kinds to the control bus 111 for every predetermined period of time. With this, even if a functional block could not receive a common command related to itself for some reason, this functional block can receive that common command after a predetermined lapse of time, so that in a case where, for example, two functional blocks operate in cooperation with each other, misalignment in cooperation due to a failure of any one of the functional blocks to receive the common command can be corrected by the other.

Figure 7:
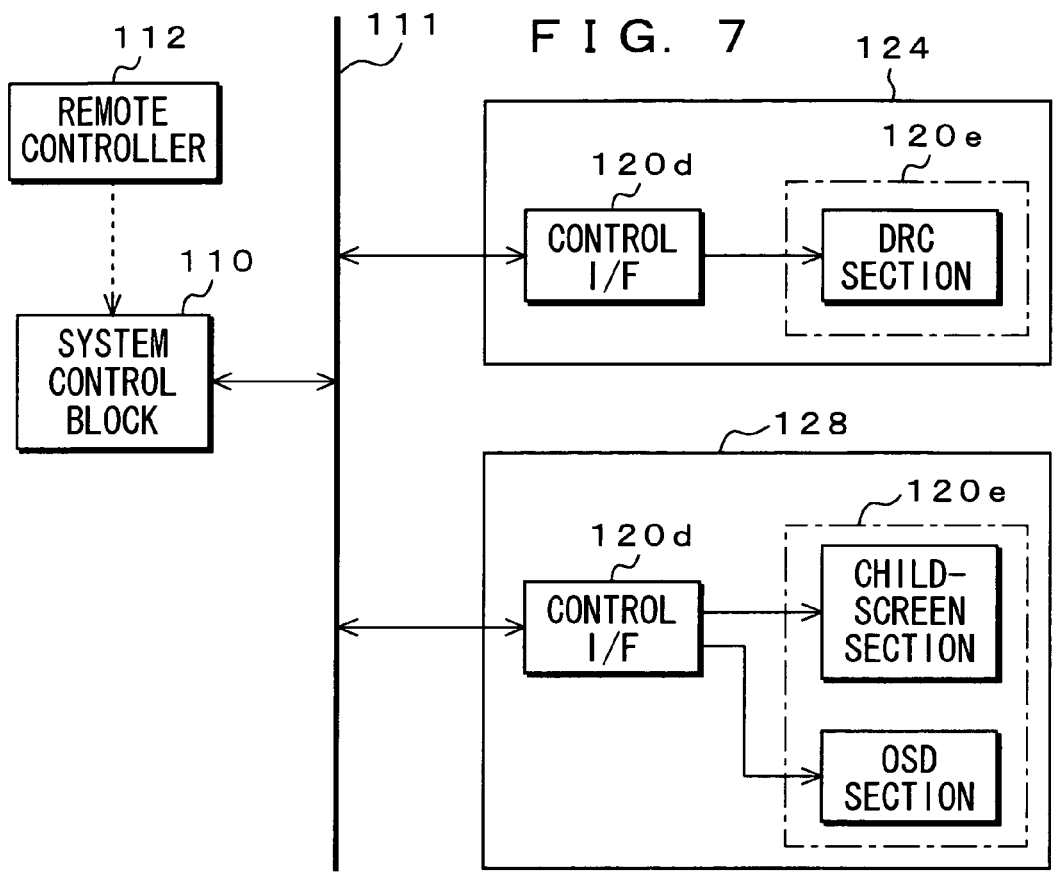
FIG. 7 is an explanatory diagram for explaining operations of a DRC circuit and a OSD circuit when a zoom magnification or a zoom position is changed.

For example, FIG. 7 shows the DRC circuit 124 (as the functional block 4) and the OSD circuit 128 (as the functional block 8). The functional section 120e in the DRC circuit 124 has in it a DRC section for performing the DRC zoom processing. The functional section 120e in the OSD circuit 128 has in it a child-screen section for obtaining an image signal to be displayed on a child screen and an on-screen display (OSD) section for generating a display signal that displays a square frame corresponding to a portion that has undergone zoom processing.

Consider a case where the DRC zoom processing is in the on-state and the common commands DRCzoom(ratioVal, horizontalVal, verticalVal) are delivered from the system control block 110 to the control bus 111 when a user operates to change a zoom ratio and a zoom position.

In this case, the functional section 120e in the DRC circuit 124 is supplied with the intra-functional-block commands, zoom(ratioVal, horizontalVal, verticalVal). The DRC section, on the other hand, performs the DRC zoom processing that corresponds to the zoom ratio "ratioVal" and the zoom center positions "horizontalVal" and "verticalVal". Further, in this case, the functional section 120e in the OSD circuit 128 is supplied with intra-functional-block command, writeZoom-Frame(ratioVal, horizontalVal, verticalVal). The OSD section, on the other hand, generates a display signal that displays on a child screen a square frame corresponding to a portion that has undergone zoom processing.

Further, in this case, the functional section 120e in the OSD circuit 128 combines an image signal from the signal router 123 that has undergone the DRC zoom processing with a child-screen image signal obtained by performing contraction processing on an image signal from the input selector 122 on the child screen section to thereby obtain an output image signal and also combines this output image signal with a display signal that displays on the child screen a square frame corresponding to a zoomed portion that is generated by the OSD section.

Figure 8:
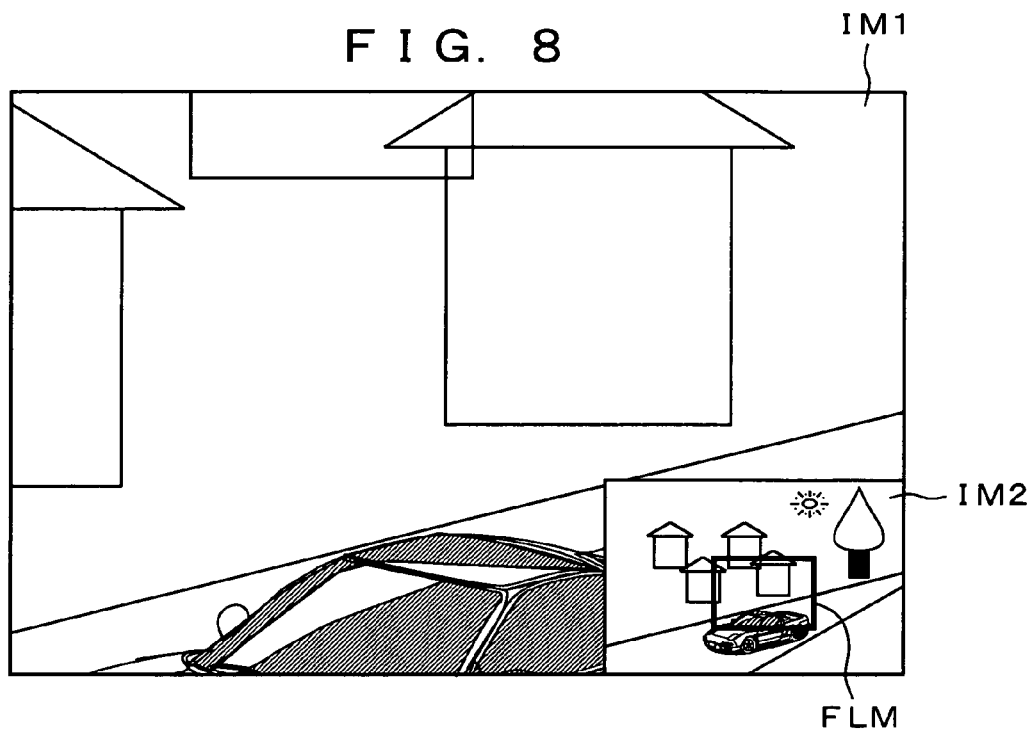
FIG. 8 is an illustration of an example of an image displayed when DRC zoom processing is in an on-state.

With this, according to an output image signal output from the OSD circuit 128, for example, as shown in FIG. 8, an image IM2 due to a child-screen image signal is displayed as superimposed on an image IM1 due to an image signal obtained through the DRC zoom processing and, further, on this image IM2, a square frame FLM that corresponds to the zoomed portion is displayed.

As described above, the common command DRCzoom (ratioVal, horizontalVal, verticalVal) is delivered from the system control block 110 to the control bus 111 and if this common command is received by both the DRC circuit 124 and the OSD circuit 128, contents of an intra-frame portion of the image IM1 and those of the IM2 agree completely.

However, if this common command could be received only one of the DRC circuit 124 and the OSD circuit 128, contents of the intra-frame portion of the image IM1 and those of the image IM2 do not agree, thus resulting in misalignment in cooperation. In this case, by delivering this common command to the control bus 111 from the system control block 110 after a predetermined lapse of time, this common command can be received by one of the functional blocks that could not receive it so that contents of the intra-frame portions of the images IM1 and IM2 may agree with each other.

Such misalignment in cooperation can occur even when the system control block 110 delivers any other kind of common commands to the control bus 111. However, as described above, the system control block 110 can deliver the most recent common commands of all the kinds to the control bus 111 for every predetermined period of time, to correct this misalignment in cooperation.

Although, in the above embodiments, the most recent common commands of all the kinds have been delivered to the control bus 111, the system control block 110 may deliver only such most recent common commands of some kinds that are suspected of misalignment in cooperation to the control bus 111 foe every predetermined period of time.

Although, in the above embodiments, the system control block 110 has delivered the most recent common commands of all the kinds to the control bus 111 for every predetermined period of time, such a configuration may be provided, for example, that a functional block that receives common commands may be supposed to return a command indicative of normal operation to the system control block 110 when it has received a common command and, if such a command is not returned to it, the system control block 110 may deliver common commands of all the kinds or some of them again to the control bus 111.

Further, as described above, upon power application, the system control block 110 is configured to acquire common commands from the functional blocks 120 that constitute the processing apparatus 100. Therefore, such a case can be easily accommodated that a new functional block 120 is added and a common command that addresses this new functional block 120 is newly required.

The following will describe the above-described first through fifth configurations of the image-signal-processing apparatus 100. A basic configuration of this image-signal-processing apparatus 100 refers to such a state that, for example, the U/V tuner 121 is inserted into the slot 104a and the DRC circuit 124 is inserted into the slot 104c. This basic configuration is the first configuration.

Figure 9:
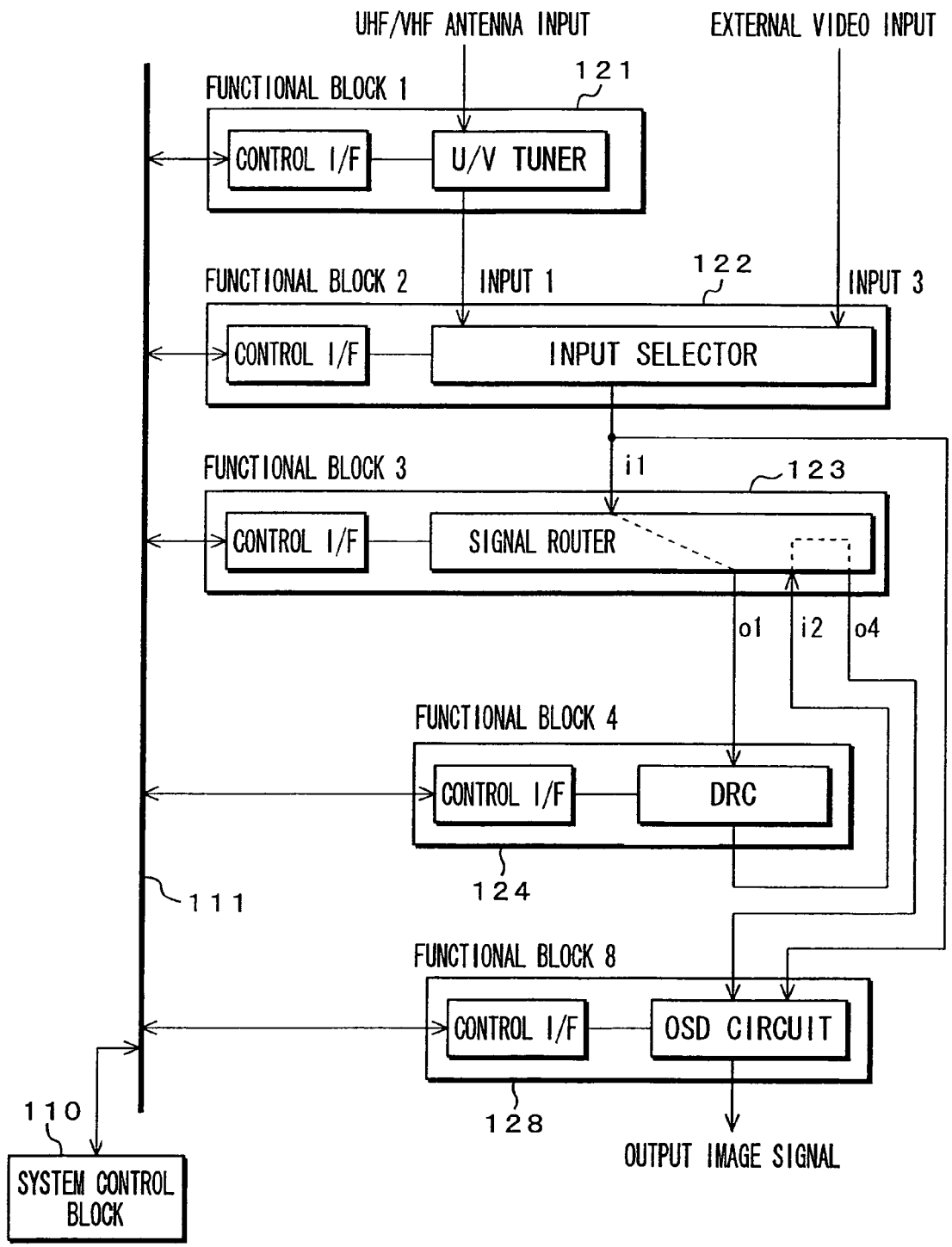
FIG. 9 is a diagram for showing a connection status of the basic configuration of the image-signal-processing apparatus.

FIG. 9 shows a connection status of the basic configuration (the first configuration). In this case, upon power application, the system control block 110 acquires common commands from the input selector 122, the signal router 123, and the OSD circuit 128 as well as the U/V tuner 121 and the DRC circuit 124 and also acquires substrate IDs from these input selector 122, signal router 123, OSD circuit 128, U/V tuner 121, and DRC circuit 124, thus recognizing that the apparatus 100 has the first configuration (the basic configuration).

Then, the system control block 110 delivers to the control bus 111 the common command InitializeConnect(1) meaning this first configuration. With this, the signal router 123 enters the first state in which the first input terminal is connected to the first output terminal and the second input terminal is connected to the fourth output terminal. This causes the DRC circuit 124 to be inserted into a processing system. Further, the OSD circuit 128 enters a state for generating a display signal that provides a display such that the apparatus 100 has the first configuration and outputting an output image signal combined with this display signal.

Further, the system control block 110 delivers to the control bus 111 initial values of of common commands of all kinds (see FIG. 5) except those common commands related to the signal router 123. With this, the input selector 122, the OSD circuit 128, the U/V tuner 121, and the DRC circuit 124 enter their initial states, thus starting operations as the image-signal-processing apparatus 100.

That is, the U/V tuner 121 performs channel selection processing on a broadcast signal received by the U/V antenna based on any one of common commands ch(1)-ch(12) sent from the system control block 110, thereby obtaining an image signal of a predetermined channel.

An image signal (input 1) obtained at this U/V tuner 121 is applied to the input selector 122. Further, this input selector 122 is supplied also with an image signal (input 3) as an external video input provided through the connector 102a (see FIG. 1). At this input selector 122, either the input 1 or the input 3 is selected on the basis of common command in(1) or common command in(3) sent from the system control block 110.

The image signal selected by this input selector 122 is input via the first input terminal and the first output terminal of the signal router 123 to the DRC circuit 124. This DRC circuit 124 performs the DRC volume processing and the DRC zoom processing on the input image signal based on the common commands DRCvol(resolutionVal,noiseVal), DRCzoomExec(on/off), and DRCzoom(ratioVal, horizontalVal, verticalVal), which are sent from the the system control block 110.

Then, the image signal output from the DRC circuit 124 is supplied via the second input terminal and the fourth output terminal of the signal router 123 to the first input terminal of the OSD circuit 128. The second input terminal of this OSD circuit 128 is supplied with an image signal selected by the input selector 122.

The OSD circuit 128 performs processing to obtain an output image signal and processing to combine this output image signal with display signals that provides various displays based on the common commands ch(1)-ch(12), in(1)-in(2), DRCvolExec(on/off), DRCvol(resolutionVal, noiseVal), DRCzoomExec(on/off), and DRCzoom(ratioVal, horizontalVal, verticalVal), which are sent from the system control block 110.

The output image signal obtained by this OSD circuit 128 is output as an output image signal to the connector 103 (see FIG. 1). This output image signal is supplied to a display constituted of, for example, a cathode ray tube (CRT).

Further, if a user operation is performed after power application, a common command corresponding to the user operation is delivered from the system control block 110 to the control bus 111. With this, a channel selected at the U/V tuner 121, an input selected by the input selector 122, and contents of the DRC volume processing and the DRC zoom processing in the DRC circuit 124 are changed.

Next, the second configuration will be described in which the digital terrestrial tuner 126 is added to the above-described basic configuration (the first configuration). The digital terrestrial tuner 126 is inserted into the slot 104b.

Figure 10:
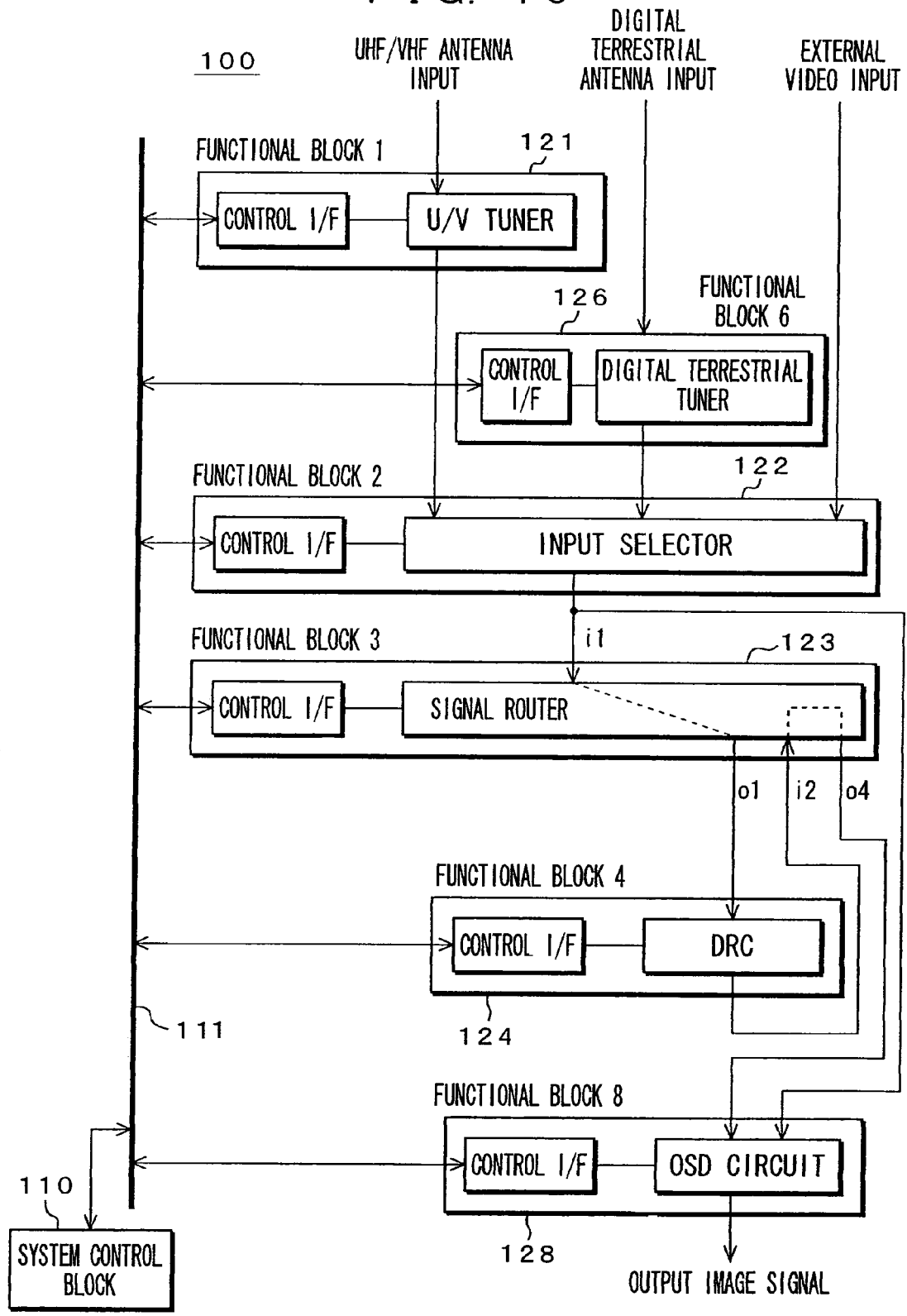
FIG. 10 is a diagram for showing a connection status in a case where a digital terrestrial tuner is added to the basic configuration.

FIG. 10 shows a connection status of the second configuration. In this case, upon power application, the system control block 110 acquires common commands from the input selector 122, the signal router 123, and the OSD circuit 128 as well as the U/V tuner 121 and the DRC circuit 124 and also acquires substrate IDs from the input selector 122, the signal router 123, the OSD circuit 128, the U/V tuner 121, the DRC circuit 124, and the digital terrestrial tuner 126, thus recognizing that the apparatus 100 has the second configuration.

Then, the system control block 110 delivers to the control bus 111 the common command InitializeConnect(2) meaning this second configuration. With this, the signal router 123 enters the first state in which the first input terminal is connected to the first output terminal and the second input terminal is connected to the fourth output terminal. Further, the OSD circuit 128 enters a state for generating a display signal that provides a display such that the apparatus 100 has the second configuration and outputting an output image signal combined with this display signal.

Further, the system control block 110 delivers to the control bus 111 initial values of common commands of all kinds except those common commands related to the signal router 123. With this, the input selector 122, the OSD circuit 128, the U/V tuner 121, and the DRC circuit 124 enter their initial states, thus starting operations as the image-signal-processing apparatus 100. In this case, the operations are the same as those with the above-described first configuration except that an image signal (input 2) obtained by the digital terrestrial tuner 126 can also be selected.

That is, the image signal (input 2) obtained by the digital terrestrial tuner 126 is applied to the input selector 122. This input selector 122 selects any one of the inputs 1-3 based on the common commands in(1)-in(3) sent from the system control block 110. The operations following this are the same as those of the above-described first configuration, a description of which will be omitted.

Figure 11:
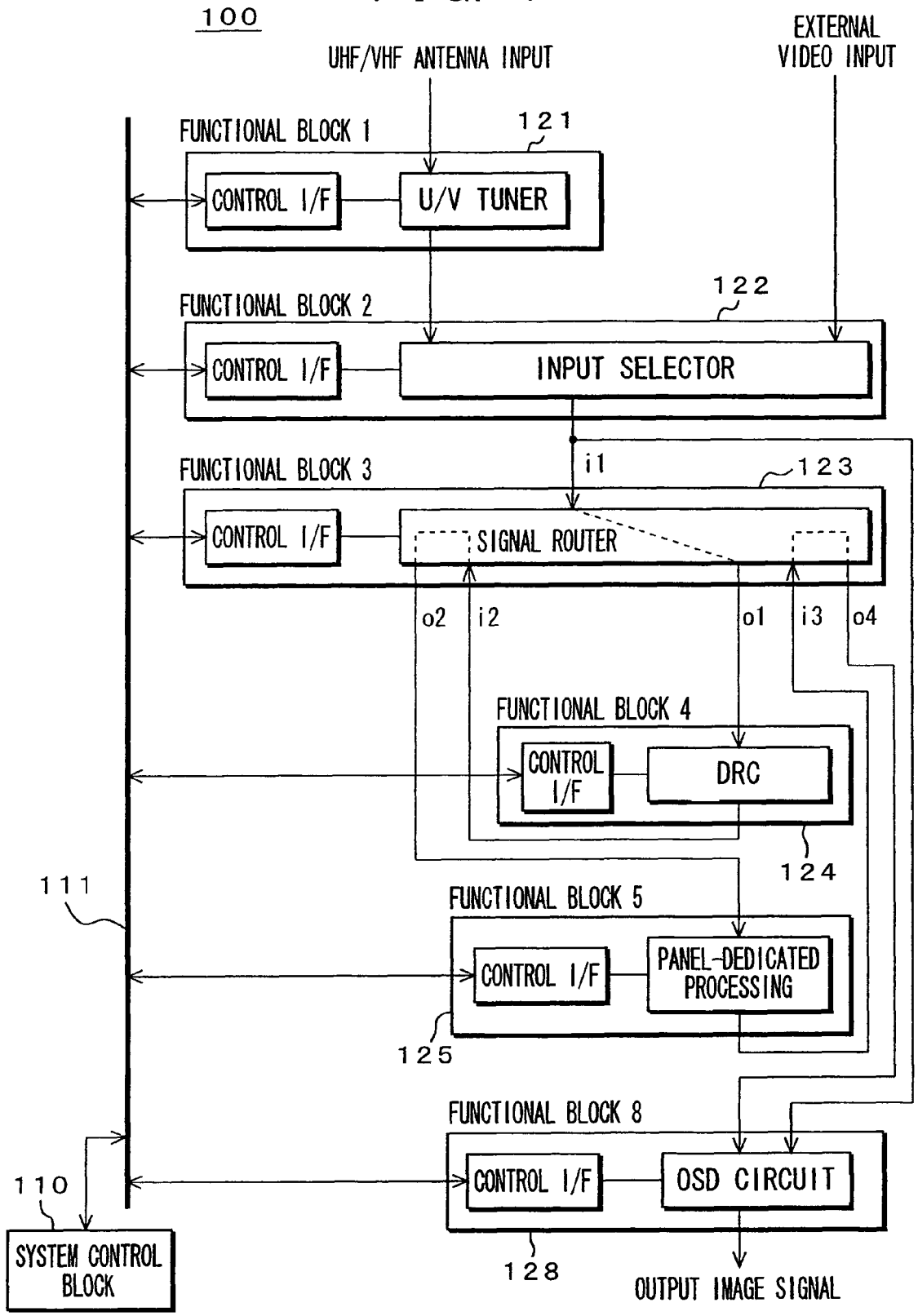
FIG. 11 is a diagram for showing a connection status in a case where a panel-dedicated processing circuit is added to the basic configuration.

Next, the third configuration will be described in which the panel-dedicated processing circuit 125 is added to the above-described basic configuration (first configuration). The panel-dedicated processing circuit 125 is inserted into the slot 104d. FIG. 11 shows a connection status of the third configuration.

In this case, upon power application, the system control block 110 acquires common commands from the input selector 122, the signal router 123, and the OSD circuit 128 as well as the U/V tuner 121 and the DRC circuit 124 and also acquires substrate IDs from the input selector 122, the signal router 123, the OSD circuit 128, the U/V tuner 121, the DRC circuit 124, and the panel-dedicated processing circuit 125, thus recognizing that the apparatus 100 has the third configuration.

Then, the system control block 110 delivers to the control bus 111 the common command InitializeConnect(3) meaning this third configuration. With this, the signal router 123 enters the second state in which the first input terminal is connected to the first output terminal, the second input terminal is connected to the second output terminal, and the third input terminal is connected to the fourth output terminal. With this, the DRC circuit 124 and the panel-dedicated processing circuit 125 are inserted into a processing system. Further, the OSD circuit 128 enters a state for generating a display signal that provides a display such that the apparatus 100 has the third configuration and outputting an output image signal combined with this display signal.

Further, the system control block 110 delivers to the control bus 111 initial values of the common commands of all kinds except those common commands related to the signal router 123. With this, the input selector 122, the OSD circuit 128, the U/V tuner 121, and the DRC circuit 124 enter their initial states, thus starting operations as the image-signal-processing apparatus 100.

That is, the U/V tuner 121 performs channel selection processing on a broadcast signal received by the U/V antenna based on any one of the common commands ch(1)-ch(12) sent from the system control block 110, thus obtaining an image signal of a predetermined channel.

An image signal (input 1) obtained by this U/V tuner 121 is applied to the input selector 122. Further, this input selector 122 is supplied also with an image signal (input 3) as an external video input provided through the connector 102a (see FIG. 1). This input selector 122 selects input 1 or input 3 based on the common command in(1) or in(3) sent from the system control block 110.

The image signal selected by this input selector 122 is input to the DRC circuit 124 via the first input terminal and the first output terminal of the signal router 123. This DRC circuit 124 performs the DRC volume processing and the DRC zoom processing on the input image signal based on common commands DRCvol(resolutionVal,noiseVal), DRCzoomExec (on/off), and DRCzoom(ratioVal, horizontalVal, verticalVal), which are sent from the system control block 110.

Then, the image signal output from the DRC circuit 124 is supplied to the panel-dedicated processing circuit 125 via the second input terminal and the second output terminal of the signal router 123. This panel-dedicated processing circuit 125 performs on the input image signal any processing required to display an image by this image signal on a flat panel display such as an LCD or a PDP, for example, luminosity adjustment, color adjustment, conversion of the numbers of horizontal and vertical pixels, mode conversion from the interlace mode to the progressive mode, etc.

The image signal output from this panel-dedicated processing circuit 125 is supplied to the first input terminal of the OSD circuit 128 via the third input terminal and the fourth terminal of the signal router 123. The second input terminal of this OSD circuit 128 is supplied with an image signal selected by the input selector 122. This OSD circuit 128 performs processing to obtain an output image signal based on the common commands ch(1)-ch(12), in(1)-in(2), DRCvolExec (on/off), DRCvol(resolutionVal,noiseVal), DRCzoomExec (on/off), and DRCzoom(ratioVal, horizontalVal, verticalVal), which are sent from the system control block 110 and processing to combine this output image signal with display signals to provide various displays, etc.

This output image signal obtained by this OSD circuit 128 is output as an output image signal to the connector 103 (see FIG. 1). This output image signal is supplied to a display constituted of an LCD if the panel-dedicated processing circuit 125 is provided for the LCD and, if it is provided for a PDP, supplied to a display constituted of the PDP.

Further, if a user operation has been performed after power application, a common command that corresponds to the user operation is delivered from the system control block 110 to the control bus 111. With this, a channel selected by the U/V tuner 121, an input selected by the input selector 122, and contents of DRC volume processing and the DRC zoom processing in the DRC circuit 124 are changed.

Figure 12:
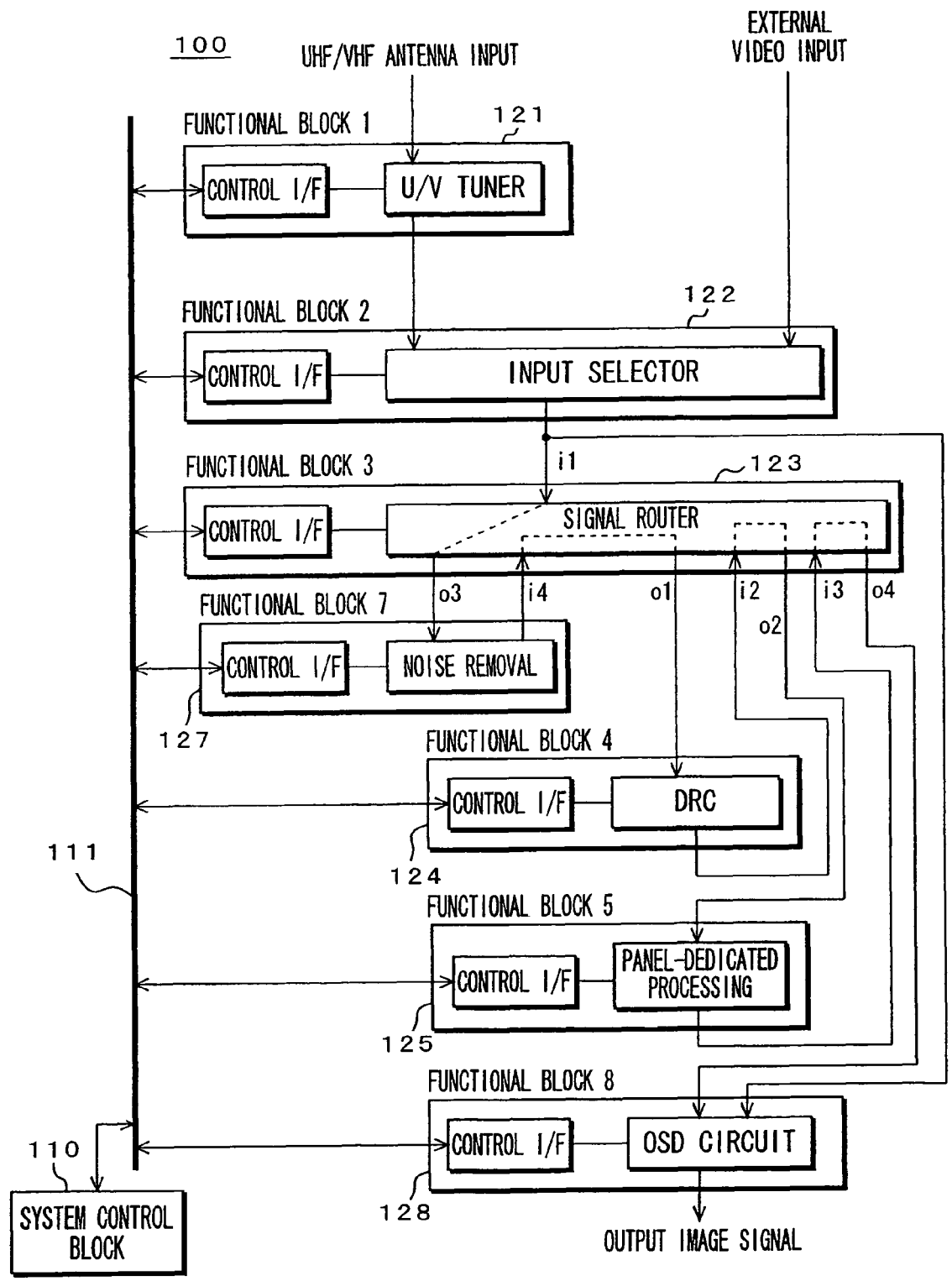
FIG. 12 is a diagram for showing a connection status in a case where a noise removal circuit and the panel-dedicated processing circuit are added to the basic configuration.

Next, the fourth configuration will be described in which the panel-dedicated processing circuit 125 and the noise removal circuit 127 are added to the above-described basic configuration (the first configuration). The panel-dedicated processing circuit 125 is inserted into the slot 104*d* and the noise removal circuit 127 is inserted into the slot 104*e*. FIG. 12 shows a connection status of the fourth configuration.

In this case, upon power application, the system control block 110 acquires common commands from the input selector 122, the signal router 123, and the OSD circuit 128 as well as the U/V tuner 121, the DRC circuit 124 and the noise removal circuit 127, and also acquires substrate IDs from the input selector 122, the signal router 123, the OSD circuit 128, the U/V tuner 121, the DRC circuit 124, the panel-dedicated processing circuit 125, and the noise removal circuit 127, thus recognizing that the apparatus 100 has the fourth configuration.

Then, the system control block 110 delivers to the control bus 111 the common command InitializeConnect(4) meaning this fourth configuration. With this, the signal router 123 enters the third state in which the first input terminal is connected to the third output terminal, the fourth input terminal is connected to the first output terminal, the second input terminal is connected to the second output terminal, and the third input terminal is connected to the fourth output terminal. Further, the DRC circuit 124, the panel-dedicated processing circuit 125, and the noise removal circuit 127 are inserted into a processing system. Further, the OSD circuit 128 enters a state for generating a display signal that provides a display such that the apparatus 100 has the fourth configuration and outputting an output image signal combined with this display signal.

Further, the system control block 110 delivers to the control bus 111 initial values of common commands of all kinds except those common commands related to the signal router 123. With this, the input selector 122, the OSD circuit 128, the U/V tuner 121, the DRC circuit 124, and the noise removal circuit 127 enter their initial states, thus starting operations as the image-signal-processing apparatus 100.

That is, the U/V tuner 121 performs channel selection processing on a broadcast signal received by the U/V antenna based on any one of the common commands ch(1)-ch(12), which are sent from the system control block 110, thereby obtaining an image signal of a predetermined channel.

The image signal (input 1) obtained by this U/V tuner 121 is applied to the input selector 122. This input selector 122 is supplied also with an image signal (input 3) as an external video input supplied by the connector 102*a* (see FIG. 1). This input selector 122 selects either input 1 or input 3 based on common command in(1) or in(3) sent from the system control block 110.

The image signal selected by this input selector 122 is supplied to the noise removal circuit 127 via the first input terminal and the third output terminal of the signal router 123. This noise removal circuit 127 performs noise suppressing processing on the input image signal based on the common commands DRCvol(resolutionVal,noiseVal) sent from the system control block 110.

The image signal output from this noise removal circuit 127 is supplied to the DRC circuit 124 via the fourth input terminal and the first output terminal of the signal router 123. This DRC circuit 124 performs on the input image signal DRC volume processing and DRC zoom processing based on the common commands DRCvol(resolutionVal,noiseVal), DRCzoomExec(on/off), and DRCzoom(ratioVal, horizontalVal, verticalVal).

Then, the image signal output from this DRC circuit 124 is supplied to the panel-dedicated processing circuit 125 via the second input terminal and the second output terminal of the signal router 123. This panel-dedicated processing circuit 125 performs on the input image signal any processing required to display this image signal on a flat panel display such as an LCD or a PDP, for example, luminosity adjustment, color adjustment, conversion of the numbers of horizontal and vertical pixels, mode conversion from the interlace mode to the progressive mode, etc.

Then, the image signal output from this panel-dedicated processing circuit 125 is supplied to the first input terminal of the OSD circuit 128 via the third input terminal and the fourth output terminal of the signal router 123. The second input terminal of this OSD circuit 128 is supplied with an image signal selected by the input selector 122. This OSD circuit 128 performs any processing to obtain an output image signal, combine this output image signal with display signals to provide various displays, etc. based on the common commands ch(1)-ch(12), in(1)-in(2), DRCvolExec(on/off), DRCvol(resolutionVal,noiseVal), DRCzoomExec(on/off), and DRCzoom(ratioVal, horizontalVal, verticalVal).

The output image signal obtained by this OSD circuit 128 is output as an output image signal to the connector 103 (see FIG. 1). This output image signal is supplied to a display constituted of an LCD if the panel-dedicated processing circuit 125 is provided for the LCD and, if it is provided for a PDP, supplied to a display constituted of the PDP.

Further, if a user operation has been performed after power application, a common command that corresponds to the user operation is delivered from the system control block 110 to the control bus 111. With this, a channel selected by the U/V tuner 121, an input selected by the input selector 122, and contents of DRC volume processing and the DRC zoom processing in the DRC circuit 124 are changed.

Next, the fifth configuration will be described in which the digital terrestrial tuner 126, the panel-dedicated processing circuit 125, and the noise removal circuit 127 are added to the above-described basic configuration (the first configuration). FIG. 13 shows a connection status of the fifth configuration.

In this case, upon power application, the system control block 110 acquires common commands from the input selector 122, the signal router 123, and the OSD circuit 128 as well as the U/V tuner 121, the DRC circuit 124, and the noise removal circuit 127 and also acquires the substrate IDs from the input selector 122, the signal router 123, the OSD circuit 128, the U/V tuner 121, the DRC circuit 124, the panel-dedicated processing circuit 125, the noise removal circuit 127, and the digital terrestrial tuner 126, thus recognizing that the apparatus 100 has the fifth configuration.

Then, the system control block 110 delivers to the control bus 111 the common command InitializeConnect(5) meaning this fifth configuration. With this, the signal router 123 enters the third state in which the first input terminal is connected to the third output terminal, the fourth input terminal is connected to the first output terminal, the second input terminal is connected to the second output terminal, and the third input terminal is connected to the fourth output terminal. Further, the OSD circuit 128 enters a state for generating a display signal that provides a display such that the apparatus 100 has the fifth configuration and outputting an output image signal combined with this display signal.

Further, the system control block 110 delivers to the control bus 111 initial values of the common commands of all kinds except those common commands related to the signal router 123. With this, the input selector 122, the OSD circuit 128, the U/V tuner 121, the DRC circuit 124, and the noise removal circuit 127 enter their initial states, thus starting operations as the image-signal-processing apparatus 100. The operations in this case are the same as those with the above-described fourth configuration except that an image signal (input 2) obtained by the digital terrestrial tuner 126 can also be selected by the input selector 122.

That is, the image signal (input 2) obtained by the digital terrestrial tuner 126 is applied to the input selector 122. This input selector 122 selects any one of the inputs 1-3 based on the common commands in(1)-in(3) sent from the system control block 110. The following operations are the same as those with the above-described first configuration, the description of which will be omitted.

In the above-described first embodiment, if a common command sent from the system control block 110 relates to the functional blocks 120 (the U/V tuner 121, the input selector 122, the signal router 123, the DRC circuit 124, the noise removal circuit 127, and the OSD circuit 128) themselves, each of them converts it into an intra-functional-block command that controls their functional section 120*e*. Therefore, in the first embodiment, each functional block 120 operates adaptively in accordance with any common commands sent from the system control block 110, so that it is possible to easily upgrade functions of the functional block 120 by upgrading a version thereof without changing the common commands from the system control block 110.

Figure 14A:
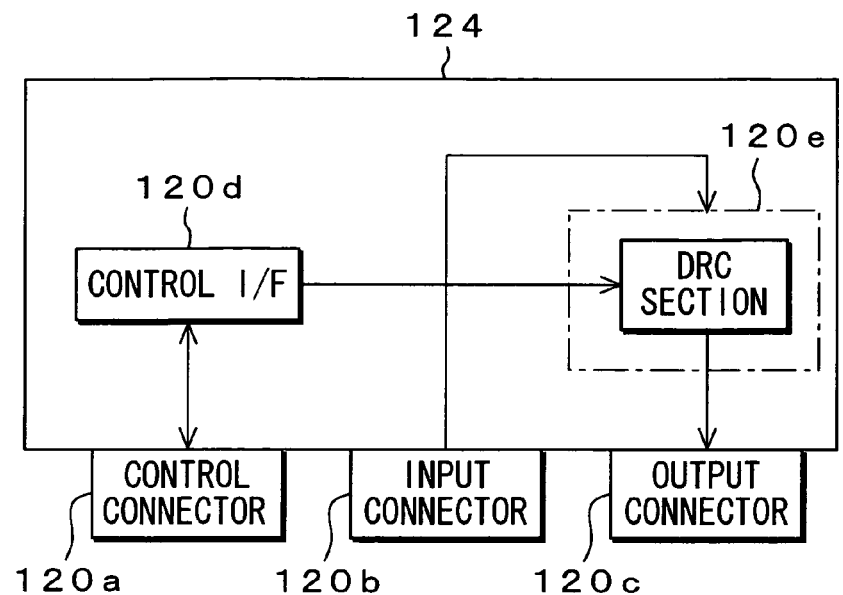
FIG. 14A is an explanatory diagram for showing a configuration of the DRC circuit before its version has been upgraded.

That is, FIG. 14A shows a configuration of the DRC circuit 124 before its version has been upgraded. The functional section 120*e* in this DRC circuit 124 has in it a single DRC section for performing the DRC zoom processing and the DRC zoom processing for the resolution axis and the noise axis. As shown in the above-described FIG. 5, the ROM 120*d*-2 (not shown in FIG. 14A) in the control I/F 120*d* of this DRC circuit 124 stores DRCvol(resolutionVal,noiseVal) meaning adjustment of the DRC resolution axis and the noise axis with it being correlated with the intra-functional-block command, volume(resolutionVal,noiseVal) meaning substitution of DRC (resolution axis and noise axis) volume values; the common commands DRCzoomExec(on/off) meaning switchover of the DRC zoom processing with them being correlated with the intra-functional-block command zoom (InitRatio/1, InitHol/0, Initver/0) meaning substitution of DRC zoom initial values; and the common commands DRCzoom(ratioVal, horizontalVal, verticalVal) meaning adjustment of DRC zoom ratio and zoom center positions with them being correlated with the intra-functional-block commands, zoom(ratioVal, horizontalVal, verticalVal) meaning substitution of the DRC zoom ratio and the zoom center positions.

Figure 14B:
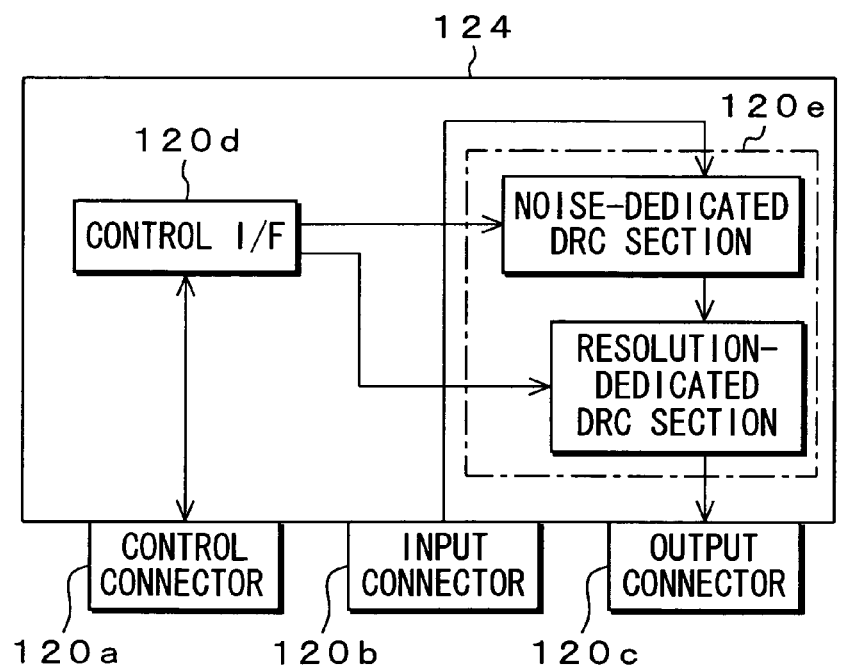
FIG. 14B is an explanatory diagram for showing a configuration of the DRC circuit after its version is upgraded.

FIG. 14B shows a configuration of the DRC circuit after its version has been upgraded. The functional section 120*e* in this DRC circuit 124 has in it a noise-dedicated DRC section for performing noise-axis DRC volume processing and a resolution-dedicated DRC section for performing resolution-axis DRC volume processing and DRC zoom processing. In this case, the DRC volume processing along the noise axis and the resolution axis is performed by different DRC sections, thereby enabling improving processing performance.

As shown in the above-described FIG. 15, the ROM 120*d*-2 (not shown in FIG. 14B) in the control I/F 120*d* for these DRC sections stores DRCvol(resolutionVal,noiseVal) meaning adjustment of the DRC resolution axis and the noise axis with it being correlated with intra-functional-block command, volumeResolution(resolutionVal) meaning substitution of DRC (resolution axis) volume values and intra-functional-block command, volumeNoise(noiseVal) meaning substitution of DRC (noise axis) volume values. Further, this ROM 120*d*-2 stores common command DRCzoomExec(on/off) meaning switchover of the DRC zoom processing with it being correlated with intra-functional-block command, zoom (InitRatio/1, InitHol/0, Initver/0) meaning substitution of DRC zoom initial values; and the common commands DRCzoom(ratioVal, horizontalVal, verticalVal) meaning adjustment of DRC zoom ratio and zoom center positions with them being correlated with intra-functional-block command, zoom (ratioVal, horizontalVal, verticalVal) meaning substitution of DRC zoom ratio and zoom center positions.

Thus, even after the version of the DRC circuit 124 has been upgraded, it is unnecessary to change common commands related to this DRC circuit 124. That is, it is necessary to change only the correlation between the common command and the intra-functional-block command stored in the ROM 120*d*-2. Therefore, in this case, functions can be upgraded easily by replacing the DRC circuit 124 having the configuration as shown in FIG. 14A with the version-upgraded one having the configuration as shown in FIG. 14B without changing the common commands.

In the above-described first embodiment, the system control block 110 acquires any common commands from any functional blocks 120 of the image-signal-processing apparatus 100 upon power application. However, the system control block 110 can acquire these common commands from a removable storage medium such as a disk or a semiconductor memory or via a predetermined network such as the Internet or from a broadcast signal such as those of a digital broadcast.

Figure 16:
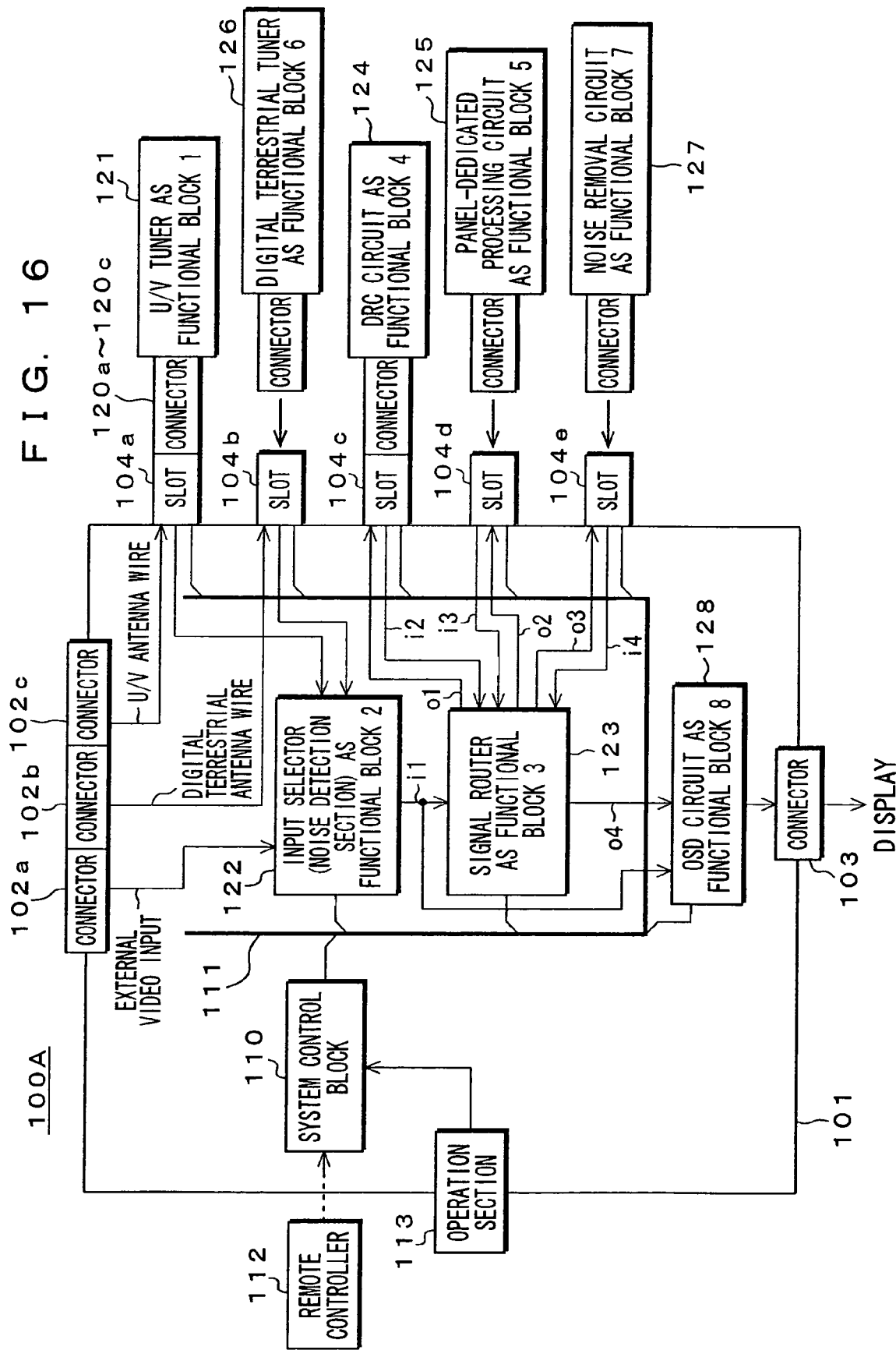
FIG. 16 is a block diagram for showing a configuration of an image-signal-processing apparatus according to a second embodiment of the invention.

The following will describe a second embodiment of the present invention. FIG. 16 shows a configuration of an image-signal-processing apparatus 100A according to the second embodiment of the invention. In this FIG. 16, components that correspond to those of FIG. 1 are indicated by the same symbols and reference numbers as those of FIG. 1, the detailed description of which will be omitted appropriately.

This image-signal-processing apparatus 100A issues a common command not only from a system control block 110 but also from a predetermined functional block, in this case, an input selector 122A (as a functional block 2). This input selector 122A corresponds to the input selector 122 in the image-signal-processing apparatus 100 of FIG. 1.

Figure 17:
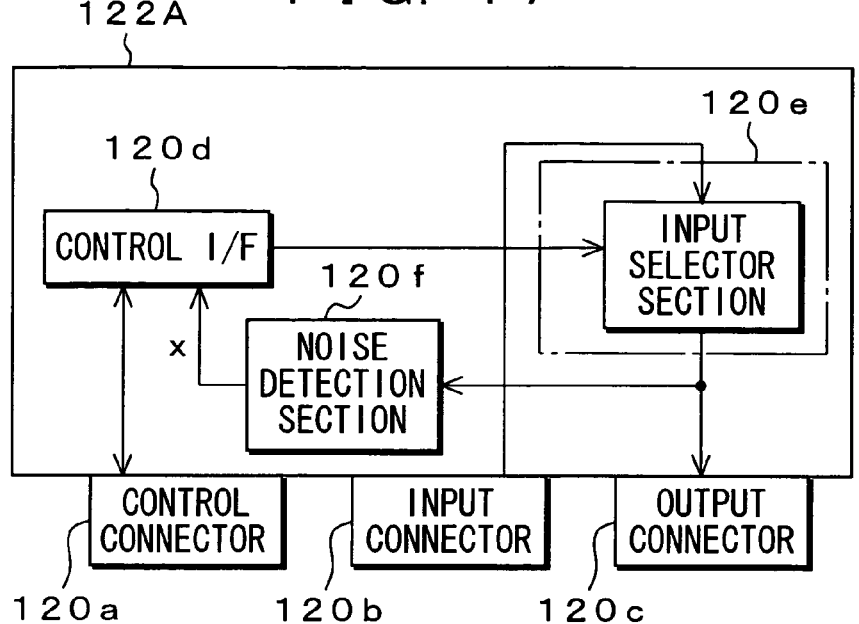
FIG. 17 is a block diagram for showing a configuration of an input selector.

FIG. 17 shows a configuration of the input selector 122A. This input selector 122A has a basic configuration as the functional block 120 shown in FIG. 2 and is equipped with an input selector section as a functional section 120*e*. This input selector 120A further has a noise detection section 120*f*.

This noise detection section 120*f* detects noise level x of a noise contained in an image signal which is received from the input selector section and supplies this noise level x to a control I/F 120*d*. Further, this noise detection section 120*f* detects noise level x for each predetermined lapse of time, for example, for each predetermined frame and outputs any value of 0-9 as the noise level x. It is to be noted that the noise level x constitutes a result of processing an image signal as an information signal.

Figure 18:
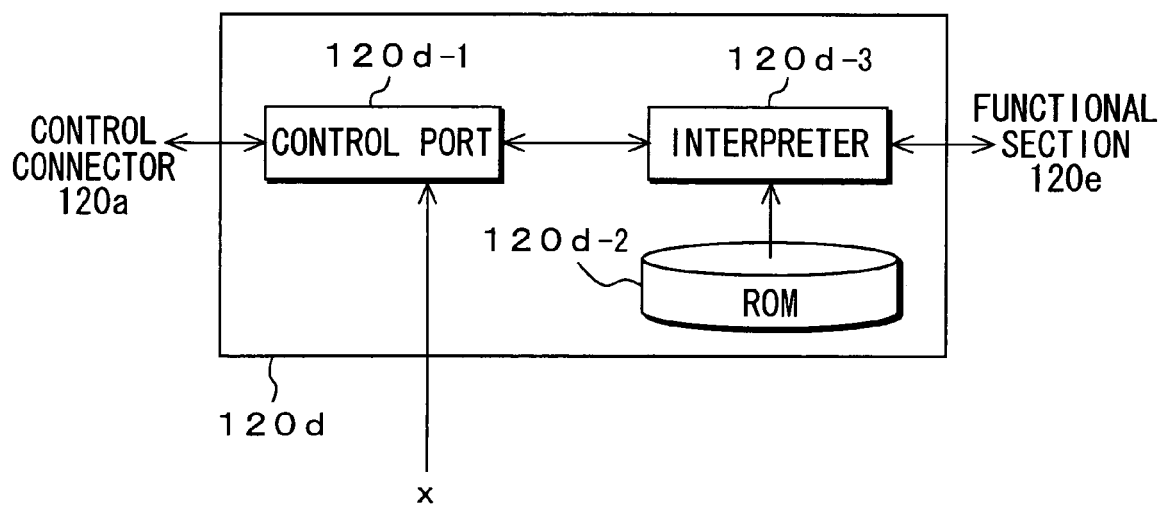
FIG. 18 is a block diagram for showing a configuration of a control interface (control I/F) of the input selector.

FIG. 18 shows a configuration of the control I/F 120*d* in the input selector 122A. In this FIG. 18, components that correspond to those of FIG. 3 are indicated by the same symbols and reference numbers as those of FIG. 3. The noise level x detected by the above-described noise detection section 120*f* is supplied to a control port 120*d*-1. If the noise level x changes, the control port 120*d*-1 issues a common command InputNoise(x) including this noise level x and delivers it via a control connector 120*a* to the control bus 111 (see FIG. 16).

A flowchart of FIG. 19 shows issuing operation of the common command InputNoise(x) by the control port 120*d*-1 in the input selector 122A.

First, at step ST111, for example, upon power application, the issuing operation starts, at step ST112, a common command InputNoise(x') including noise level x', which is stored in a last memory region of a nonvolatile memory (not shown) built in the control port 120*d*-1.

Next, at step ST113, each time when noise level x is detected, it is determined whether this noise level x is the same as the noise level x' stored in the last memory region. If x=x', the decision at this step ST113 repeats. On the other hand, if x≠x', the common command InputNoise(x) including the detected noise level x is issued at step ST114.

Next, at step ST115, the noise level x is set as the noise level x' and it is stored in the last memory region of the nonvolatile memory and the operation then returns to the step ST113 for decision.

The other components of the input selector 122A are configured and operate in the same manner as those of the input selector 122 in the image-signal-processing apparatus 100 of FIG. 1.

Further, an ROM 120*d*-2 in a control I/F 120*d* of a signal router 123 (as a functional block 3) in the image-signal-processing apparatus 100A stores correlations between the common commands InitializeConnect(1/2/3/4/5) meaning inter-functional-block connections 1-5 and the intra-functional-block commands, route (1/2/3) meaning inter-processing-substrate connection switchover, respectively, as shown in FIG. 5 and also stores correlations between common commands InputNoise(0-9) meaning input noise levels and intra-functional-block commands, route(3/4) meaning inter-processing-substrate connection switchover, respectively, as shown in FIG. 20.

As described above, the common commands InputNoise (0-9) are delivered from the input selector 122A to the control bus 111. When the control port 120*d*-1 receives the common commands InputNoise(0-9) and the common command InitializeConnect(4/5) issued by the system control block 110 in a condition where the image-signal-processing apparatus 100A has a fourth or fifth configuration, an interpreter 120*d*-3 in the control I/F 120*d* of the signal router 123 converts the common commands InputNoise(0-9) into the intra-functional-block commands, route (3/4), based on the correlations stored in the ROM 120*d*-2. In this case, if the noise level x (0-9) is larger than a predetermined level c, it is converted into route(3) and, if the level is not larger than the predetermined level x, it is converted into route(4).

It is to be noted that in the fourth configuration, in addition to the functional blocks of the first configuration (the basic configuration) in which a U/V tuner 112 (as a functional block 1) is inserted into a slot 104*a* and a DRC circuit 124 (as a functional block 4) is inserted into a slot 104*c*, further a panel-dedicated processing circuit 125 (as a functional block 5) is inserted into a slot 104*d* and a noise removal circuit 127 (as a functional block 7) is inserted into a slot 104*e*. Further, in the fifth configuration, in addition to the functional blocks of this first configuration (as the basic configuration), further a digital terrestrial tuner 126 (as a functional block 5) is inserted into the slot 104*b*, the panel-dedicated processing circuit 125 (as a functional block 5) is inserted into the slot 104*d*, and the noise removal circuit 127 (as a functional block 7) is inserted into the slot 104*e*.

Further, the command, route(3) is used to control the functional section 120*e* to enter a third state in which the fist input terminal is connected to the third output terminal, the fourth input terminal is connected to the first output terminal, the second input terminal is connected to the second output terminal, and the third input terminal is connected to the fourth output terminal. The command route(4) is used to control the functional section 120*e* to enter a fourth state in which the first input terminal is connected to the first output terminal, the second input terminal is connected to the second output terminal, and the third input terminal is connected to the fourth output terminal.

In such a manner, when the image-signal-processing apparatus 100A has the fourth or fifth configuration, the control I/F 120*d* in the signal router 123 does not always output intra-functional-block command, route(3), corresponding to the common command InitializeConnect(4/5) but outputs the intra-functional-block command, route(3) or the intra-functional-block command, route (4) in accordance with noise level x in the common command InputNoise(x).

Figure 21:
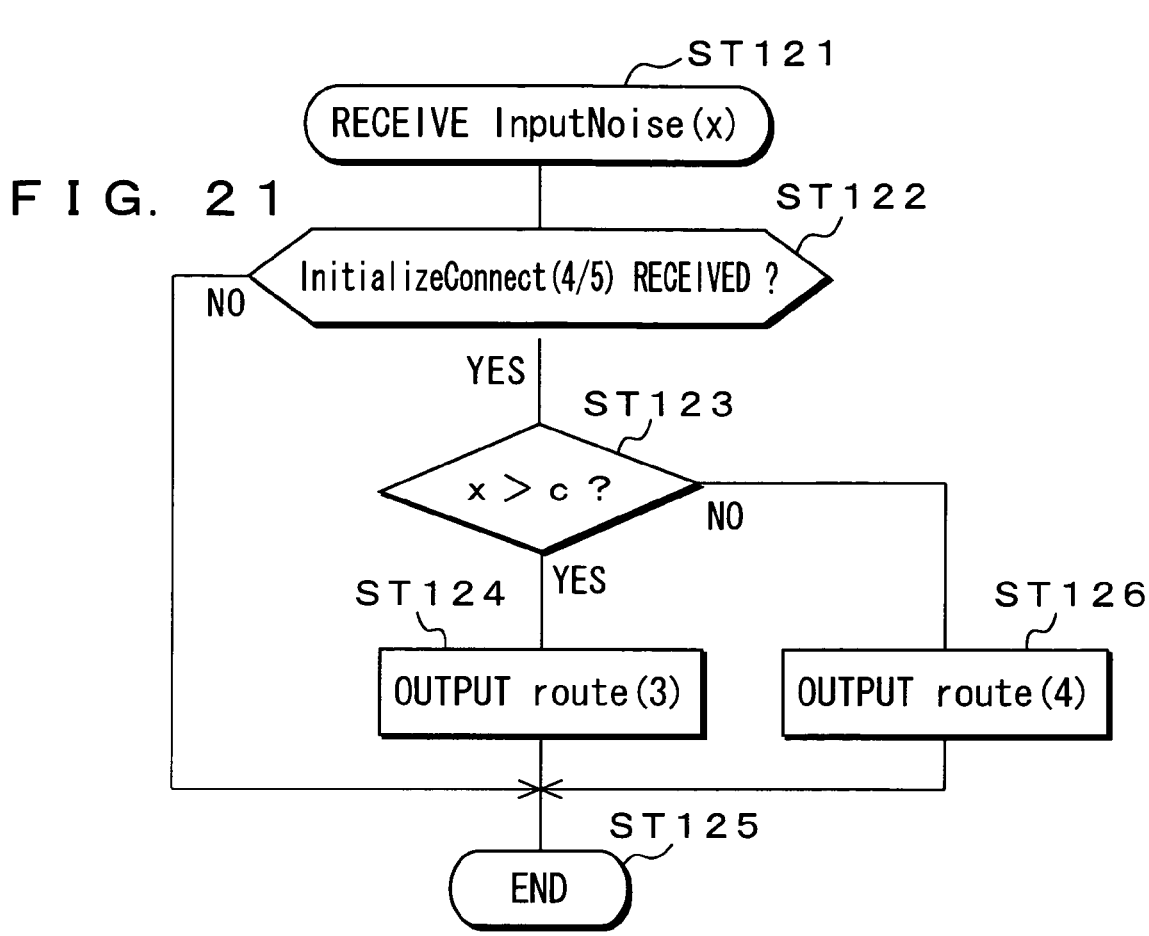
FIG. 21 is a flowchart showing operations of the control interface in the DRC circuit when it has received a common command InputNoise(x)

A flowchart of FIG. 21 shows operations of the control I/F 120*d* in the signal router 123 when receiving the common command InputNoise(x).

When receiving the common command InputNoise(x) at step ST121, it is determined at step ST122 whether the common command InitializeConnect(4/5) issued by the system control block 110 is received. If received, at step ST123, it is determined whether the noise level x is larger than the predetermined level c.

If x>c, the intra-functional-block command, route(3) is output at step ST124 and then the operations end at step ST125. If x≦c, the intra-functional-block command, route(4) is output at step ST126 and then the operations end. It is to be noted that if it is determined at the step ST122 that the command has not been received, the process directly goes to step ST125 to end the operations. This is because, in this case, the apparatus 100A has any one of the first through third configuration in which the noise removal circuit 127 is not inserted into the slot 104*e*, so that it is unnecessary to determine whether to insert the noise removal circuit 127 into a processing system.

Further, the DRC circuit 124 (as a functional block 4) in the image-signal-processing apparatus 100A stores, in the ROM 120*d*-2 in its control I/F 120*d*, the common commands DRCvol(resolutionVal,noiseVal) meaning adjustment of the DRC resolution axis and the noise axis with them being correlated with the intra-functional-block commands, volume(resolutionVal,noiseVal) meaning substitution of DRC (resolution axis and noise axis) volume values; the common commands DRCzoomExec(on/off) meaning switchover of DRC zoom processing with them being correlated with the intra-functional-block commands, zoom(InitRatio/1, InitHol/0, InitVer/0) meaning substitution of DRC zoom initial values; and the common commands DRCzoom(ratioVal, horizontalVal, verticalVal) meaning adjustment of DRC zoom ratio and zoom center positions with them being correlated with the intra-functional-block commands, zoom(ratioVal, horizontalVal, verticalVal) meaning substitution of DRC zoom ratio and zoom center positions, as shown in FIG. 5, as well as it stores the common commands InputNoise(0-9) meaning the input noise levels with them being correlated with the intra-functional-block commands, volumeNoise (noiseVal) meaning substitution of DRC (noise axis) volume values as shown in FIG. 20.

In this case, when the control port 120d-1 receives the common command InputNoise(0-9), the interpreter 120d-3 in the control I/F 120d of the DRC circuit 124 converts the noise level x (0-9) into a volume value noiseVal of noise axis by using a relational equation of, for example, noiseVal=ax+b (a, b: constants) based on the correlations stored in the ROM 120d-2, thus obtaining the intra-functional-block command, volumeNose(noiseVal). With this, the DRC circuit 124 enters a state where a noise removal ratio that corresponds to the noise level x is selected.

Figure 22:
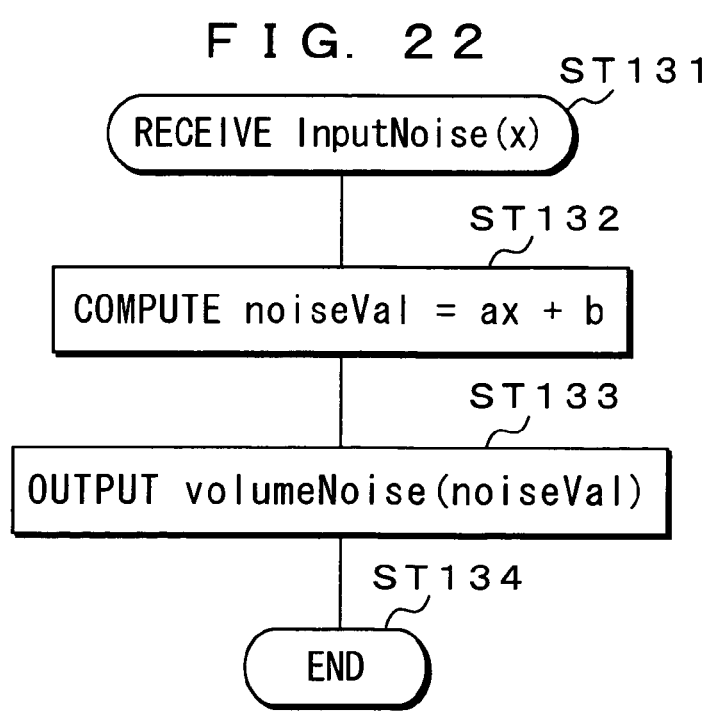
FIG. 22 is a flowchart showing operations of the control interface in a signal router when it has received a common command InputNoise(x)

A flowchart of FIG. 22 shows operations of the control interface 120d in the DRC circuit 124 when receiving the common command InputNoise(x).

When receiving the common command InputNoise(x) at step ST131, the volume value noiseVal on the noise axis is computed by using the noise level x (0-9) based on the equation of noiseVal=ax+b at step ST132. Then, at step ST133, the intra-functional-block command, volumeNoise(noiseVal) is output and then the operations end at step ST134.

Further, the noise removal circuit 127 (as a functional block 7) in the image-signal-processing apparatus 100A stores, in the ROM 120d-2 in its control I/F 120d, the common commands InputNoise(0-9) meaning the input noise levels and the intra-functional-block commands, noiseSuppress(0-9) meaning substitution of noise suppression values, respectively, in a condition where they are correlated with each other as shown in FIG. 20 in place of the correlations shown in FIG. 5 between the common commands DRCvol(resolutionVal, noiseVal) and the intra-functional-block commands, noise-Suppress(noiseVal) meaning substitution of values (noise suppression values) indicative of noise suppression ratios.

In this case, when the control port 120d-1 receivers the common commands InputNoise(0-9), the interpreter 120d-3 in the control I/F 120d of the noise removal circuit 127 converts the common commands InputNoise(0-9) into the intra-functional-block commands, noiseSuppress(0-9) based on the correlations stored in the ROM 120d-2. With this, the noise removal circuit 127 enters a state for suppressing noise in accordance with the noise level x.

Further, the OSD circuit 128 (as a functional block 8) in the image-signal-processing apparatus 100A stores, in the ROM 120d-2 in its control I/F 120d, the correlations between the common commands and the intra-functional-block commands shown in FIG. 5 as well as it stores the common commands InputNoise(0-9) and the intra-functional-block commands, writeInputNoise(0-9) meaning the input noise level display, respectively, in a condition where they are correlated with each other.

When the control port 120d-1 receives the common command InputNoise(0-9), the interpreter 120d-3 in the control I/F 120d of the OSD circuit 128 converts the common commands InputNoise(0-9) into the intra-functional-block commands, InputNoise(0-9) based on the correlations stored in the ROM 120d-2. With this, the OSD circuit 128 enters a state for generating a display signal to display the noise levels 0-9 and outputting an output image signal combined with this display signal.

It is to be noted that when the common commands Input-Noise(0-9) are delivered from the input selector 122A to the control bus 111, the system control block 110 in the image-signal-processing apparatus 100A receives the common commands InputNoise(0-9), computes a volume value noiseVal on the noise axis based on the above-described equation of noiseVal=ax+b, and saves this volume value noiseVal as an initial value that the user uses in manipulation to change the volume values on the noise axis.

The other components of the image-signal-processing apparatus 100A shown in FIG. 16 are same configured as those of the image-signal-processing apparatus 100 shown in FIG. 1.

The following will describe operations of this image-signal-processing 100A. The operations of the image-signal-processing apparatus 100A are the same as those of the image-signal-processing apparatus 100 shown in FIG. 1 except for operations related to the common commands InputNoise(0-9) issued from the input selector 122A. In this case, the first configuration (the basic configuration) and the fourth configuration in which the noise removal circuit 127 is inserted into a processing system are used for the description thereof.

Figure 23:
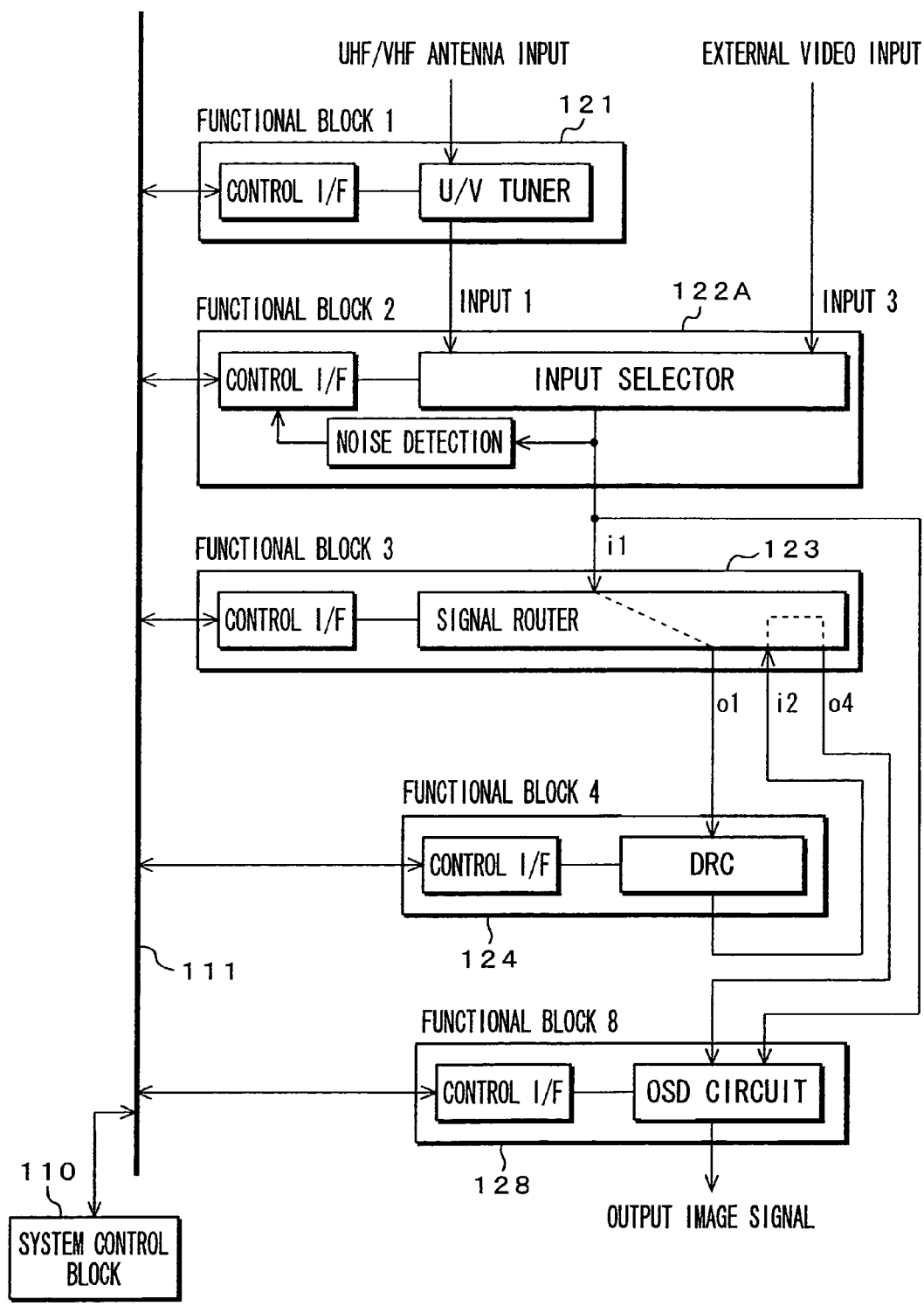
FIG. 23 is a diagram for showing a connection status of a basic configuration of the image-signal-processing apparatus.

FIG. 23 shows a connection status of the basic configuration (as the first configuration). In this case, upon power application, the system control block 110 acquires common commands from the input selector 122A, the signal router 123, and the OSD circuit 128 as well as the U/V tuner 121 and the DRC circuit 124 and also acquires substrate IDs from these input selector 122A, signal router 123, OSD circuit 128, U/V tuner 121, and DRC circuit 124, thus recognizing that the apparatus 100A has the first configuration (the basic configuration).

Then, the system control block 110 delivers to the control bus 111 the common command InitializeConnect(1) meaning this first configuration. With this, the signal router 123 enters the first state in which the first input terminal is connected to the first output terminal and the second input terminal is connected to the fourth output terminal. Further, the OSD circuit 128 generates a display signal to provide a display such that the apparatus 100A has the first configuration (the basic configuration) and outputting an output image signal combined with this display signal.

It is to be noted that upon power application, the input selector 122A delivers the common command InputNoise(x') to the control bus 111 by using the noise level x' stored in the last memory region (see FIG. 19). However, in this first configuration, this common command InputNoise(x') has no influences on operations of the signal router 123 (see FIG. 21).

Further, the system control block 110 delivers to the control bus 111 initial values (see FIG. 5) of common commands of all kinds except the common commands related to the signal router 123. Further, the input selector 122A delivers the common command InputNoise(x') to the control bus 111 upon power application as described above.

With this, the input selector 122A, the OSD circuit 128, the U/V tuner 121, and the DRC circuit 124 enter their initial states, thus starting operations as the image-signal-processing apparatus 100A. In this case, it is to be noted that as for the volume values noiseVal on the noise axis of the DRC circuit 124, such a value as to correspond to, for example, the common command InputNoise(x') is prioritized.

The U/V tuner 121 performs channel selection processing on a broadcast signal received by a U/V antenna based on any one of the common commands ch(1)-ch(12) sent from the system control block 110, thereby obtaining an image signal of a predetermined channel.

An image signal (input 1) obtained at this U/V tuner 121 is applied to the input selector 122A. Further, this input selector 122A is supplied also with an image signal (input 3) as an external video input provided by the connector 102a (see FIG. 16). At this input selector 122A, either input 1 or input 3 is selected on the basis of the common command in(1) or in(3) sent from the system control block 110.

The image signal selected by this input selector 122A is input via the first input terminal and the first output terminal of the signal router 123 to the DRC circuit 124. This DRC circuit 124 performs the DRC volume processing and the DRC zoom processing on the input image signal based on the common commands DRCvol(resolutionVal,noiseVal), DRCzoomExec(on/off), and DRCzoom(ratioVal, horizontalVal, verticalVal), which are sent from the system control block 110, and the common command InputNoise(x'), which is sent from the input selector 122A.

Then, an image signal output from the DRC circuit 124 is supplied via the second input terminal and the fourth output terminal of the signal router 123 to the first input terminal of the OSD circuit 128. The second input terminal of this OSD circuit 128 is supplied with an image signal selected by the input selector 122A.

The OSD circuit 128 performs any processing to obtain an output image signal and any processing to combine this output image signal with display signals that provide various displays based the common commands ch(1)-ch(12), in(1)-in(2), DRCvolExec(on/off), DRCvol(resolutionVal, noiseVal), DRCzoomExec(on/off), and DRCzoom(ratioVal, horizontalVal, verticalVal), which are sent from the system control block 110 and the common command InputNoise(x'), which is sent from the input selector 122A.

The output image signal obtained by this OSD circuit 128 is output as an output image signal to the connector 103 (see FIG. 16). This output image signal is supplied to a display constituted of, for example, a cathode ray tube (CRT).

Further, if a user operation is performed after power application, a common command corresponding to the user operation is delivered from the system control block 110 to the control bus 111. With this, a channel selected at the U/V tuner 121, an input selected by the input selector 122A, and contents of the DRC volume processing and the DRC zoom processing in the DRC circuit 124 are changed.

Further, after power application, if noise level x detected by the noise detection section 120f in the input selector 122A has changed from the noise level x' that has already detected, the common command InputNoise(x) is issued from the input selector 122A and delivered to the control bus 111. With this, a volume value noiseVal on the noise axis in the DRC circuit 124 is changed to a value corresponding to the noise level x and a display value of an input noise level due to the OSD circuit 128 is also changed.

Figure 24:
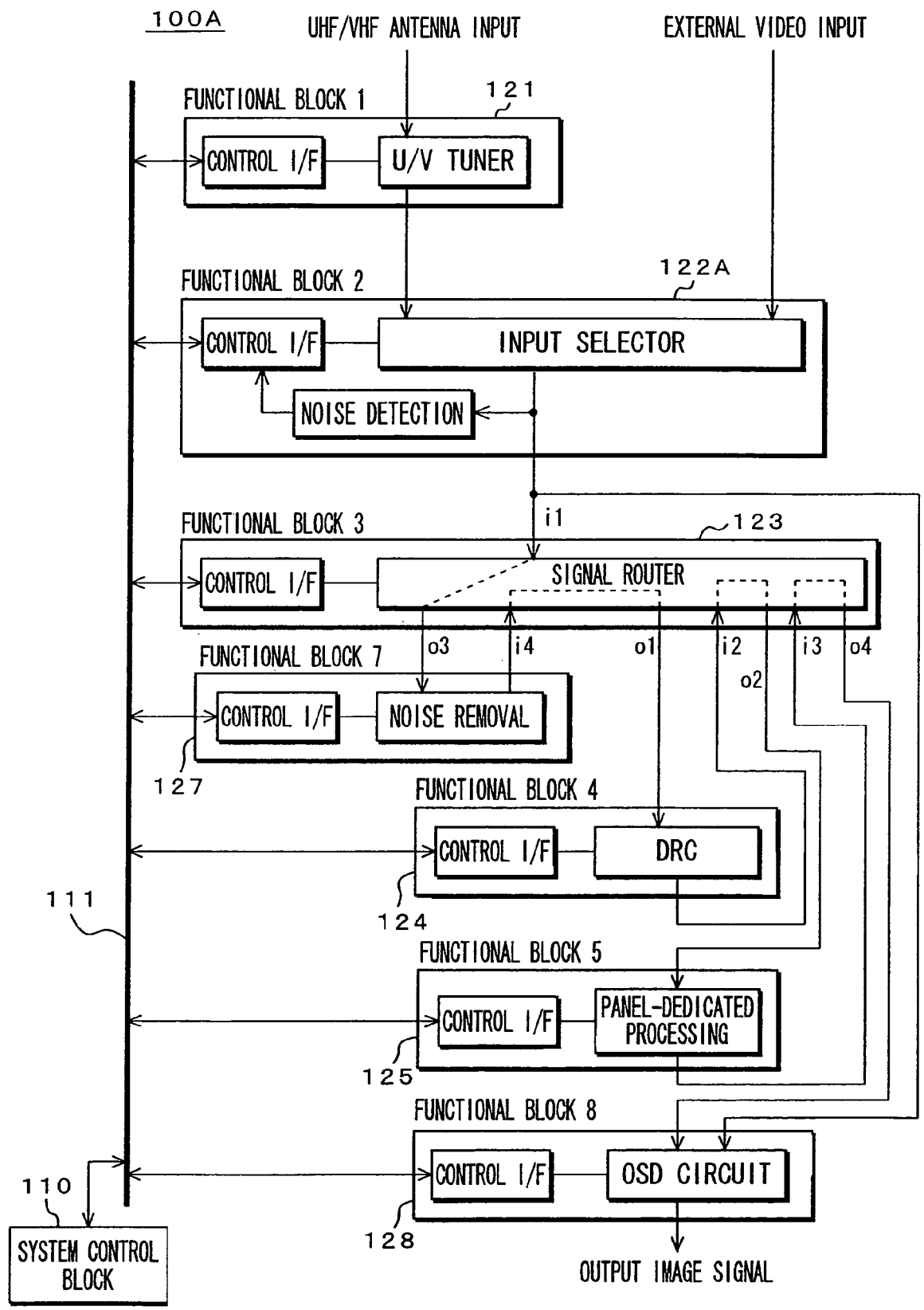
FIG. 24 is a diagram for showing a connection status in a case where a noise level x is equal to or larger than a predetermined level c when a noise removal circuit and a panel-dedicated processing circuit are added to the basic configuration.
Figure 25:
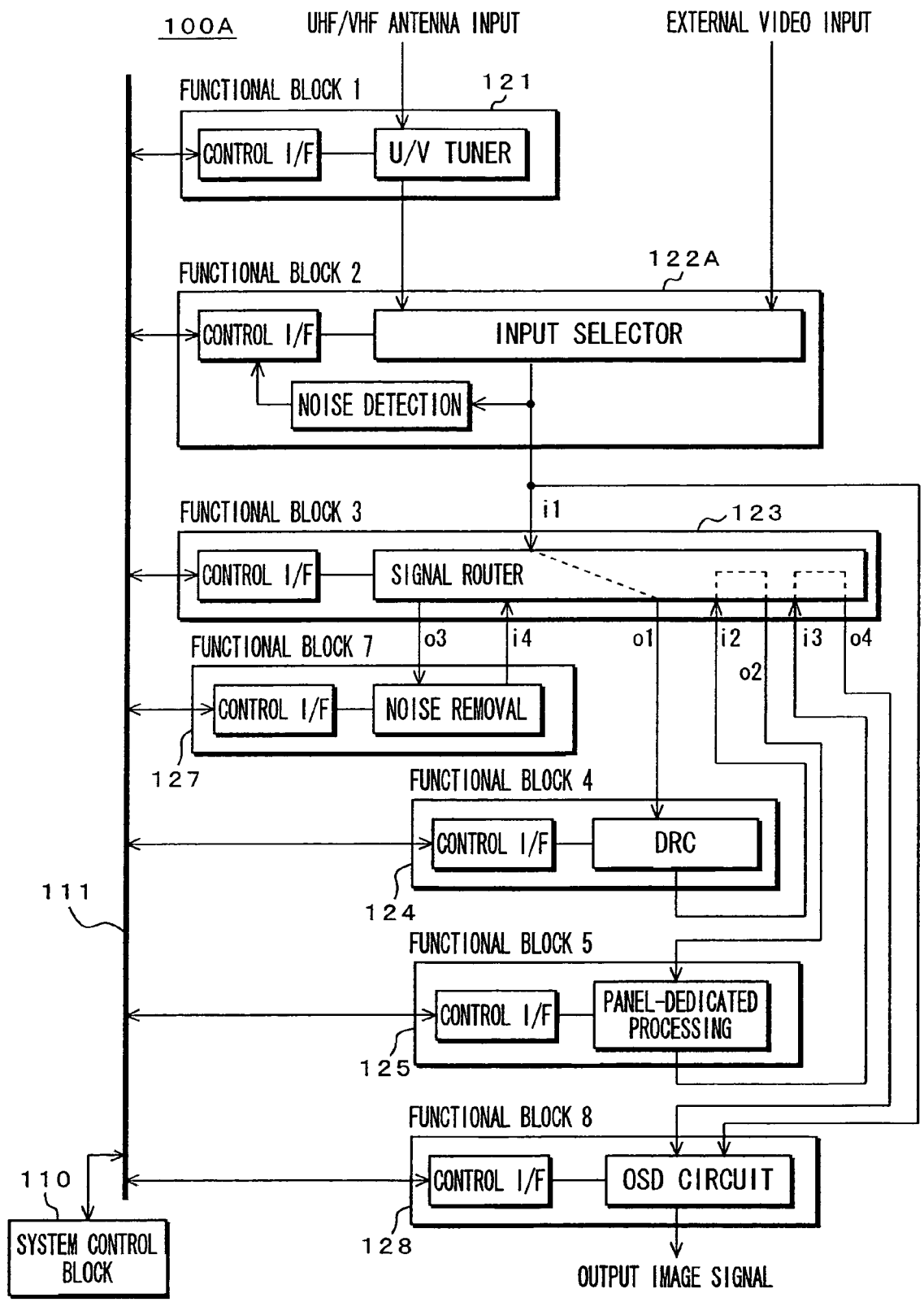
FIG. 25 is a diagram for showing a connection status in a case where the noise level x is equal to or less than the predetermined level c when the noise removal circuit and the panel-dedicated processing circuit are added to the basic configuration.

FIGS. 24 and 25 each show a connection status of the fourth configuration. In this case, upon power application, the system control block 110 acquires common commands from the input selector 122A, the signal router 123, and the OSD circuit 128 as well as the U/V tuner 121, the DRC circuit 124, and the noise removal circuit 127 and also acquires substrate IDS from the input selector 122A, the signal router 123, the OSD circuit 128, the U/V tuner 121, the DRC circuit 124, the panel-dedicated processing circuit 125, and the noise removal circuit 127, thus recognizing that the apparatus 100A has the fourth configuration.

Then, the system control block 110 delivers to the control bus 111 the common command InitializeConnect(4) meaning this fourth configuration. With this, the OSD circuit 128 enters a state for generating a display signal that provide a display such that the apparatus 100A has the fourth configuration and outputting an output image signal combined with this display signal.

Further, upon power application, the input selector 122A delivers the common command InputNoise(x') to the control bus 111 by using the noise level x' stored in the last memory region (see FIG. 19). Therefore, this signal router 123 enters the third or fourth state in accordance with the noise level x' (see FIG. 21).

That is, if the noise level x' is larger than the predetermined level c, it enters the third state in which the first input terminal is connected to the third output terminal, the fourth input terminal is connected to the first output terminal, the second input terminal is connected to the second output terminal, and the third input terminal is connected to the fourth output terminal (see FIG. 24). With this, the DRC circuit 124, the panel-dedicated processing circuit 125, and the noise removal circuit 127 are inserted into a processing system. In this case, a noise suppression value by the noise removal circuit 127 corresponds to the noise level x'.

Further, if the noise level x' is not larger than the predetermined level c, it enters the fourth state in which the first input terminal is connected to the first output terminal, the second input terminal is connected to the second output terminal, the third input terminal is connected to the fourth output terminal (see FIG. 25). With this, the DRC circuit124 and the panel-dedicated processing circuit 125 are inserted into a processing system and the noise removal circuit127 is not inserted in it. In such a manner, if the noise level x' is small, the noise removal circuit 127 is not inserted into the processing system, thereby suppressing a drop etc. in resolution due to insertion of the noise removal circuit 127 into the processing system.

Further, the system control block 110 delivers to the control bus 111 initial values (see FIG. 5) of common commands of all kinds except those common commands related to the signal router 123. Further, the input selector 122A delivers the common command InputNoise(x') to the control bus 111 upon power application as described above. With this, the input selector 122A, the OSD circuit 128, the U/V tuner 121, the DRC circuit 124, and the panel-dedicated processing circuit 125 enter their initial states, thus starting operations as the image-signal-processing apparatus 100A. In this case, it is to be noted that as for the volume values noiseVal on the noise axis of the DRC circuit 124, such a value as to correspond to, for example, the common command InputNoise(x') is prioritized.

The U/V tuner 121 performs channel selection processing on a broadcast signal received by the U/V antenna based on any one of the common commands ch(1)-ch(12) sent from the system control block 110, thereby obtaining an image signal of a predetermined channel.

An image signal (input 1) obtained at this U/V tuner 121 is applied to the input selector 122A. Further, this input selector 122A is supplied also with an image signal (input 3) as an external video input provided by the connector 102a (see FIG. 16). At this input selector 122A, either input 1 or input 3 is selected on the basis of the common command in(1) or in(3) sent from the system control block 110.

If the noise level x' is larger than the predetermined level c, as shown in FIG. 24, an image signal selected by the input selector 122A is supplied to the noise removal circuit 127 via the first input terminal and the third output terminal of the signal router 123. This noise removal circuit 127 performs any processing to suppress noise by using a noise suppression value that corresponds to the noise level x'. The image signal output from this noise removal circuit 127 is input to the DRC circuit 124 via the fourth input terminal and the first output terminal of the signal router 123.

On the other hand, if the noise level x' is equal to or lower than the predetermined level c, as shown in FIG. 25, the image signal selected by the input selector 122A is input to the DRC circuit 124 via the first input terminal and the first output terminal of the signal router 123.

This DRC circuit 124 performs the DRC volume processing and the DRC zoom processing on the input image signal based on the common commands DRCvol(resolutionVal, noiseVal), DRCzoomExec(on/off), and DRCzoom(ratioVal, horizontalVal, verticalVal), which are sent from the system control block 110 and the common command InputNoise(x'), which is sent from the input selector 122A.

Then, the image signal output from the DRC circuit 124 is supplied to the panel-dedicated processing circuit 125 via the second input terminal and the second output terminal of the signal router 123. This panel-dedicated processing circuit 125 performs on the input image signal any processing required to display an image based on this image signal on a flat panel display such as an LCD or a PDP, for example, luminosity adjustment, color adjustment, conversion of the numbers of horizontal and vertical pixels, mode conversion from the interlace mode to the progressive mode, etc.

Then, the image signal output from this panel-dedicated processing circuit 125 is supplied to the first input terminal of the OSD circuit 128 via the third input terminal and the fourth terminal of the signal router 123. The second input terminal of this OSD circuit 128 is supplied with an image signal selected by the input selector 122A. This OSD circuit 128 performs any processing to obtain an output image signal, combine this output image signal with display signals to provide various displays, etc. based on the common commands ch(1)-ch(12), in(1)-in(2), DRCvolExec(on/off), DRCvol(resolutionVal, noiseVal), DRCzoomExec(on/off), and DRCzoom(ratioVal, horizontalVal, verticalVal), which are sent from the system control block 110, and the common command InputNoise(x'), which is sent from the input selector 122A.

This output image signal obtained by this OSD circuit 128 is output as an output image signal to the connector 103 (see FIG. 16). This output image signal is supplied to a display constituted of an LCD if the panel-dedicated processing circuit 125 is provided for the LCD and, if it is provided for a PDP, supplied to a display constituted of the PDP.

Further, if a user operation has been performed after power application, a common command that corresponds to the user operation is delivered from the system control block 110 to the control bus 111. With this, a channel selected by the U/V tuner 121, an input selected by the input selector 122A, and contents of DRC volume processing and the DRC zoom processing by the DRC circuit 124 are changed.

Further, after power application, if noise level x detected by the noise detection section 120f in the input selector 122A has changed from the noise level x' that has been already detected, the common command InputNoise(x') is issued from the input selector 122A and delivered to the control bus 111. With this, a volume value noiseVal on the noise axis in the DRC circuit 124 is changed to a value corresponding to the noise level x and a display value of an input noise level due to the OSD circuit 128 is also changed. Further, a noise suppression value at the noise removal circuit 127 is changed to a value corresponding to the noise level x and the signal router 123 enters the third state (see FIG. 24) or the fourth state (see FIG. 25) in accordance with whether the noise level x is larger than the predetermined level c.

According to this second embodiment, if a common command transmitted from the system control block 110 and the input selector 122A relates to each of the control blocks 120 (the U/V tuner 121, the input selector 122A, the signal router 123, the DRC circuit 124, the noise removal circuit 127, and the OSD circuit 128), the control blocks 120 convert this common command into an intra-functional-block command to control the functional section 120e thereof. In this second embodiment, as in the case of the above-described first embodiment, each of the functional blocks 120 adaptively operates, thereby enabling easily upgrading functions of the control block 120 by version upgrade thereof without changing the common commands.

Further, in this second embodiment, the input selector 122A serving as the functional block 120 delivers to the control bus 111 the common command InputNoise(x) including the noise level x detected from an image signal, so that information of the noise level x included in this common command InputNoise(x) can be easily utilized by any other multiple functional blocks, that is, the signal router 123, the DRC circuit 124, and the noise removal circuit 127.

Although in this second embodiment, an example has been described to detect the noise level x in an image signal at the input selector 122A and issue the common command InputNoise(x) including the noise level x from this input selector 122A, any other information than the noise level x may be detected to issue the common command InputNoise(x) including this information so that this information may be used by any other functional blocks such as the DRC circuit 124. As this information, information on a movement in an image signal, information of whether the image signal is based on a film source having peculiar noise, etc. may be considered.

It is to be noted that in such an embodiment as this second embodiment in which the common commands are issued from the system control block and the functional block, as in the case of the above-described first embodiment, a command indicative of normal operation is returned at predetermined-interval timings by a common-command issuing block or by a common command-receiving functional block when it has received a common command to a block that has issued the common command so that if such a command is not returned to it, the block may deliver the common commands of all the kinds or some of them again to the control bus 111. It is thus possible to prevent any misalignment in cooperation among plural functional blocks.

Figure 26:
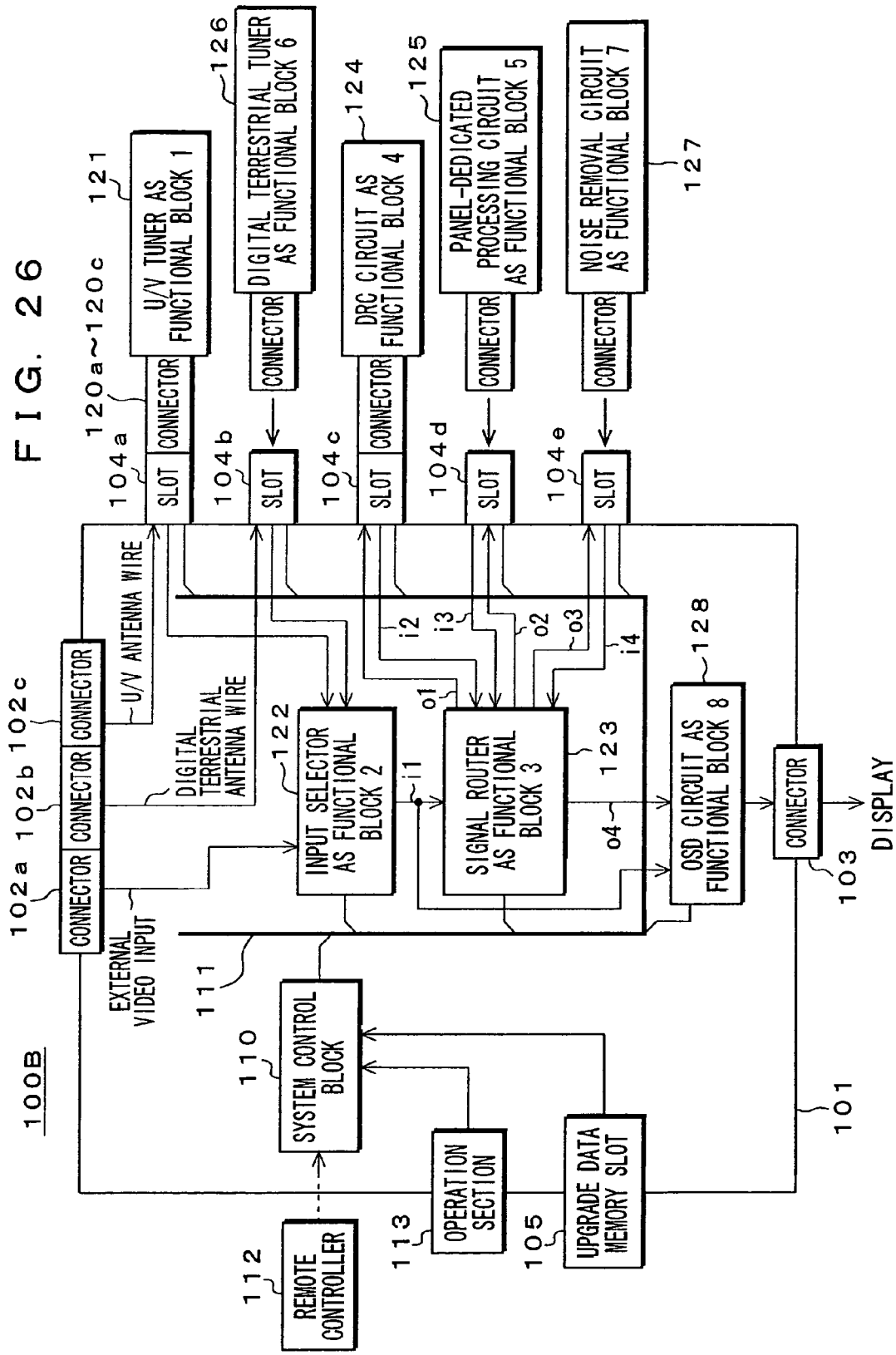
FIG. 26 is a block diagram for showing a configuration of an image-signal-processing apparatus according to a third embodiment of the invention.

The following will describe a third embodiment of the present invention. FIG. 26 shows a configuration of an image-signal-processing apparatus 100B according to the second embodiment of the invention. This image-signal-processing apparatus 100B employs a CAN bus as a control bus 111. In this FIG. 26, components that correspond to those of FIG. 1 are indicated by the same symbols and reference numbers of FIG. 1, their detailed description of which will be omitted appropriately.

In this image-signal-processing apparatus 100B, a chassis 101 has an upgrade data memory slot 105 formed in it. Into this slot 105, a memory card (not shown) storing upgrade data is inserted. In this context, upgrade data refers to data required when a functional bock is added or its version is upgraded, for example, data indicative of correlations between user operation signals and common commands, data indicative of correlations between common commands and intra-functional-block commands, etc. The other components of this image-signal-processing apparatus 100B are same configured as those of the image-signal-processing apparatus 100 shown in FIG. 1.

Figure 27:
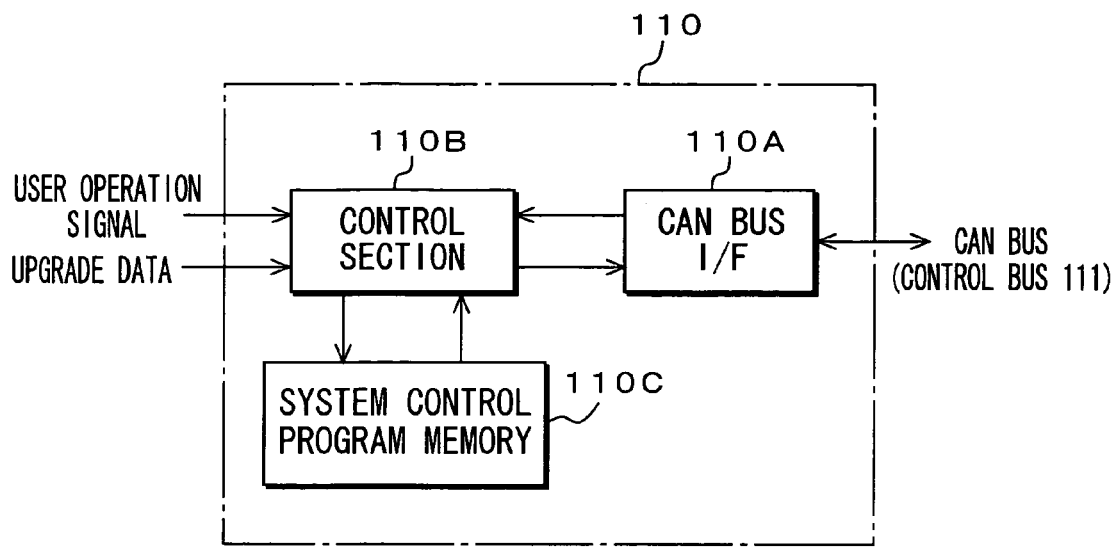
FIG. 27 is a block diagram for showing a configuration of a system control block.

FIG. 27 shows a configuration of a system control block 110. This system control block 110 has a CAN interface (CAN bus I/F) 110A, a control section 110B, and a system control program memory 110C. The CAN bus I/F 110A provides interface with the CAN bus (control bus 111). Further, this CAN bus I/F 110A hardware-wise selects communication data (common commands, last memory data, etc.) sent through the CAN bus and stores it in a receive message buffer and also delivers to the CAN bus (control bus 111) communication data (upgrade data, common commands, etc.) stored in a transmit message buffer.

The control section 110B is constituted of a microcomputer, which is not shown, and controls the whole system while receiving communication data (last memory data, common commands, etc.) stored in the receive message buffer in the CAN bus I/F 110A. The system control program memory 110C stores control programs etc. related to operations of the control section 110B. It is to be noted that in this system control program memory 110C, the above-described data indicative of correlations between user operation signals and common commands etc. is also stored.

The following will describe operations of this system control block 110. For example, operations in a case where the control section 110B accepts a user operation signal will be described. In this case, the system control section 110B reads an appropriate control program out of the system control program memory 110C based on this user operation signal as required to generate a common command (global command) that corresponds to this user operation signal and stores this common command in the transmit message buffer of the CAN bus I/F 110A. Then, the CAN bus I/F 110A delivers to the CAN bus (the control bus 111) the common command stored in the transmit message buffer.

Figure 28A:
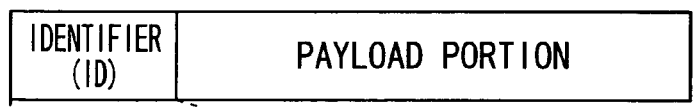
FIG. 28A is an explanatory diagram of a format for communication data.
Figure 28B:
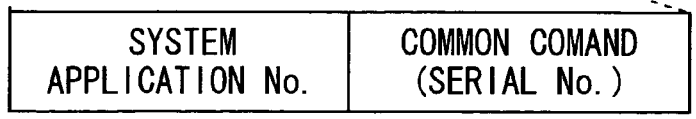
FIG. 28B is an explanatory diagram of contents of an identifier (ID) in a case where the communication data is a common command.

A format for communication data will be described below. As shown in FIG. 28A, communication data is comprised of an identifier (ID) and a payload portion or only an identifier (ID). To the payload portion, a parameter of a command or data is allocated. If communication data is a common command, as shown in FIG. 28B, an identifier (ID) is comprised of a system application number and a common command serial number. For example, if an identifier is comprised of 12 bits, the system application number is represented in four bits and the common command serial number is represented in eight bits.

FIGS. 29 and 30 show correlations between common commands and intra-functional-block commands. FIG. 29 shows the correlations in a case where a DRC circuit (as a functional block 4) shown in FIG. 26 has no zoom functions and FIG. 30 shows the correlations in a case where the DRC circuit 124 has zoom functions. To upgrade the DRC circuit 124 so that it may have zoom functions, common commands DRCzoomExec(on/off) and DRCzoom(ratioVal, horizontalVal, verticalVal) are newly added. Contents of the common commands shown in FIGS. 29 and 30 are the same as those shown in the above-described FIG. 5, the description of which will be omitted here.

For example, it is supposed that identifiers of the common commands ch(1)-ch(12) are "0xC01-0xC0C; identifiers of the common commands in(1)-in(3) are "0xA01"; an identifier of DRCvolExec(on/off) is "0x501"; an identifier of DRCvol (resolutionVal,noiseVal) is "0x502"; an identifier of DRC-zoomExec(on/off) is "0x503"; an identifier of DRCzoom(ratioVal, horizontalVal, verticalVal) is "0x504", and an identifier of the common command InitializeConnect(1/2/3/4/5) is "0x001". The common commands ch(1)-ch(12) are comprised of only identifiers "0xC01-0xC0C" so that their contents can be known from these and so require no payload portions, whereas contents of the other common commands cannot be known only from their identifiers, so that their parameters are allocated to their payload portions.

Further, for example, operations will be described in a case where a memory card in which upgrade data is stored is inserted into the slot 105 (see FIG. 26). The control section 110B reads the upgrade data out of this memory card. Then, the control section 110B writes this upgrade data into the system control program memory 110C. Further, the control section 110B adds a predetermined identifier (ID) to the upgrade data required in each functional block and stores them in the transmit message buffer in the CAN bus I/F 110A. The CAN bus I/F 110A delivers to the CAN bus (the control bus 111) the upgrade data stored in the transmit message buffer.

The memory card is inserted into the slot 105 when, for example, the DRC circuit 124 is upgraded so that it may have zoom functions. In this case, upgrade data related to the common commands DRCzoomExec(on/off) and DRCzoom (ratioVal, horizontalVal, verticalVal) is supplied with the memory card. In this case, the upgraded DRC circuit 124 itself has data indicative of correlations between the common commands DRCzoomExec(on/off) and DRCzoom(ratioVal, horizontalVal, verticalVal) and the intra-functional-block commands beforehand, whereas a OSD circuit 128 (as a functional block 8) does not have data on the correlations. Therefore, in this case, the upgrade data is transmitted to the OSD circuit 128.

Further, for example, operations will be described in a case where last memory data is sent from each of the functional blocks via the CAN bus (control bus 111). In this case, the last memory data is stored in the receive message buffer in the CAN bus I/F 110A. The control section 110B in turn reads the last memory data from the receive message buffer and writes it into a predetermined region (last memory) in the system control program memory 110C.

Figure 31:
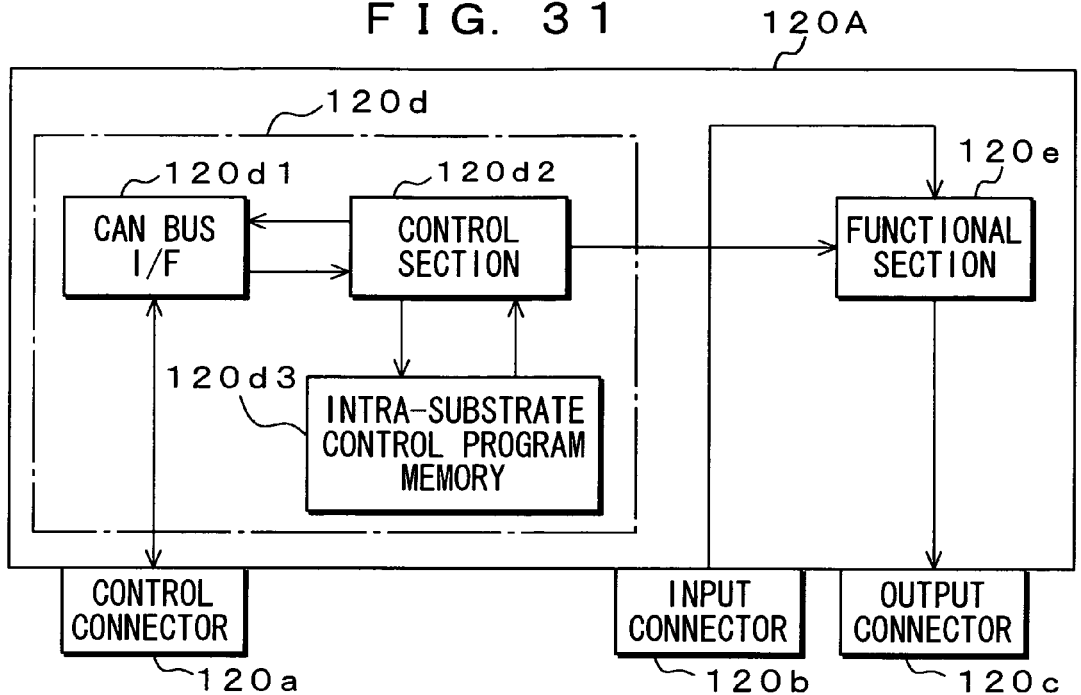
FIG. 31 is a block diagram for showing a configuration of the functional block.

FIG. 31 shows a configuration of a functional block 120A, which provides a basis of the functional blocks 1-8 shown in FIG. 26. In this FIG. 31, components that correspond to those of FIG. 2 are indicated by the same symbols and reference numbers of FIG. 2, the detailed description of which will be omitted appropriately.

This functional block 120A has a control connector 120a, an input connector 120b, and an output connector 120c. The functional block 120A further has a control interface (control I/F) 120d and a functional section 120e. The input connector 120b is supplied with a signal to be processed by the functional section 120e, and the signal is input to the functional section 120e via the input connector 120b. At the output connector 120c, a signal processed and output by the functional section 120e appears.

The control connector 120a is connected to the CAN bus (the control bus 111). The control I/F 120d is connected to the control connector 120a. The control I/F 120d controls functions of the functional section 120e based on common commands, which are sent via the CAN bus (the control bus 111).

The control I/F 120d has a CAN bus interface (a CAN bus I/F) 120d1, a control section 120d2, and an intra-substrate control program memory 120d3. The CAN bus I/F 120d1 provides an interface with the CAN bus (control bus 111). This CAN bus I/F 120d1 hardware-wise selects communication data (common commands, upgrade data, etc.) sent through the CAN bus and stores it in the receive message buffer and also delivers to the CAN bus communication data (last memory data, common commands, etc.) stored in the transmit message buffer.

Figure 32:
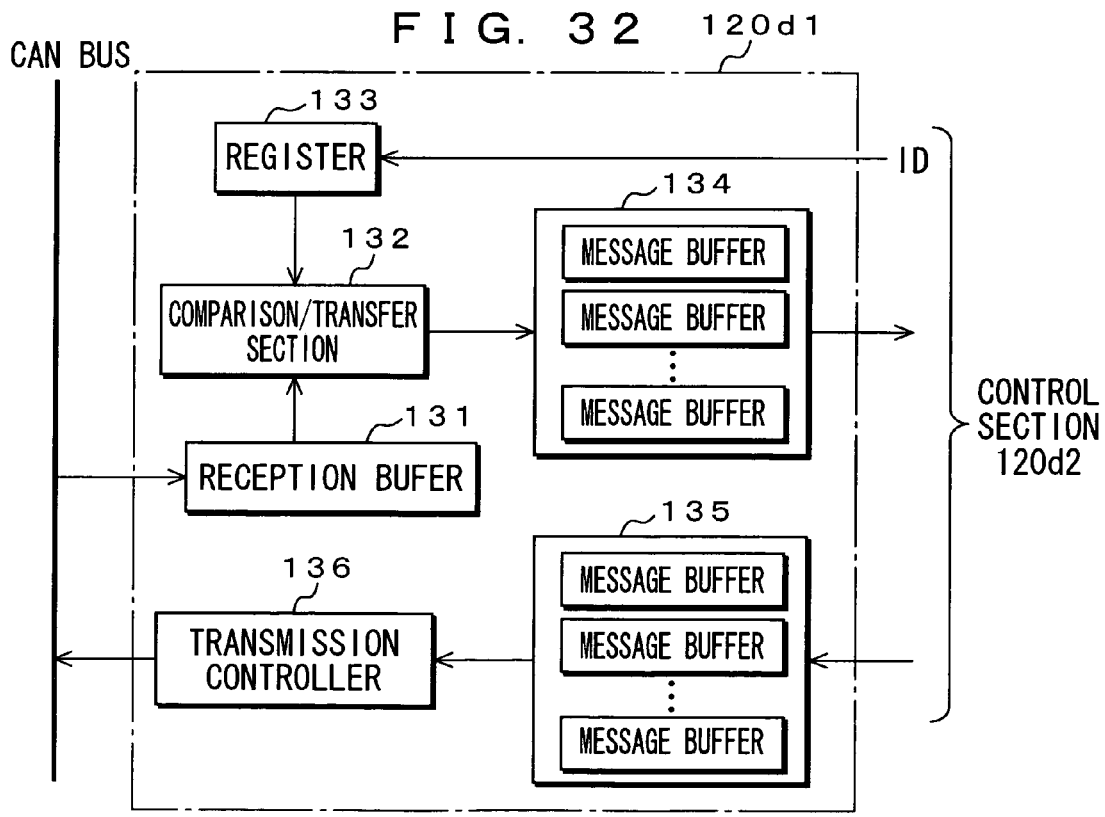
FIG. 32 is a block diagram for showing an outlined configuration of a CAN bus I/F.

FIG. 32 shows an outlined configuration of the CAN bus I/F 120d1. This CAN bus I/F 120d1 has a reception buffer 131, a comparison/transfer section 132, a register 133, and a receive message buffer 134. The reception buffer 131 is used to temporarily fetch the communication data (common commands, upgrade data, etc.) sent via the CAN bus (the control bus 111). The register 133 is used to set an identifier (ID) of the communication data (common commands, upgrade data, etc.) to be received by one's own functional block. An identifier is set to this register 133 by the control section 120d2. In the case of the common commands, for example, only a portion of a system application number may be set to the register 133 (see FIGS. 28A and 28B).

The receive message buffer 134 is used to store the communication data (common commands, upgrade data, etc.) to be received by one's own functional block and to transfer it to the control section 120d2. This receive message buffer 134 is comprised of plural message buffers so that it can store plural items of communication data concurrently. The comparison/transfer section 132 hardware-wise decides through comparison whether an identifier of communication data temporarily fetched into the reception buffer 131 is set to the register 133 and, if such is the case, transfers that communication data from the reception buffer 131 to the receive message buffer 134 and stores it therein.

Further, the CAN bus I/F 120d1 has a transmit message buffer 135 and a transmission controller 136. The transmit message buffer 135 stores the communication data (last memory data, common commands, etc.) from the control section 120d2 to be transmitted to the system control block 110 and the other functional blocks and transfers it to the transmission controller 136 described later. This transmit message buffer 135 is comprised of plural message buffers so that it can store plural items of communication data concurrently. The transmission controller 136 delivers to the CAN bus (the control bus 111) communication data stored in the transmit message buffer 135, at a predetermined timing.

It is to be noted that, although FIG. 32 has shown the CAN bus I/F 120d1 that the control I/F 120d in the functional block 120A has, the CAN bus I/F 100A that the above-described system control block 110 has is configured similar to it, which is not described.

Referring back to FIG. 31, the control section 120d2 has a microcomputer, which is not shown, to provide any control operations based on the communication data (common commands, upgrade data, etc.) stored in the receive message buffer in the CAN bus I/F 120d1. Further, this control section 120d2 generates communication data (last memory data, common commands, etc.) to be sent to the system control block 110 and the other functional blocks and stores it in the transmit message buffer 135 in the CAN bus I/F 120d1. Further, this control section 120d2 sets, to the register 133 in the CAN bus I/F 120d1, an identifier (ID) of the communication data (common commands, upgrade data, etc.) to be received by one's own functional block. The intra-substrate control program memory 120d3 stores a control program etc. related to operations of the control section 120d2. It is to be noted that this intra-substrate control program memory 120d3 stores also the above-described correlations between the common commands and the intra-functional-block commands.

The following describe operations of the functional block shown in FIG. 31. For example, operations will be described in a case where common commands are sent via the CAN bus (the control bus 111). In this case, the common commands are temporarily fetched into the reception buffer 131 in the CAN bus I/F 120d1. Then, the comparison/transfer section 132 in the CAN bus I/F 120d1 hardware-wise decides through comparison whether an identifier of any of the common commands fetched into the reception buffer 131 is set to the register 133 and, if such is the case, transfers that common command fetched in this reception buffer 131 to the receive message buffer 134 and stores it therein.

The control section 120d2 reads the common command stored in the receive message buffer 134 in the CAN bus I/F 120d1 and, based on this common command, reads an appropriate control program from the program memory 120d3 as required and, based on this control program, sends an intra-functional-block command to the functional section 120e. The functional section 120e changes functions, for example, a signal path or signal processing based on this intra-functional-block command.

Further, for example, operations will be described in a case where upgrade data is sent via the CAN bus (control bus 111). In this case, this upgrade data is temporarily fetched into the reception buffer 131 in the CAN bus I/F 120d1. Then, the comparison/transfer section 132 in the CAN bus I/F 120d1 hardware-wise decides through comparison whether an identifier of the upgrade data fetched into the reception buffer 131 is set to the register 133 and, if such is the case, transfers that upgrade data fetched in this reception buffer 131 to the receive message buffer 134 and stores it therein.

The control section 120d2 reads the upgrade data stored in the receive message buffer 134 in the CAN bus I/F 120d1 and writes this upgrade data into the intra-substrate control program memory 120d3. It is to be noted that the control section 120d2 sets an identifier (ID) of any common commands to be received to the register 133 in the CAN bus I/F 120d1 for each time when the common command to be received is changed due to reception of, for example, upgrade data.

Further, for example, operations will be described in a case where communication data (last memory data, common commands, etc.) generated by the control section 120d2 is sent to the system control block 110 and the other functional blocks. In this case, the control section 120d2 stores the communication data in the transmit message buffer 135 in the CAN bus I/F 120d1. Then, the transmission controller 136 in the CAN bus I/F 120d1 delivers the communication data stored in the transmit message buffer 135 to the CAN bus (control bus 111) at a predetermined timing.

Figure 33A:
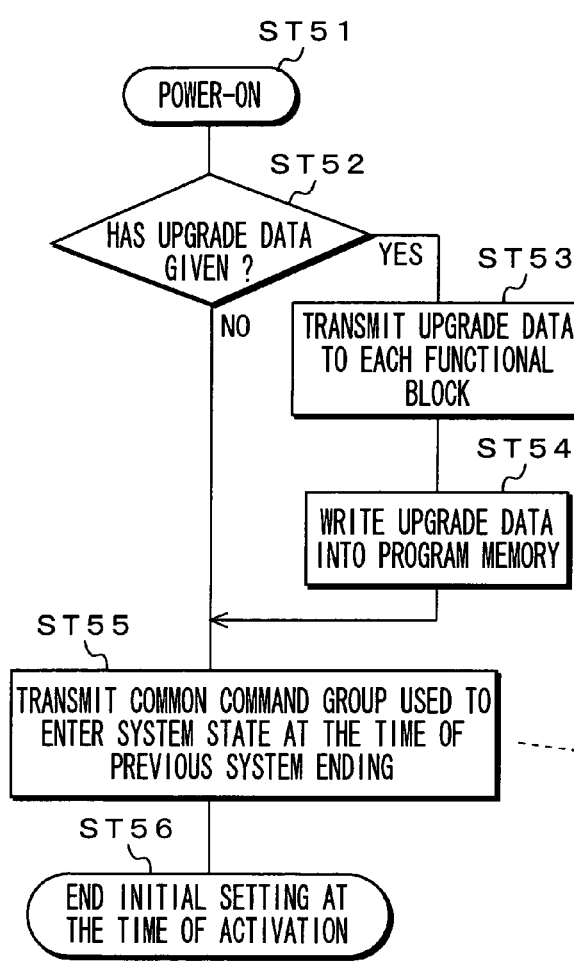
FIG. 33A is a flowchart showing an operation flow (upon activation) of a control I/F of a system control block.
Figure 33B:
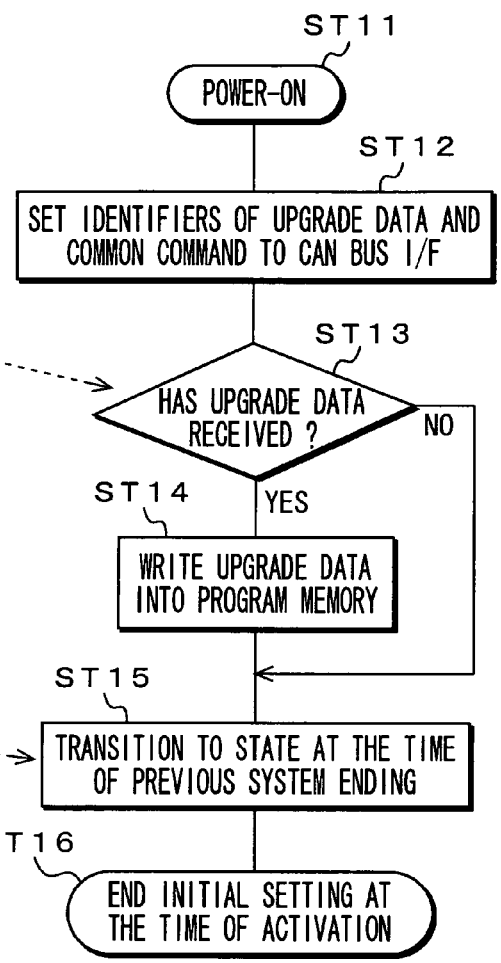
FIG. 33B is a flowchart showing an operation flow (upon activation) of a control I/F in each functional block.

The following will describe operations, upon activation, of the system control block 110 and the control I/F 120d in each of the functional blocks in the image-signal-processing apparatus 100B shown in FIG. 26 with reference to flowcharts of FIGS. 33A and 33B.

FIG. 33A shows operations of the system control block 110. When power is applied at step ST51, the control section 110B decides at step ST52 whether upgrade data is provided. If the upgrade data is provided with a memory card that stores the upgrade data being inserted into the memory slot 105, the operation goes to step ST53.

At this step ST53, the control section 110B stores in the transmit message buffer in the CAN bus I/F 110A such upgrade data as to be required on the side of the functional blocks among items of the upgrade data stored in the memory card with an identifier (ID) being added to this required upgrade data and delivers it to the CAN bus (the control bus 111). Then, at step ST54, the control section 110B reads such the upgrade data as to be required by its own block among items of the upgrade data stored in the memory card, and writes it into the system control program memory 110C, so that the operation goes to step ST55.

At step ST55, the control section 110B generates a group of common commands used to enter a system state at the time of the most recent system ending based on last memory data stored in a predetermined region (last memory) in the system control program memory 110C, stores the group in the transmit message buffer in the CAN bus I/F 110A, and delivers it to the CAN bus (the control bus 111). Then, at step ST56, the control section 110B ends initial setting at the time of activation.

FIG. 33B shows operations of the control I/F 120*d* in each of the functional blocks. When power is applied at step ST11, the control section 120*d*2 sets to the register 133 in the CAN bus I/F 120*d*1 an identifier (ID) of upgrade data and an identifier (ID) of a common command, which are to be received by its own functional block upon activation at step ST12.

At step ST13, the control section 120*d*2 decides whether the upgrade data is received. If receiving the upgrade data, at step ST14 the control section 120*d*2 reads the received upgrade data, that is, the upgrade data stored in the receive message buffer 134 in the CAN bus I/F 120*d*1 and writes it into the intra-substrate control program memory 120*d*3. Then, the operation goes to step ST15. If receiving no upgrade data at step ST13, the operation directly goes to step ST15.

At this step ST15, the control section 120*d*2 receives such a common command sent from the system control block 110 as to be used to enter the previous system state and, based on this command, reads an appropriate control program from the program memory 120*d*3 as required and, based on this control program, sends an intra-functional-block command to the functional section 120*e*. In such a manner, the functional section 120*e* is made to transition into a state at the time of the previous system ending. Then, at state ST16, the control section 120*d*2 ends initial setting at the time of activation.

It is to be noted that the image-signal-processing apparatus 100 shown in FIG. 1 has acquired a substrate ID from each of the functional blocks upon activation to recognize a substrate configuration and then, based on the recognized configuration, and has delivered the common command InitializeConnect meaning inter-functional-block connection to the control bus 111 to provide the inter-functional-block connection (see ST2 and ST3 of FIG. 6). In contract, in the image-signal-processing apparatus 100B shown in FIG. 26, the system control block 110 delivers to the CAN bus (the control bus 111) the common command InitializeConnect that corresponds to inter-functional-block connection at the time of the previous system ending to provide inter-functional-block connection.

Next, normal operations of the control I/F 120*d* of each of the functional blocks in the image-signal-processing apparatus 100B shown in FIG. 26 will be described with reference to a flowchart of FIG. 34.

When initial setting at the time of activation ends at step ST21, the control section 120*d*2 sets an identifier (ID) of a common command to be received in normal operations to the register 133 in the CAN bus I/F 120*d*1 at step ST22. For example, it sets "0xC" to the register in the U/V tuner 121, "0xA" to the register in the input selector 122, "0x0" to the register in the signal router 123, "0x5" to the register in the DRC circuit 124, "0x502" to the register in the noise removal circuit 127, and "0xC", "0xA", "0x5", and "0x0" to the register in the OSD circuit 128 (see FIGS. 29 and 30).

At step ST23, the control section 120*d*2 decides whether the common command has been received. If the common command has been received, at step ST24 the control section 120*d*2 reads the received common command, that is, any common command stored in the receive message buffer 134 in the CAN bus I/F 120*d*1 and decides whether it is a system termination common command.

If it is a system termination common command, the operation goes to step ST25 where the control section 120*d*2 shifts to system termination processing. If it is not a system termination common command, on the other hand, at step ST26 the control section 120*d*2 reads an appropriate control program from the intra-substrate control program memory 120*d*3 based on this common command as required and, based on this control program, sends an intra-functional-block command to the functional section 120*e*, to change functions of the functional section 120*e*, for example, a signal path or signal processing. Then, it returns to step ST23.

Next, system termination operations of the system control block 110 and the control I/F 120*d* of each of the functional blocks in the image-signal-processing apparatus 100B shown in FIG. 26 will be described with reference to flowcharts of FIGS. 35A and 35B.

FIG. 35A shows operations of the system control block 110. If the user has operated to turn off power at step ST31, the control section 110B stores a system termination command in the transmit message buffer of the CAN bus I/F 110A and delivers it to the CAN bus (the control bus 111) at step ST32.

At step ST33, the control section 110B sets to the register in the CAN bus I/F 110A an identifier (ID) of last memory data sent from each of the functional blocks and wait for reception thereof. At step ST34, the control section 110B then reads the received last memory data of each of the functional blocks, that is, the last memory data stored in the receive message buffer in the CAN bus I/F 110A and saves it in a predetermined region (last memory) in the system control program memory 110C. Then, at step ST35, the control section 110B turns off the system power.

FIG. 35B shows operations of the control I/F 120*d* in each of the functional blocks. At step ST41, the control section 120*d*2 receives a system termination common command to start system termination processing (which corresponds to the step ST25 of FIG. 34), and at step ST42, the control section 120*d*2 reads a last memory data transmission program from the intra-substrate control program memory 120*d*3 and activates it.

At step ST43, the control section 120*d*2 stores in the transmit message buffer in the CAN bus I/F 120*d*1 a parameter indicative of the current signal path or signal processing of the functional section 120*e* as the last memory data with an identifier (ID) being added to it and delivers it to the CAN bus (the control bus 111). Then, at step ST44, the control section 120*d*2 turns off the system power.

According to this third embodiment, the control blocks 120A (the U/V tuner 121, the input selector 122, the signal router 123, the DRC circuit 124, the noise removal circuit 127, and the OSD circuit 128) convert any common commands sent from the system control block 110 into each of the intra-functional-block commands, if the common commands relate to its own functional block, to control the functional section 120*e*, so that each of the functional blocks 120 adaptively operate based on the common commands sent from the system control block 110, to enable obtaining the same effects as the above-described first embodiment.

Further, in this third embodiment, in each of the functional blocks, the CAN bus interface 120*d*1 hardware-wise decides through comparison whether the communication data (common command, upgrade data, etc.) received via the CAN bus (the control bus 111) relates to its own functional block and, if such is the case, stores it in the receive message buffer 134. It is therefore unnecessary for the functional section 120*d*2 in the functional block to sort out the received communication data, thereby enabling greatly reducing loads on this control section 120*d*2.

Further, a CAN bus is widely used in a field of automobiles and so has enough anti-noise measures taken on it, thereby enabling to be provided a control bus capable of stably operating a system that cannot notify a transmission side of reception completion such as a common command even in equipment subject to quantity of noise such as a plasma display that has appeared recently.

Although the image-signal-processing apparatus 100B shown in FIG. 26 has used a CAN bus I/F as a bus interface, any bus interface that is different from the CAN bus I/F may be used as far as it has a message buffer for storing received data and a message storage control section for selectively storing data received via the bus in the message buffer so that received data can be sorted out hardware-wise.

Although in the above embodiments, the image-signal-processing apparatuses 100, 100A, and 100B have been described which each comprises the U/V tuner 121 (as the functional block 1), the input selectors 122 and 122A (a the functional block 2), the signal router 123 (as the functional block 3), the DRC circuit 124 (as the functional block 4), the panel-dedicated processing circuit 125 (as the functional block 5), the digital terrestrial tuner 126 (as the functional block 6), the noise removal circuit 127 (as the functional block 7), the OSD circuit 128 (as the functional block 8), etc., the number and the types of the functional blocks are not limited to these. Further, the number of slots is not limited to five, so that such a configuration may be employed that all of the functional blocks may be inserted into the slots, for example.

Although the above embodiments have adapted the present invention to the image-signal-processing apparatuses 100, 100A, and 100B, the present invention can be applied also to a apparatus for processing not only an image signal but also any other information signals such as an audio signal.

Although the above embodiments have employed a substrate as a unit of the functional blocks 120, the present invention is limited to it. The functional blocks 120 may be provided in a unit of a chip of a large-scale integrated circuit (LSI) or a device constituted of such a substrate or chip.

INDUSTRIAL APPLICABILITY

The present invention is adapted to process an information signal by using plural functional blocks to enable upgrading functions through upgrading of a version of these functional blocks and so can be applied to an image-signal-processing apparatus etc. for performing a series of processing pieces such as noise removal and image quality improvement on an image signal by using, for example, plural functional blocks.

The invention claimed is:

1. An information-signal-processing apparatus comprising:
plural functional blocks each for processing an information signal; and
a control block for controlling operations of the plural functional blocks,
wherein the control block or a predetermined block of the control block and the plural functional blocks issues a common command; and
each of the plural functional blocks adaptively operates in accordance with the issued common command, and
wherein the information-signal-processing apparatus further comprises a chassis that incorporates the plural functional blocks and the control block,
wherein the common command is a broadcast type command, and each common command is transmitted to each one of the plural functional blocks,
wherein the information signal includes image signals, and at least one functional block of the plural functional blocks performs an image quality improvement processing, and the common command includes information related to the image quality improvement processing, and
wherein the common command includes information indicating a noise level and a resolution level of an image signal, and
wherein each common command is converted into a block-specific command based on a conversion table that associates each common command with an initial value, a predetermined number of functional blocks, and the block-specific command corresponding to each of the predetermined number of functional blocks,
wherein each of the plural functional blocks stores in an associated memory a correlation table that associates common commands corresponding to its own functions with block-specific commands, and at a power application, each of the plural functional blocks transmits common commands corresponding to its functions to the control block.

2. The information-signal-processing apparatus according to claim 1, wherein the functional blocks change a signal path or signal processing in accordance with the common command.

3. The information-signal-processing apparatus according to claim 1, wherein the control block includes command acquisition means for acquiring the common command.

4. The information-signal-processing apparatus according to claim 3, wherein the command acquisition means acquires the common command from the plural functional blocks.

5. The information-signal-processing apparatus according to claim 3, wherein the command acquisition means acquires the common command from an outside of the apparatus.

6. The information-signal-processing apparatus according to claim 1,
wherein the control block has a first common command that corresponds to a user operation; and
wherein if the user operation that corresponds to the first common command is performed, the control block delivers this first common command to the plural functional blocks.

7. The information-signal-processing apparatus according to claim 1,
wherein the control block has a second common command that does not correspond to a user operation; and
wherein the control block delivers the second common command to the plural functional blocks without associating this command with the user operation.

8. The information-signal-processing apparatus according to claim 1, wherein the block that issues the common command delivers most recent values of the common commands of all of kinds or some of the kinds to the plural functional blocks for every predetermined lapse of time.

9. The information-signal-processing apparatus according to claim 1, wherein the block that issues the common command transmits most recent values of the common commands of all of kinds or some of the kinds if a command indicative of a normal operation from the functional block that is to operate when having received the issued common command is not returned.

10. The information-signal-processing apparatus according to claim 1,
wherein the functional blocks each comprises a control section and a functional section which is controlled by this functional section;

wherein the control section includes:
- storage means for storing a correlation between the common command related to its own functional block and an intra-functional-block command used to control the control section;
- reception means for receiving the common command from the control block; and
- conversion means for, if the common command received by the reception means is the common command related to its own functional block, converting this common command into the intra-functional-block command based on the correlation stored in said storage means.

11. The information-signal-processing apparatus according to claim 1, wherein the predetermined block issues the common command including a result of processing the information signal.

12. The information-signal-processing apparatus according to claim 1, wherein the control block and said plural functional blocks are connected to each other via a control bus.

13. The information-signal-processing apparatus according to claim 12,
wherein each of the plural functional blocks is constituted of a substrate; and
wherein some or all of the plural functional blocks are respectively inserted into slots formed in a chassis thereof.

14. The information-signal-processing apparatus according to claim 1,
wherein the control block and the plural functional blocks respectively have a bus interface;
wherein the control block and the plural functional blocks respectively are connected to each other by a bus using the bus interface; and
wherein the bus interface includes:
- a message buffer for storing received data; and
- a message storage control section for selectively storing data received via the bus in the message buffer.

15. The information-signal-processing apparatus according to claim 14,
wherein the control block transmits the common command having at least an identifier to the plural functional blocks; and
wherein if the identifier of a predetermined common command that has been set beforehand agrees with an identifier of the common command that has been received via the bus, the message storage control sections in the plural functional blocks store this received common command into the message buffer.

16. The information-signal-processing apparatus according to claim 14, wherein the bus is a CAN bus.

17. A functional block control method comprising the steps of:
transmitting a common command to plural functional blocks, respectively, used to process an information signal from a control block or from a predeteri lined block of the control block and the plural functional blocks; and
adaptively operating the plural functional blocks in accordance with the common command,
incorporating the plural functional blocks and the control block to a same chassis,
wherein the common command is a broadcast type command, and each common command is transmitted to each one of the plural functional blocks,
wherein the information signal includes image signals, and at least one functional block of the plural functional blocks performs an image quality improvement processing, and the common command includes information related to the image quality improvement processing,
wherein the common command includes information indicating a noise level and a resolution level of an image signal, and
wherein each common command is converted into a block-specific command based on a conversion table that associates each common command with an initial value, a predetermined number of functional blocks, and the block-specific command corresponding to each of the predetermined number of functional blocks,
wherein each of the plural functional blocks stores in an associated memory a correlation table that associates common commands corresponding to its own functions with block-specific commands, and at a power application, each of the plural functional blocks transmits common commands corresponding to its functions to the control block.

18. A functional block comprising:
a control section; and
a functional section that is controlled by this control section,
wherein the control section includes:
storage means for storing a correlation between a common command related to its own functional block and an intra-functional-block command used to control the control section;
reception means for receiving the common command from a control block; and
conversion means for, if the common command received by the reception means is the common command related to its own functional block, converting this common command into an intra-functional-block command based on the correlation stored in the storage means,
wherein the functional block and the control block are incorporated by a same chassis,
wherein the common command is a broadcast type command, and each common command is transmitted to each one of the plural functional blocks,
wherein the functional section includes a function to perform an image quality improvement processing, and the common command includes information related to the image quality improvement processing,
wherein the common command includes information indicating a noise level and a resolution level of an image signal, and
wherein each common command is converted into a block-specific command based on a conversion table that associates each common command with an initial value, a predetermined number of functional blocks, and the block-specific command corresponding to each of the predetermined number of functional blocks,
wherein at a power application, the functional blocks transmits common commands corresponding to its functions to the control block.

* * * * *